(12) United States Patent
Gomi et al.

(10) Patent No.: US 9,568,075 B2
(45) Date of Patent: Feb. 14, 2017

(54) ROBOT, ROBOT CONTROL DEVICE, AND ROBOT SYSTEM

(71) Applicant: Seiko Epson Corporation, Tokyo (JP)

(72) Inventors: Akihiro Gomi, Fujimi (JP); Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 232 days.

(21) Appl. No.: 14/521,828

(22) Filed: Oct. 23, 2014

(65) Prior Publication Data

US 2015/0114149 A1   Apr. 30, 2015

(30) Foreign Application Priority Data

Oct. 28, 2013 (JP) .................. 2013-223559
Oct. 28, 2013 (JP) .................. 2013-223561

(51) Int. Cl.
*F16H 25/08* (2006.01)
*B25J 5/00* (2006.01)
*B25J 9/16* (2006.01)

(52) U.S. Cl.
CPC .............. *F16H 25/08* (2013.01); *B25J 5/00* (2013.01); *B25J 9/1635* (2013.01); *Y10S 901/02* (2013.01); *Y10S 901/19* (2013.01); *Y10T 74/18792* (2015.01)

(58) Field of Classification Search
CPC ............. F16H 25/08; B25J 5/00; B25J 9/1635
See application file for complete search history.

(56) References Cited

U.S. PATENT DOCUMENTS

| | | | | |
|---|---|---|---|---|
| 4,570,065 A | * | 2/1986 | Pryor | B25J 18/002 250/227.11 |
| 4,808,064 A | * | 2/1989 | Bartholet | B25J 9/1692 356/139.03 |
| 5,049,797 A | | 9/1991 | Phillips | |
| 5,182,506 A | * | 1/1993 | Soon-Ho | G05B 19/353 318/568.1 |
| 5,220,261 A | * | 6/1993 | Kempas | B25J 9/1692 318/567 |

(Continued)

FOREIGN PATENT DOCUMENTS

| | | |
|---|---|---|
| JP | 01-115585 | 5/1989 |
| JP | 05-046234 | 2/1993 |

(Continued)

OTHER PUBLICATIONS

Extended European Search Report for Application No. EP 14 19 0448 dated Jun. 1, 2016 (9 pages).

(Continued)

*Primary Examiner* — David M Fenstermacher
(74) *Attorney, Agent, or Firm* — Harness, Dickey & Pierce, P.L.C.

(57) ABSTRACT

A robot includes a base; a trunk linked to the base; a multi-joint robot arm rotatably linked to the trunk; and an elevating mechanism capable of bringing the trunk to a low position and a high position higher than the low position, and a time taken when a tip of the multi-joint robot arm is moved by a predetermined distance when the trunk is at the high position is longer than a time taken when the tip of the multi-joint robot arm is moved by a predetermined distance when the trunk is at the low position.

20 Claims, 33 Drawing Sheets

(56) References Cited

U.S. PATENT DOCUMENTS

| | | | | |
|---|---|---|---|---|
| 5,311,109 | A * | 5/1994 | Ozawa | B62D 57/032 180/8.1 |
| 5,418,441 | A * | 5/1995 | Furukawa | B25J 9/1641 318/568.22 |
| 5,483,630 | A * | 1/1996 | Unuma | G06T 13/40 345/473 |
| 5,627,440 | A * | 5/1997 | Yamamoto | G05B 19/416 318/568.21 |
| 5,691,616 | A * | 11/1997 | Iwashita | G05B 19/232 318/568.22 |
| 6,412,329 | B1 * | 7/2002 | Nai | G05B 19/19 702/95 |
| 6,646,405 | B2 * | 11/2003 | McConnell | B25J 9/1635 318/568.2 |
| 7,328,120 | B2 | 2/2008 | Hirabayashi | |
| 7,602,306 | B2 * | 10/2009 | Kashio | B25J 9/1674 318/568.24 |
| 7,615,956 | B2 * | 11/2009 | Tsusaka | A63H 11/18 318/568.11 |
| 7,765,023 | B2 | 7/2010 | Oaki et al. | |
| 7,979,160 | B2 * | 7/2011 | Teaford | B25J 9/1641 318/568.16 |
| 8,287,477 | B1 * | 10/2012 | Herr | A61B 5/1038 602/16 |
| 8,500,823 | B2 * | 8/2013 | Herr | A61F 2/64 623/24 |
| 8,734,528 | B2 * | 5/2014 | Herr | A61F 2/60 623/24 |
| 8,864,846 | B2 * | 10/2014 | Herr | A61F 2/66 623/25 |
| 8,870,967 | B2 * | 10/2014 | Herr | A61F 2/60 601/5 |
| 9,060,883 | B2 * | 6/2015 | Herr | A61F 2/66 |
| 9,221,177 | B2 * | 12/2015 | Herr | B62D 57/032 |
| 9,333,097 | B2 * | 5/2016 | Herr | A61F 2/60 |
| 2013/0195598 | A1 | 8/2013 | Furuichi | |
| 2014/0060233 | A1 | 3/2014 | Gomi et al. | |
| 2014/0067118 | A1 | 3/2014 | Gomi et al. | |
| 2014/0067119 | A1 | 3/2014 | Gomi et al. | |
| 2014/0067120 | A1 | 3/2014 | Gomi et al. | |

FOREIGN PATENT DOCUMENTS

| | | |
|---|---|---|
| JP | 06-262560 | 9/1994 |
| JP | 07-136954 | 5/1995 |
| JP | 2005-242794 A | 9/2005 |
| JP | 2006-252383 A | 9/2006 |
| JP | 2007-098501 A | 4/2007 |
| JP | 2013-099806 A | 5/2013 |
| JP | 2013-099807 A | 5/2013 |
| JP | 2013-157561 A | 8/2013 |
| JP | 2014-046401 A | 3/2014 |
| JP | 2014-046402 A | 3/2014 |
| JP | 2014-046403 A | 3/2014 |
| JP | 2014-046404 A | 3/2014 |

OTHER PUBLICATIONS

Hillsley, K.L. et al., "Vibration Control of a Two-Link Flexible Robot Arm" Proceedings of the 1991 International Conference on Robitics and Automation, Sacramento, California, IEEE Comp. Soc. Press, U.S. Volume Conf. 7, Apr. 9, 1991, pp. 2121-2126.

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

A robot described in JP-A-2013-157561 has a base (body portion), a trunk (arm drive unit) provided so as to be liftable with respect to the base, and multi-joint robot arms (arms) rotatably provided at the trunk.

A robot described in JP-A-2013-99806 has a trunk, and a pair of multi-joint robot arms rotatably provided at the trunk.

In the robot having the configuration as described in JP-A-2013-157561, as the height of the trunk with respect to the base is greater, the rigidity of the trunk degrades and the vibration generated when an arm is driven becomes greater. However, in the robot described in JP-A-2013-157561, such a point is not considered at all, and it is inferred that drive conditions (for example, acceleration, deceleration, a position proportional gain, or the like) of the arm are set to be constant irrespective of the height of the trunk with respect to the base. Therefore, in particular, there is a problem in that the vibration when the height of the trunk with respect to the base is high cannot be suppressed. In addition, there is also a problem in that it is difficult to stably drive the robot in an unstable installation state due to the problem called the degradation of the rigidity of the trunk as described above.

Additionally, in the robot having the configuration as described in JP-A-2013-99806, for example, the other multi-joint robot arm may perform another work even in the midst of one multi-joint robot arm performing work that requires precision. In such a case, there is a problem that the vibration generated by the driving of the other multi-joint robot arm may exert a bad influence on the work, which is being performed by the one multi-joint robot arm and requires precision.

SUMMARY

An advantage of some aspects of the invention is to provide a robot, a robot control device, and a robot system that can suppress vibration irrespective of the position of a trunk with respect to a base. At least part of such an advantage is achieved by the following aspects of the invention.

Another advantage of some aspects of the invention is to provide a robot, a robot control device, and a robot system that can perform predetermined work with sufficient precision so that when one multi-joint robot arm is performing the predetermined work that requires precision, the other multi-joint robot arm is driven so as not to generate vibration if possible. At least part of such an advantage is achieved by the following aspects of the invention.

An aspect of the invention is directed to a robot including a base; a trunk provided at the base; a first robot arm provided at the trunk; and a moving mechanism capable of bringing the trunk to a first position and a second position further separated from the base than the first position. Here, a second time taken when a tip of the first robot arm is moved by a predetermined distance when the trunk is at the second position is longer than a first time taken when the tip of the first robot arm is moved by the predetermined distance when the trunk is at the first position.

With this configuration, it is possible to provide the robot that can suppress vibration irrespective of the position of the trunk with respect to the base.

In the robot according to the aspect of the invention, it is preferable that the robot includes a setting receiving unit that receives a set value that determines a drive condition of the first robot arm and the set value received by the setting receiving unit is the same at the first position and the second position.

With this configuration, the time taken when the first robot arm is moved by a predetermined distance when the trunk is at the second position can be made longer than the time taken when the first robot arm is moved by the predetermined distance when the trunk is at the first position, irrespective of the set value.

In the robot according to the aspect of the invention, it is preferable that the robot further includes an input unit that outputs the set value.

With this configuration, the set value can be easily input.

In the robot according to the aspect of the invention, it is preferable that a direction in which the tip is moved by the predetermined distance is a direction having a directional component orthogonal to a movement direction of the trunk.

With this configuration, vibration can be more effectively suppressed.

In the robot according to the aspect of the invention, it is preferable that the robot further includes a motor that drives the first robot arm, and a position proportional gain of the motor, by which a position deviation that is a difference between the position of the motor and a command position is multiplied, in the case of the second position is smaller than that in the case of the first position.

With this configuration, the time taken when the first robot arm is moved by a predetermined distance when the trunk is at the second position can be made longer than the time taken when the first robot arm is moved by the predetermined distance when the trunk is at the first position, through a relatively simple control.

In the robot according to the aspect of the invention, it is preferable that the robot further includes a motor that drives the first robot arm, and at least one of the acceleration and the deceleration of the motor in the case of the second position is smaller than that in the case of the first position.

With this configuration, the time taken when the first robot arm is moved by a predetermined distance when the trunk is at the second position can be made longer than the time taken when the first robot arm is moved by the predetermined distance when the trunk is at the first position, through a relatively simple control.

In the robot according to the aspect of the invention, it is preferable that the robot further includes a detector that detects the separation distance of the trunk from the base.

With this configuration, the separation distance of the trunk to the base can be easily detected.

In the robot according to the aspect of the invention, it is preferable that the robot further includes a second robot arm provided at the trunk, and a time taken when a tip of the second robot arm is moved by a predetermined distance when the trunk is at the second position is longer than a time taken when the tip of the second robot arm is moved by a predetermined distance when the trunk is at the first position.

With this configuration, vibration can be more effectively suppressed.

In the robot according to the aspect of the invention, it is preferable that the robot further includes a rotation mechanism that rotates the trunk with respect to the base, and a time taken when the trunk is rotated by a predetermined angle with respect to the base when the trunk is at the second position is longer than a time taken when the trunk is rotated by the predetermined angle when the trunk is at the first position.

With this configuration, vibration can be more effectively suppressed.

In the robot according to the aspect of the invention, it is preferable that the first time and the second time are respectively times taken when the tip of the first robot arm is moved by a predetermined distance in a direction parallel to an installation surface of the robot.

With this configuration, vibration can be more effectively suppressed.

In the robot according to the aspect of the invention, it is preferable that the first time and the second time are respectively times taken when the tip of the first robot arm is moved by a predetermined distance from a stationary state.

With this configuration, vibration can be more effectively suppressed.

Another aspect of the invention is directed to a robot control device that controls a robot including a base; a trunk provided at the base; a first robot arm provided at the trunk; and a moving mechanism capable of bringing the trunk to a first position and a second position further separated from the base than the first position so that a time taken when a tip of the first robot arm is moved by a predetermined distance when the trunk is at the second position is longer than a time taken when the tip of the first robot arm is moved by the predetermined distance when the trunk is at the first position.

With this configuration, there is provided the robot control device that can suppress vibration irrespective of the position of the trunk with respect to the base.

Still another aspect of the invention is directed to a robot system including the robot according to the aspect of the invention; and a robot control device that controls the operation of the robot.

With this configuration, there is provided the robot system that can suppress vibration irrespective of the position of the trunk with respect to the base.

Yet another aspect of the invention is directed to a robot including a first robot arm and a second robot arm, and a second time taken for moving a tip of the second robot arm by a predetermined distance in a working state where a tip of the first robot arm is performing predetermined work may be longer than a first time taken for moving the tip of the second robot arm by the predetermined distance in a non-working state where the tip of the first robot arm is not performing the predetermined work.

With this configuration, it is possible to provide the robot that can perform predetermined work with sufficient precision so that when one multi-joint robot arm is performing the predetermined work that requires precision, the other multi-joint robot arm is driven so as not to vibrate if possible.

In the robot according to the aspect of the invention, it is preferable that the robot includes a setting receiving unit that receives set values that determines drive conditions of the first robot arm and the second robot arm and the set values received by the setting receiving unit is the same in the working state and the non-working state.

With this configuration, the time taken when a tip of the first robot arm is moved by a predetermined distance in the case of the working state can be made longer than the time taken when the tip of the first robot arm is moved by the predetermined distance in the case of the non-working state, irrespective of the set values.

In the robot according to the aspect of the invention, it is preferable that the robot further includes a motor that drives the second robot arm, and a position proportional gain of the motor, by which a position deviation that is a difference between the position of the motor and a command position is multiplied, in the case of the working state is smaller than that in the case of the non-working state.

With this configuration, the time taken when a tip of the first robot arm is moved by a predetermined distance in the case of the working state can be made longer than the time taken when the tip of the first robot arm is moved by the predetermined distance in the case of the non-working state, through a relatively simply control.

In the robot according to the aspect of the invention, it is preferable that the robot further includes a motor that drives the second robot arm, and at least one of the acceleration and the deceleration of the motor in the case of the working state is smaller than that in the case of the non-working state.

With this configuration, the time taken when a tip of the first robot arm is moved by a predetermined distance in the case of the working state can be made longer than the time taken when the tip of the first robot arm is moved by the predetermined distance in the case of the non-working state, through a relatively simply control.

In the robot according to the aspect of the invention, it is preferable that, in the working state, an acceleration when the second robot arm is in a second posture in which an inertia moment of the second robot arm becomes greater than that in a first posture is lower than an acceleration when the second robot arm is in the first posture.

With this configuration, the generation of vibration in the case of the working state can be more effectively suppressed.

In the robot according to the aspect of the invention, it is preferable that, in the working state, an acceleration when the second robot arm holds an object with a second mass that is heavier than a first mass is lower than an acceleration when the second robot arm holds an object with the first mass.

With this configuration, the generation of vibration in the case of the working state can be more effectively suppressed.

In the robot according to the aspect of the invention, it is preferable that the first time and the second time are respectively times taken when the tip of the second robot arm is moved by a predetermined distance from a stationary state.

With this configuration, the generation of vibration in the case of the working state can be more effectively suppressed.

Still yet another aspect of the invention is directed to a robot control device which controls a robot including a first robot arm and a second robot arm so that a second time taken for moving a tip of the second robot arm by a predetermined distance in a working state where a tip of the first robot arm is performing predetermined work is longer than a first time taken for moving the tip of the second robot arm by the predetermined distance in a non-working state where the tip of the first robot arm is not performing the predetermined work.

With this configuration, there is provided the robot that can perform predetermined work with sufficient precision so that when one multi-joint robot arm is performing the predetermined work that requires precision, the other multi-joint robot arm is driven so as not to vibrate if possible.

Further another aspect of the invention is directed to a robot system including the robot according to the aspect of the invention; and a robot control device that controls the operation of the robot.

With this configuration, there is provided the robot system that can perform predetermined work with sufficient precision so that when one multi-joint robot arm is performing the predetermined work that requires precision, the other multi-joint robot arm is driven so as not to vibrate if possible.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a robot control device, and a robot system according to the invention will be described in detail with reference to preferred embodiments illustrated in the accompanying drawings.

First Embodiment

Figure 1:
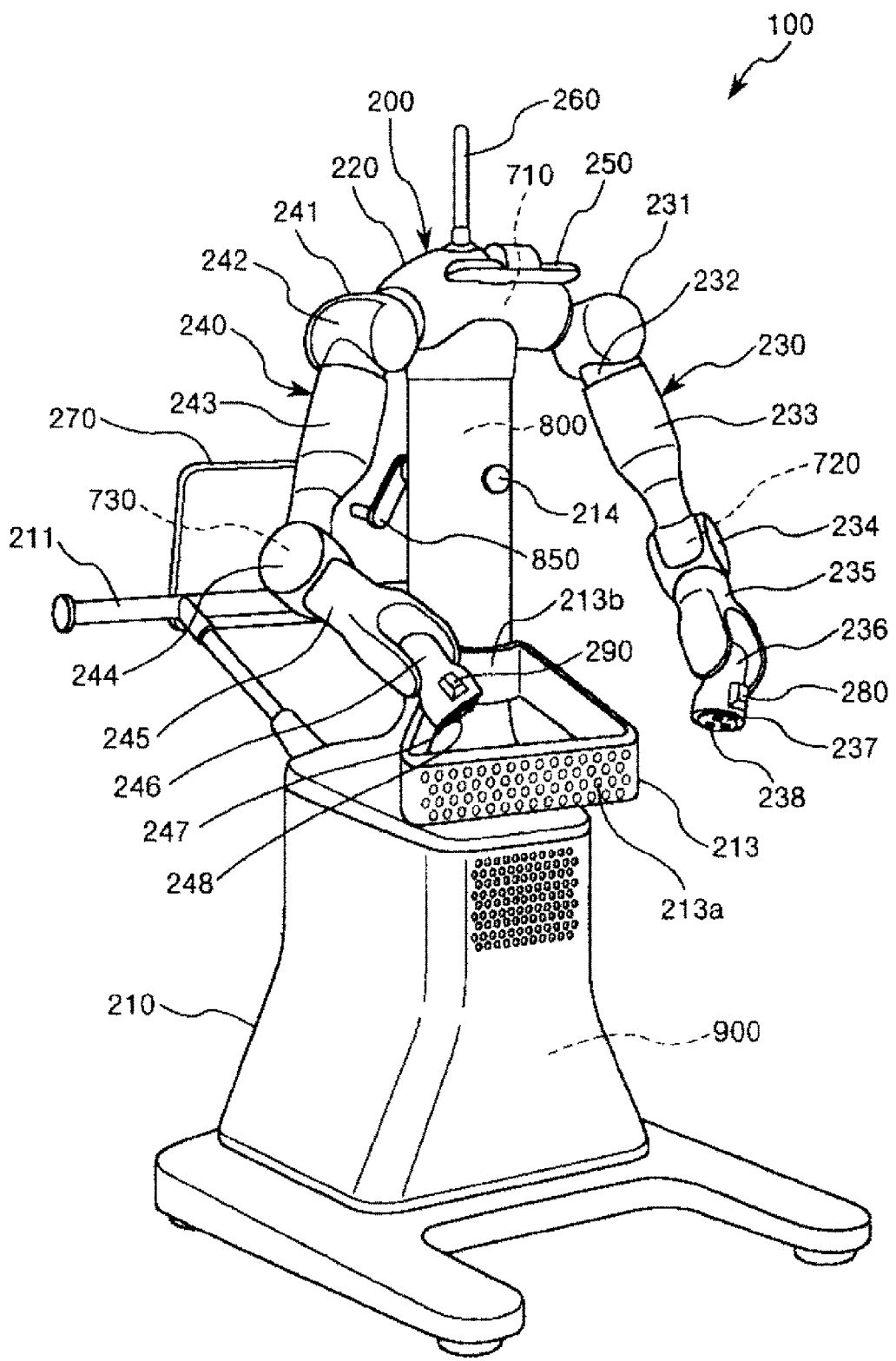
FIG. 1 is a perspective view illustrating a robot system related to a first embodiment.
Figure 2:
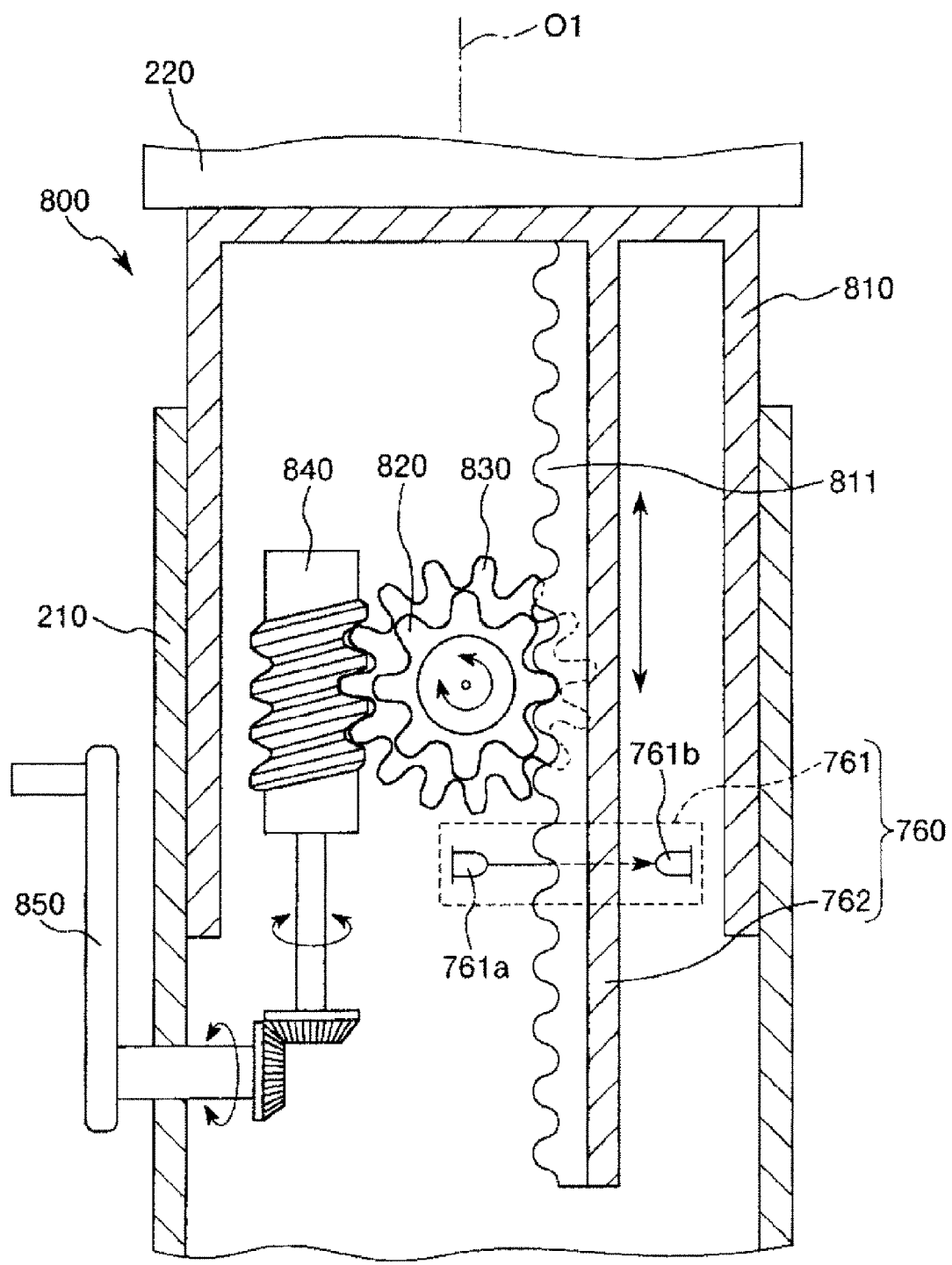
FIG. 2 is a cross-sectional view illustrating a lifting mechanism and a detector included in the robot illustrated in FIG. 1.
Figure 3:
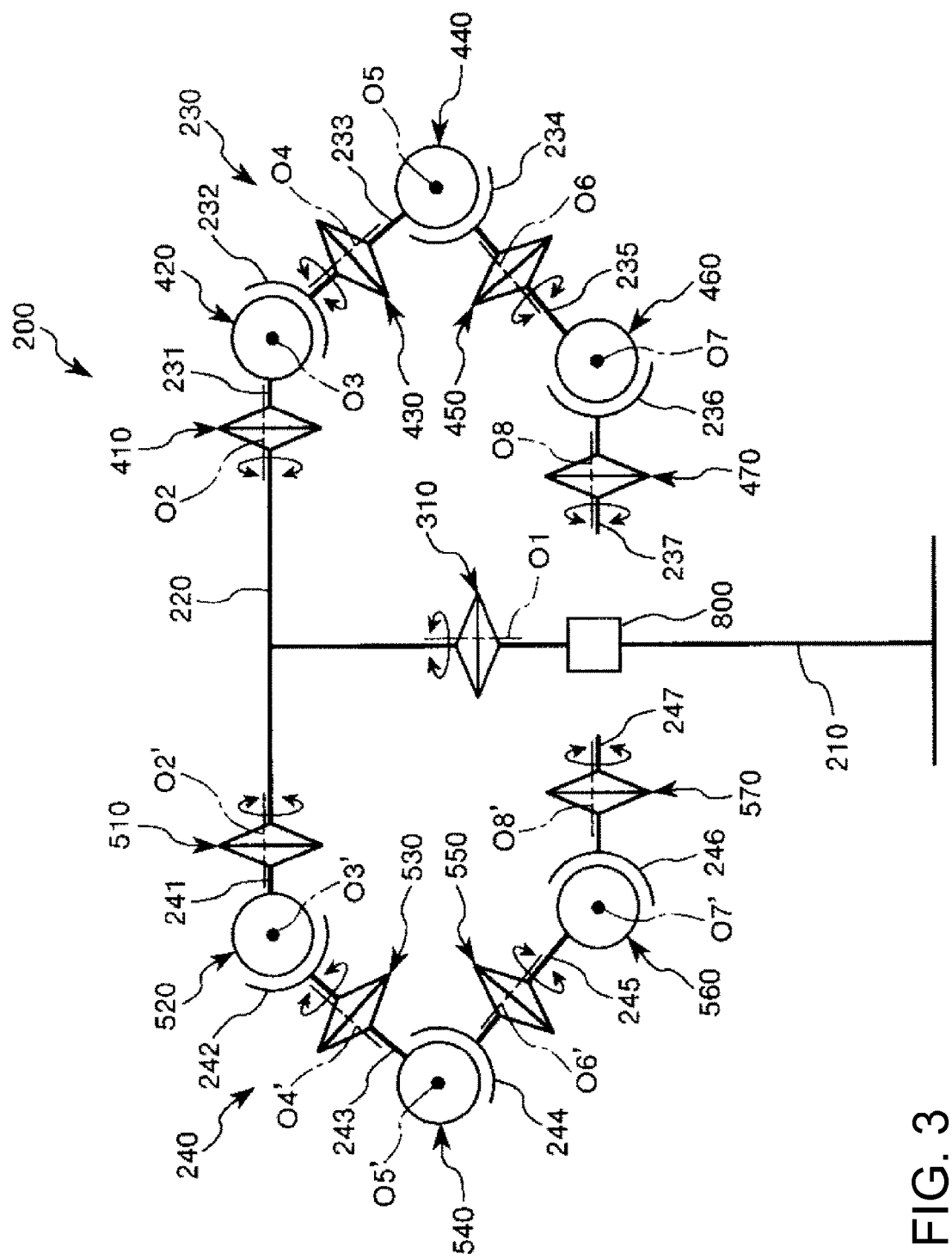
FIG. 3 is a view representing a joint mechanism, a twisting mechanism, and rotation axes of a robot illustrated in FIG. 1.
Figure 4:
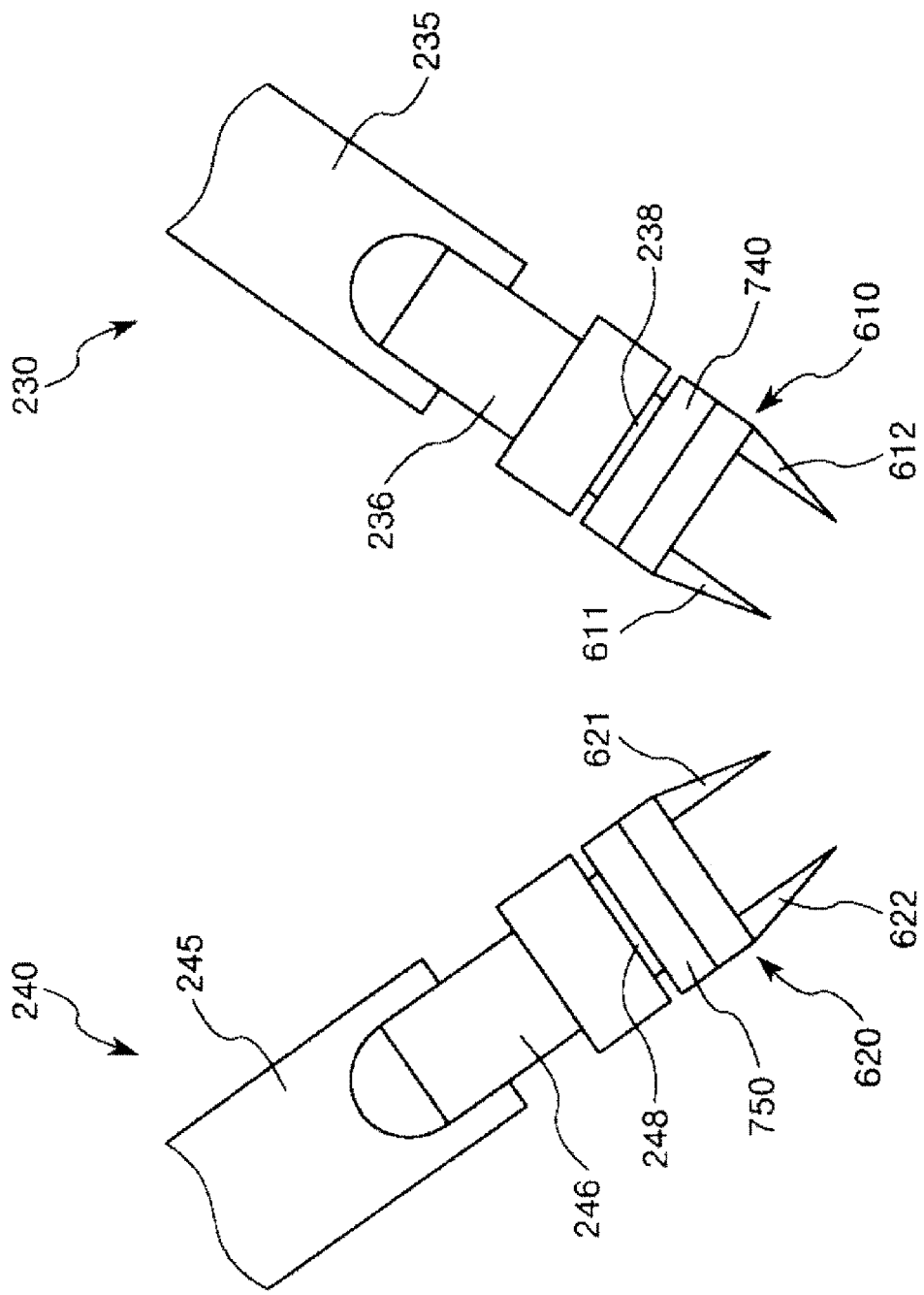
FIG. 4 is a view illustrating end effectors to be mounted on the robot illustrated in FIG. 1.
Figure 5:
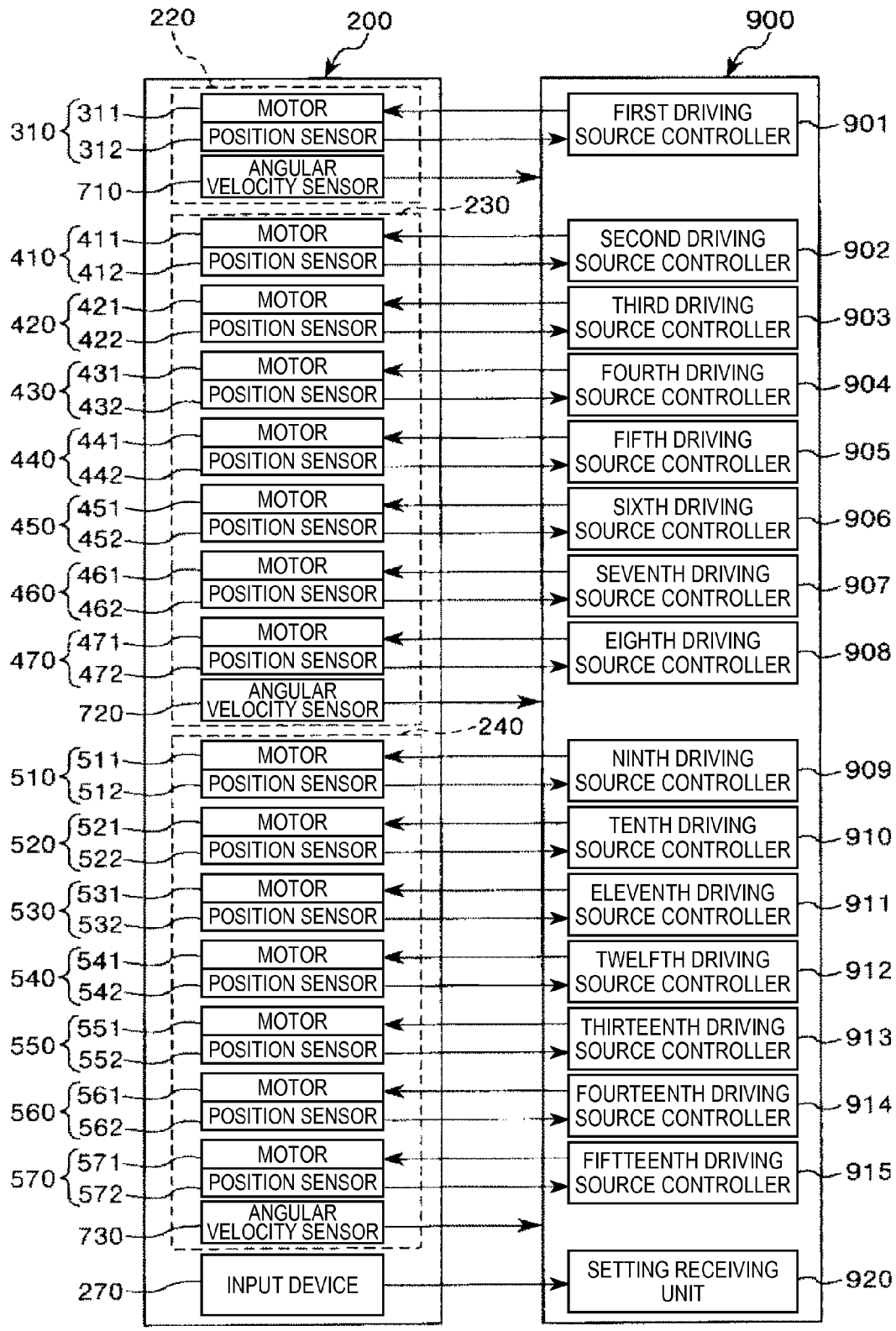
FIG. 5 is a block diagram illustrating a control system of the robot system illustrated in FIG. 1.
Figure 14:
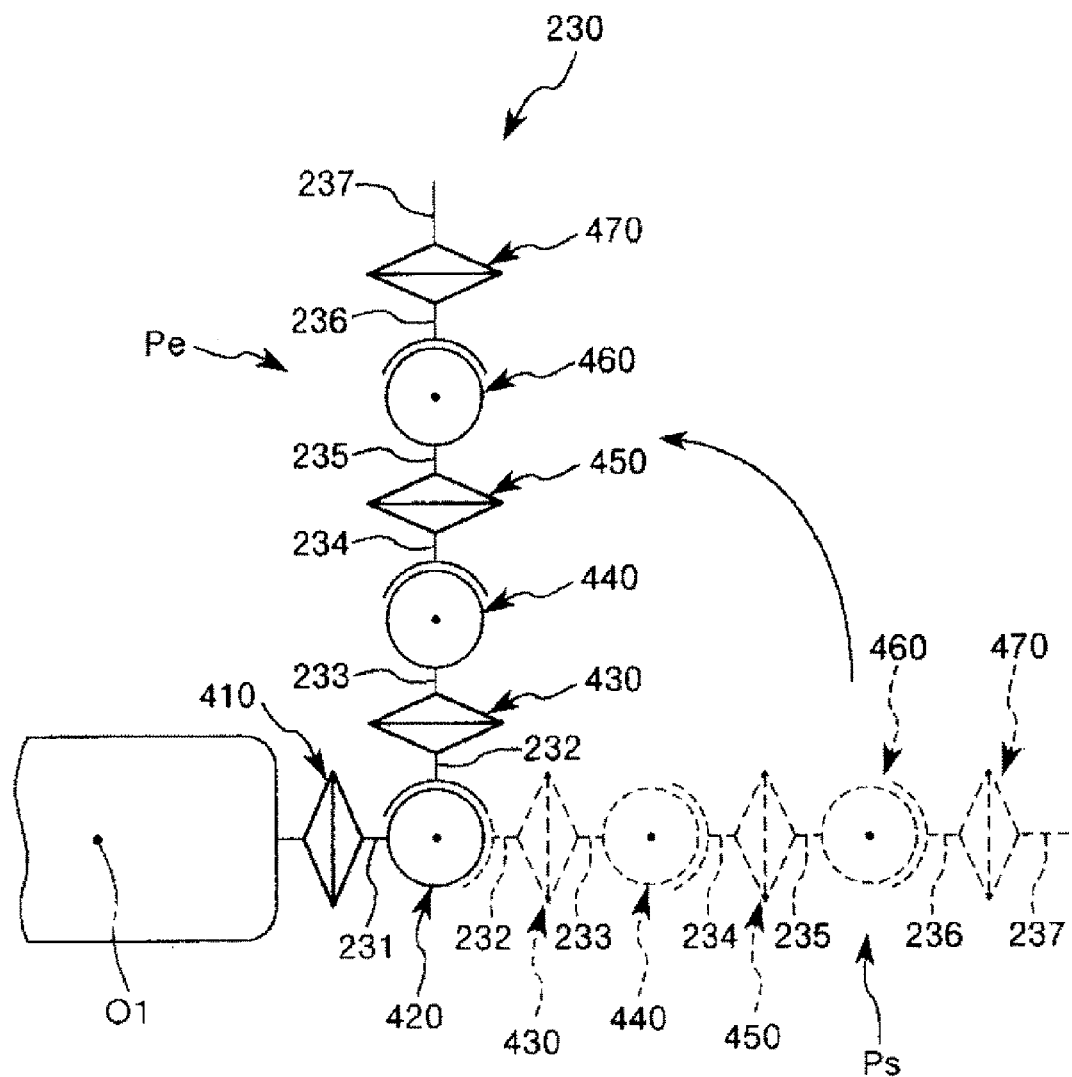
FIG. 14 is a plan view illustrating a stationary state and a target state of a multi-joint robot arm.
Figure 15:
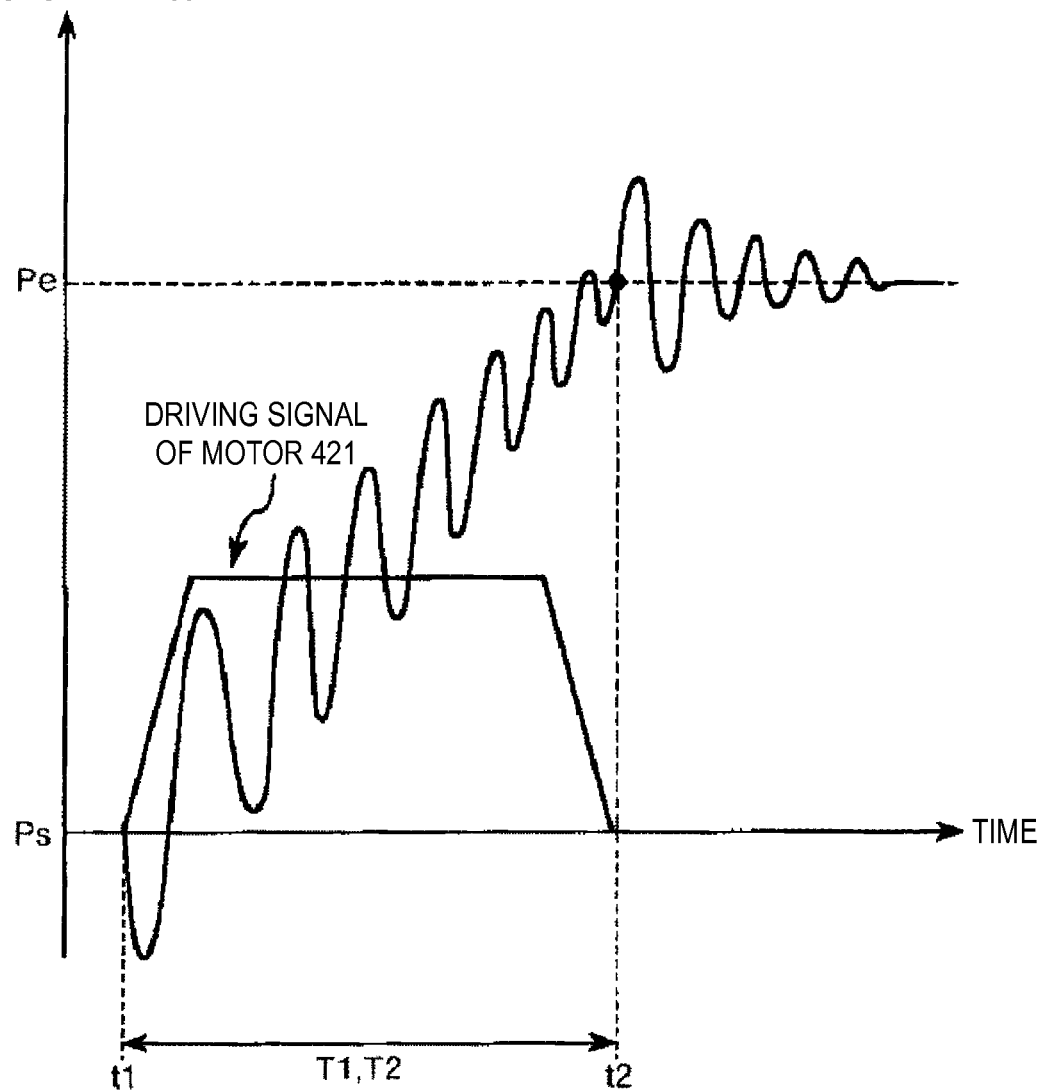
FIG. 15 is a view illustrating a driving signal and the driving of the multi-joint robot arm.
Figure 16:
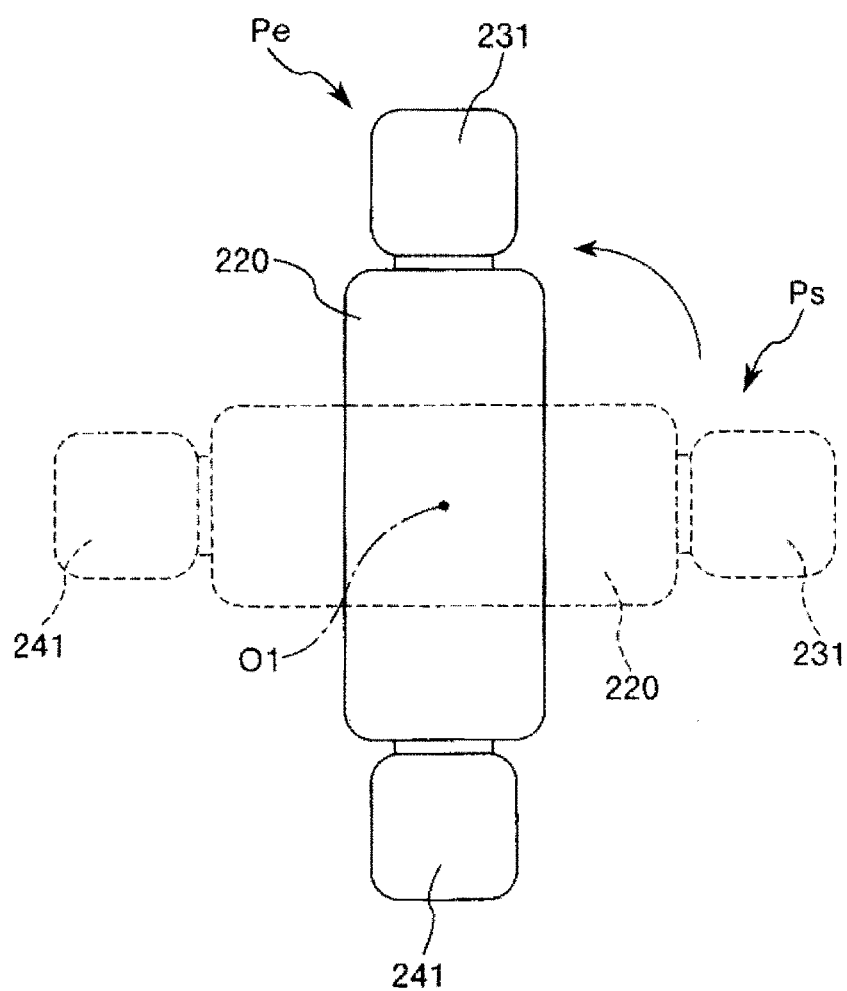
FIG. 16 is a plan view illustrating a stationary state and a target state of a trunk.

FIG. 1 is a perspective view illustrating a robot system related to a first embodiment as a preferred embodiment of a robot system according to the invention. FIG. 2 is a cross-sectional view illustrating a lifting mechanism and a detector included in a robot illustrated in FIG. 1. FIG. 3 is a view representing a joint mechanism, a twisting mechanism, and rotation axes of the robot illustrated in FIG. 1. FIG. 4 is a view illustrating end effectors to be mounted on the robot illustrated in FIG. 1. FIG. 5 is a block diagram illustrating a control system of the robot system illustrated in FIG. 1. FIGS. 6 to 13 are block diagrams illustrating the drive control of the robot system illustrated in FIG. 1, respectively. FIG. 14 is a plan view illustrating a stationary state and a target state of a multi-joint robot arm. FIG. 15 is a view illustrating a driving signal and the driving of the multi-joint robot arm. FIG. 16 is a plan view illustrating a stationary state and a target state of a trunk.

A robot system 100 illustrated in FIG. 1 is a double-arm robot, which can be used with, for example, a manufacturing process that manufactures precision instruments, such as a wrist watch. Such a robot system 100 has a robot 200, and a robot control device 900 that controls the operation of the robot 200. In addition, although the arrangement of the robot 200 is not particularly limited, a case where the robot 200 is arranged vertically (a rotational axis O1 to be described below is vertical) to a horizontal floor surface (installation surface) will be described below for convenience of description.

Robot

As illustrated in FIG. 1, the robot 200 has a base 210, a trunk 220 linked to the base 210, a pair of multi-joint robot arms 230 and 240 linked to the left and right of the trunk 220, a stereoscopic camera 250 and a signal lamp 260 that are provided at the trunk 220, and hand cameras 280 and 290 provided at the multi-joint robot arms 230 and 240.

According to such a robot 200, work can be performed while confirming the position of a part, a tool, or the like on a work bench or confirming surrounding environments (whether or not there is any obstacle around the robot or whether or not safety is ensured), using the stereoscopic camera 250 or the hand cameras 280 and 290. Additionally, the states (a drive state, a normal stop state, an abnormal stop state, and the like) of the robot 200 can be easily confirmed by the signal lamp 260.

Base

The base 210 is provided with a plurality of wheels (not illustrated) that facilitate the movement of the robot 200, locking mechanisms (not illustrated) that lock the respective wheels, and a handle 211 to be gripped when the robot 200 is moved. The robot 200 can be freely moved by releasing the locking mechanisms and by gripping and pushing or pulling the handle 211, and the robot 200 can be fixed at a predetermined position by locking the wheels using the locking mechanisms. The convenience of the robot 200 is improved by facilitating the movement of the robot 200 in this way. In addition, the wheels, the locking mechanisms, and the handle 211 may be omitted, respectively.

Additionally, the base 210 is provided with a bumper 213 for abutting against the work bench (not illustrated). By making the bumper 213 abut against a side surface of the work bench, the robot 200 can be opposed to the work bench with a predetermined gap. Therefore, an unintended contact or the like between the robot 200 and the work bench (not illustrated) can be prevented. In addition, the bumper 213 has an abutment portion 213a that abuts against the work bench, and a fixed portion 213b fixed to the base 210. In FIG. 1, the abutment portion 213a is mounted on the base 210 so as to be located below the fixed portion 213b. Such a bumper 213 can be attached to and detached from the base 210, and the orientation of the bumper 213 can be vertically flipped. That is, on the contrary to FIG. 1, the bumper 213 can also be mounted on the base 210 so that the abutment portion 213a is located above the fixed portion 213b. By changing the height of the abutment portion 213a in this way, it is possible to cope with work benches with different heights.

Additionally, the base 210 is provided with an emergency stop button 214, and the robot 200 can be emergency-stopped by pushing the emergency stop button 214 in the case of emergency.

Additionally, the base 210 is provided with an input device 270. The input device 270 is a device that inputs data of a connection interface with a keyboard, an external instrument, or the like. In addition, a device for teaching that inputs the operation of the robot 200 is included in the input device 270. Additionally, the input device 270 has a monitor and can display the state of the robot 200 or various data on the monitor.

Trunk

As illustrated in FIG. 2, the trunk 220 is linked to the base 210 via a lifting mechanism (moving mechanism) 800 so as to be liftable in a vertical direction (in the direction of a rotational axis O1). The configuration of the lifting mechanism 800 is not particularly limited if the lifting mechanism can lift and lower the trunk 220 with respect to the base 210.

As illustrated in FIG. 2, the lifting mechanism 800 of the present embodiment includes a tubular lifting portion 810 within which a rack 811 is provided, a pinion 820 that meshes with the rack 811, a worm wheel 830 that rotates the pinion 820, a worm 840 that rotates the worm wheel 830, and a crank 850 that rotates the worm 840. Among these components, the lifting portion 810 is linked to the trunk 220, and the pinion 820, the worm wheel 830, the worm 840, and the crank 850 are fixed to the base 210, respectively. If the crank 850 is manually rotated, the power thereof is transmitted to the pinion 820 via the worm 840 and the worm wheel 830, and the rack 811 is moved with the rotation of the pinion 820. Accordingly, the trunk 220 is lifted or lowered with respect to the base 210 together with the lifting portion 810. By using the worm wheel 830 and the worm 840 in this way, the position of the lifting portion 810 can be maintained even if the crank 850 is stopped. In addition, a reduction gear that reduces the rotating speed of the crank 850 may be provided between the crank 850 and the worm 840.

The configuration of the lifting mechanism 800 is not limited to the above-described manual configuration. For example, an electric configuration using a motor or the like may be adopted. Specifically, a configuration may be adopted in which a motor that rotates the worm 840, and a position sensor that detects the rotational angle of the motor are provided instead of the crank 850 and the trunk 220 is lifted and lowered by rotating the motor. In this case, the motor is not particularly limited, and for example, a servo motor, such as an AC servomotor or a DC servo motor, can be used. The position sensor is not particularly limited, and for example, an encoder, a rotary encoder, a resolver, a potentiometer, or the like can be used.

Additionally, the trunk 220 is linked to the base 210 via a joint mechanism 310 so as to be rotatable around the rotational axis O1. In the present embodiment, the rotational axis O1 extends in the vertical direction. The configuration of the joint mechanism 310 is not particularly limited if the trunk 220 can be rotated around the rotational axis O1 with respect to the base 210. However, as illustrated in FIG. 5, the joint mechanism 310 has a motor 311 as a driving source, a reduction gear (not illustrated) that reduces the rotating speed of the motor 311, and a position sensor 312 that detects the rotational angle of the motor 311. As the motor 311, for example, a servo motor, such as an AC servo motor or a DC servo motor, can be used. As the reduction gear, for example, a planetary gear type reduction gear, a harmonic drive ("the harmonic drive" is a registered trademark), or the like can be used. As the position sensor 312, for example, an encoder, a rotary encoder, a resolver, a potentiometer, or the like can be used.

Additionally, as illustrated in FIG. 2, the robot 200 is provided with a detector 760 that detects the height (separation distance from the base 210) of the trunk 220 with respect to the base 210. The detector 760 has a photointerrupter 761 fixed to the base 210, and a shielding plate 762 fixed to the trunk 220. Additionally, the photointerrupter 761 has a light-emitting portion 761a that emits light, and a light-receiving portion 761b that receives light from the light-emitting portion 761a, and these portions are arranged horizontally side by side. Meanwhile, the shielding plate 762 is moved by the lifting and lowering of the trunk 220 so as to shield a space between the light-emitting portion 761a of the photointerrupter 761 and the light-receiving portions 761b. In the detector 760 having such a configuration, a low position (first position) where the photointerrupter 761 is shielded, and a high position (second position) where the photointerrupter 761 is not shielded and where the trunk 220 is higher than the low position can be detected. According to the detector 760 having such a configuration, the height of the trunk 220 can be detected with a simple configuration. In addition, FIG. 2 illustrates a state at the low position.

The configuration of the detector 760 is not limited to the present embodiment if the height of the trunk 220 can be detected in two or more steps. For example, the height of the trunk 220 can be detected by arranging a plurality of the photointerrupters 761 side by side in the vertical direction and detecting whether or nor light is shielded by the photointerrupters 761. Specifically, if two photointerrupters 761 are arranged side by side in the vertical direction, it is possible to detect a low position where both upper and lower photointerrupters 761 are shielded, a middle position where only the upper photointerrupter 761 is shielded and the trunk 220 is higher than the low position, and a high position where neither the upper nor the lower photointerrupters 761 are shielded and the trunk 220 is higher than the middle position. Accordingly, since the height of the trunk 220 can be detected in more multiple steps, the height of the trunk 220 can be more precisely detected.

Additionally, as the other configuration of the detector 760, for example, a position sensor may be provided to detect the rotational angle of the crank 850, and the height of the trunk 220 may be detected on the basis of the rotational angle of the crank 850 detected by the position sensor. Additionally, the other configuration of the detector 760 may be, for example, graduations given to the lifting mechanism 800. According to the graduations, since a worker can visually confirm, the height of the trunk 220 can be more clearly detected.

Multi-Joint Robot Arm

As illustrated in FIG. 3, the multi-joint robot arm (first robot arm) 230 has a first shoulder portion (first arm portion) 231 linked to the trunk 220 via a joint mechanism. 410, a second shoulder portion (second arm portion) 232 linked to the first shoulder portion 231 via a joint mechanism 420, an upper arm portion (third arm portion) 233 linked to a tip of the second shoulder portion 232 via a twisting mechanism (joint mechanism) 430, a first forearm portion (fourth arm portion) 234 linked to a tip of the upper arm portion 233 via a joint mechanism 440, a second forearm portion (fifth arm portion) 235 linked to a tip of the first forearm portion 234 via a twisting mechanism (joint mechanism) 450, a wrist portion (sixth arm portion) 236 linked to a tip of the second forearm portion 235 via a joint mechanism 460, and a linking portion (seventh arm portion) 237 linked to a tip of the wrist portion 236 via a twisting mechanism (joint mechanism) 470. Additionally, the linking portion 237 is provided with a hand portion 238, and as illustrated in FIG. 4, an end effector 610 according to the work that the robot 200 is made to execute is mounted on the hand portion 238 via a force sensor 740.

Additionally, as illustrated in FIG. 3, the joint mechanism 410 rotates the first shoulder portion 231 around a rotational axis O2 orthogonal to the rotational axis O1 with respect to the trunk 220, the joint mechanism 420 rotates the second shoulder portion 232 around a rotational axis O3 orthogonal to the rotational axis O2 with respect to the first shoulder portion 231, the twisting mechanism 430 rotates the upper arm portion 233 around a rotational axis O4 orthogonal to the rotational axis O3 with respect to the second shoulder portion 232, the joint mechanism 440 rotates the first forearm portion 234 around a rotational axis O5 orthogonal to the rotational axis O4 with respect to the upper arm portion 233, the twisting mechanism 450 rotates the second forearm portion 235 around a rotational axis O6 orthogonal to the rotational axis O5 with respect to the first forearm portion 234, the joint mechanism 460 rotates the wrist portion 236 around a rotational axis O7 orthogonal to the rotational axis O6 with respect to the second forearm portion 235, and the twisting mechanism. 470 rotates the linking portion 237 around a rotational axis O8 orthogonal to the rotational axis O7 with respect to the wrist portion 236. According to such a multi-joint robot arm 230, bending and stretching of joints (a shoulder, an elbow, a wrist) and twisting of an upper arm and a forearm can be realized, similar to a human arm, with a relatively simple configuration.

Although the configurations of the joint mechanism 410, the joint mechanism 420, the twisting mechanism 430, the joint mechanism 440, the twisting mechanism 450, the joint mechanism 460, and the twisting mechanism 470 are not particularly limited, respectively, these configurations are the same as the configuration of the aforementioned joint mechanism 310. That is, as illustrated in FIG. 5, the joint mechanism 410 has a motor 411 as a driving source, a reduction gear (not illustrated) that reduces the rotating speed of the motor 411, and a position sensor 412 that detects the rotational angle of the motor 411. Additionally, the joint mechanism 420 has a motor 421 as a driving source, a reduction gear (not illustrated) that reduces the rotating speed of the motor 421, and a position sensor 422 that detects the rotational angle of the motor 421. Additionally, the twisting mechanism 430 has a motor 431 as a driving source, a reduction gear (not illustrated) that reduces the rotating speed of the motor 431, and a position sensor 432 that detects the rotational angle of the motor 431. Additionally, the joint mechanism 440 has a motor 441 as a driving source, a reduction gear (not illustrated) that reduces the rotating speed of the motor 441, and a position sensor 442 that detects the rotational angle of the motor 441. Additionally, the twisting mechanism 450 has a motor 451 as a driving source, a reduction gear (not illustrated) that reduces the rotating speed of the motor 451, and a position sensor 452 that detects the rotational angle of the motor 451. Additionally, the joint mechanism 460 has a motor 461 as a driving source, a reduction gear (not illustrated) that reduces the rotating speed of the motor 461, and a position sensor 462 that detects the rotational angle of the motor 461. Additionally, the twisting mechanism 470 has a motor 471 as a driving source, a reduction gear (not illustrated) that reduces the rotating speed of the motor 471, and a position sensor 472 that detects the rotational angle of the motor 471.

The multi-joint robot arm (second robot arm) 240 has the same configuration as the aforementioned multi-joint robot arm 230. That is, as illustrated in FIG. 3, the multi-joint robot arm 240 has a first shoulder portion 241 linked to the trunk 220 via a joint mechanism 510, a second shoulder portion 242 linked to the first shoulder portion 241 via a joint mechanism 520, an upper arm portion 243 linked to a tip of the second shoulder portion 242 via a twisting mechanism (joint mechanism) 530, a first forearm portion 244 linked to a tip of the upper arm portion 243 via a joint mechanism 540, a second forearm portion 245 linked to a tip of the first forearm portion 244 via a twisting mechanism (joint mechanism) 550, a wrist portion 246 linked to a tip of the second forearm portion 245 via a joint mechanism 560, and a linking portion 247 linked to a tip of the wrist portion 246 via a twisting mechanism (joint mechanism) 570. Additionally, the linking portion 247 is provided with a hand portion 248, and an end effector 620 according to the work that the robot 200 is made to execute is mounted on the hand portion 248 via a force sensor 750.

Additionally, as illustrated in FIG. 3, the joint mechanism 510 rotates the first shoulder portion 241 around a rotational axis O2' orthogonal to the rotational axis O1 with respect to the trunk 220, the joint mechanism 520 rotates the second shoulder portion 242 around a rotational axis O3' orthogonal to the rotational axis O2' with respect to the first shoulder portion 241, the twisting mechanism 530 rotates the upper arm portion 243 around a rotational axis O4' orthogonal to the rotational axis O3' with respect to the second shoulder portion 242, the joint mechanism. 540 rotates the first forearm portion 244 around a rotational axis O5' orthogonal to the rotational axis O4' with respect to the upper arm portion 243, the twisting mechanism 550 rotates the second forearm portion 245 around a rotational axis O6' orthogonal to the rotational axis O5' with respect to the first forearm portion 244, the joint mechanism 560 rotates the wrist portion 246 around a rotational axis O7' orthogonal to the rotational axis O6' with respect to the second forearm portion 245, and the twisting mechanism 570 rotates the linking portion 247 around a rotational axis O8' orthogonal to the rotational axis O7' with respect to the wrist portion 246. According to such a multi-joint robot arm 240, bending and stretching of joints and twisting of an upper arm and a forearm can be realized, similar to a human arm, with a relatively simple configuration.

Although the configurations of the joint mechanism 510, the joint mechanism 520, the twisting mechanism 530, the joint mechanism 540, the twisting mechanism 550, the joint mechanism 560, and the twisting mechanism 570 are not particularly limited, respectively, these configurations are the same as the configuration of the aforementioned joint mechanism 310. That is, as illustrated in FIG. 5, the joint mechanism 510 has a motor 511 as a driving source, a reduction gear (not illustrated) that reduces the rotating speed of the motor 511, and a position sensor 512 that detects the rotational angle of the motor 511. Additionally, the joint mechanism 520 has a motor 521 as a driving source, a reduction gear (not illustrated) that reduces the rotating speed of the motor 521, and a position sensor 522 that detects the rotational angle of the motor 521. Additionally, the twisting mechanism 530 has a motor 531 as a driving source, a reduction gear (not illustrated) that reduces the rotating speed of the motor 531, and a position sensor 532 that detects the rotational angle of the motor 531. Additionally, the joint mechanism 540 has a motor 541 as a driving source, a reduction gear (not illustrated) that reduces the rotating speed of the motor 541, and a position sensor 542 that detects the rotational angle of the motor 541. Additionally, the twisting mechanism 550 has a motor 551 as a driving source, a reduction gear (not illustrated) that reduces the rotating speed of the motor 551, and a position sensor 552 that detects the rotational angle of the motor 551. Additionally, the joint mechanism 560 has a motor 561 as a driving source, a reduction gear (not illustrated) that reduces the rotating speed of the motor 561, and a position sensor 562 that detects the rotational angle of the motor 561. Additionally, the twisting mechanism 570 has a motor 571 as a driving source, a reduction gear (not illustrated) that reduces the rotating speed of the motor 571, and a position sensor 572 that detects the rotational angle of the motor 571.

End Effectors

The end effector 610 or 620 to be attached to the tip of the multi-joint robot arm 230 or 240 has, for example, a function of gripping an object. Although the configuration of the end effector 610 or 620 varies depending on the work that the end effector is made to perform, for example as illustrated in FIG. 4, a configuration in which the end effector has a first finger 611 or 621 and a second finger 612 or 622 can be adopted. In the end effector 610 or 620 having such a configuration, an object can be gripped by adjusting the separation distance between the first finger 611 or 621 and the second finger 612 or 622.

The force sensor 740 or 750 arranged between the hand portion 238 or 248 and the end effector 610 or 620 has the function of detecting an external force applied to the end effector 610 or 620. Then, by feeding back the force detected by the force sensor 740 or 750 to the robot control device 900, the robot 200 can more precisely perform work. Additionally, the contact of the end effector 610 or 620 with the obstacle, or the like can be detected by the force or moment detected by the force sensor 740 or 750. Therefore, an obstacle avoidance operation, an object damage avoidance operation, or the like can be easily performed. Such force sensors 740 and 750 are not particularly limited, and well-known force sensors can be used if a force component and a moment component of each axis of three axes that are orthogonal to each other can be detected.

In addition, the end effectors 610 and 620 are not limited to the configurations as described above and can be replaced depending on intended work. For example, the end effectors may grip, lift, hoist, or suction an object, or perform processing on an object. That is, the end effectors 610 and 620 may be the aforementioned hands, and besides, may be hooks, suction disks, or the like. Furthermore, one arm may be provided with a plurality of the end effectors.

Angular Velocity Sensor

As illustrated in FIG. 1, the robot 200 is provided with three angular velocity sensors 710, 720, and 730. The angular velocity sensor 710 is arranged at the trunk 220, the angular velocity sensor 720 is arranged at the multi-joint robot arm 230, and the angular velocity sensor 730 is arranged at the multi-joint robot arm 240. The angular velocity sensors 710, 720, and 730 are respectively triaxial angular velocity sensors that can independently detect angular velocities $\omega x$, $\omega y$, and $\omega z$ around the respective axes of three axes (an x-axis, a y-axis, and z axis) that are orthogonal to each other. In addition, in the present embodiment, although the angular velocity sensors 720 and 730 are respectively arranged for elbows of the multi-joint robot arms 230 and 240, the arrangement of these sensors are not particularly limited.

The angular velocity sensors 710, 720, and 730 are not particularly limited if the angular velocities $\omega x$, $\omega y$, and $\omega z$ around the respective axes of the three axes (the x-axis, the y-axis, and the z-axis) that are orthogonal to each other can be detected, respectively. For example, well-known angular velocity sensors using a crystal substrate can be used. Additionally, material costs can be reduced by making the angular velocity sensors 710, 720, and 730 have the same configuration as each other.

The angular velocities (analog signals) detected by the angular velocity sensors 710, 720, and 730 are amplified by amplifiers, are then converted to digital signals by an A/D conversion circuit, and are thereafter transmitted to the robot control device 900.

Robot Control Device

Here, the robot control device 900 computes target positions of the multi-joint robot arms 230 and 240 on the basis of the contents of the processing that the robot 200 performs, and generates tracks for moving the multi-joint robot arms 230 and 240 to the target positions. Then, the robot control device 900 independently controls the respective motors 311, 411 to 471, and 511 to 571 so that the trunk 220 and the multi-joint robot arms 230 and 240 move along the generated tracks.

As illustrated in FIG. 5, specifically, the robot control device 900 has a first driving source controller 901 that controls the driving of the motor 311 (trunk 220), a second driving source controller 902 that controls the driving of the motor 411 (first shoulder portion 231), a third driving source controller 903 that controls the driving of the motor 421 (second shoulder portion 232), a fourth driving source controller 904 that controls the driving of the motor 431 (upper arm portion 233), a fifth driving source controller 905 that controls the driving of the motor 441 (first forearm portion 234), a sixth driving source controller 906 that controls the driving of the motor 451 (second forearm portion 235), a seventh driving source controller 907 that controls the driving of the motor 461 (wrist portion 236), an eighth driving source controller 908 that controls the driving of the motor 471 (linking portion 237), a ninth driving source controller 909 that controls the driving of the motor 511 (first shoulder portion 241), a tenth driving source controller 910 that controls the driving of the motor 521 (second shoulder portion 242), an eleventh driving source controller 911 that controls the driving of the motor 531 (upper arm portion 243), a twelfth driving source controller 912 that controls the driving of the motor 541 (first forearm portion 244), a thirteenth driving source controller (controller) 913 that controls the driving of the motor 551 (second forearm portion 245), a fourteenth driving source controller 914 that controls the driving of the motor 561 (wrist portion 246), and a fifteenth driving source controller 915 that controls the driving of the motor 571 (linking portion 247).

Additionally, the robot control device 900 has a setting receiving unit 920 that receives set values input by the input device 270. The first to fifteenth driving source controllers 901 to 915, in principle, control the motors 311, 411 to 471, and 511 to 571 on the basis of the set values received by the setting receiving unit 920.

Next, the configuration of the first to fifteenth driving source controllers 901 to 915 will be described. Here, since the second to eighth driving source controllers 902 to 908 that control the driving of the multi-joint robot arm 230, and the ninth to fifteenth driving source controllers 909 to 915 that control the driving of the multi-joint robot arm 240 have the same configuration, the first driving source controller 901 and the second to eighth driving source controllers 902 to 908 will be described below, and the description of the ninth to fifteenth driving source controllers 909 to 915 will be omitted.

First Driving Source Controller

Figure 6:
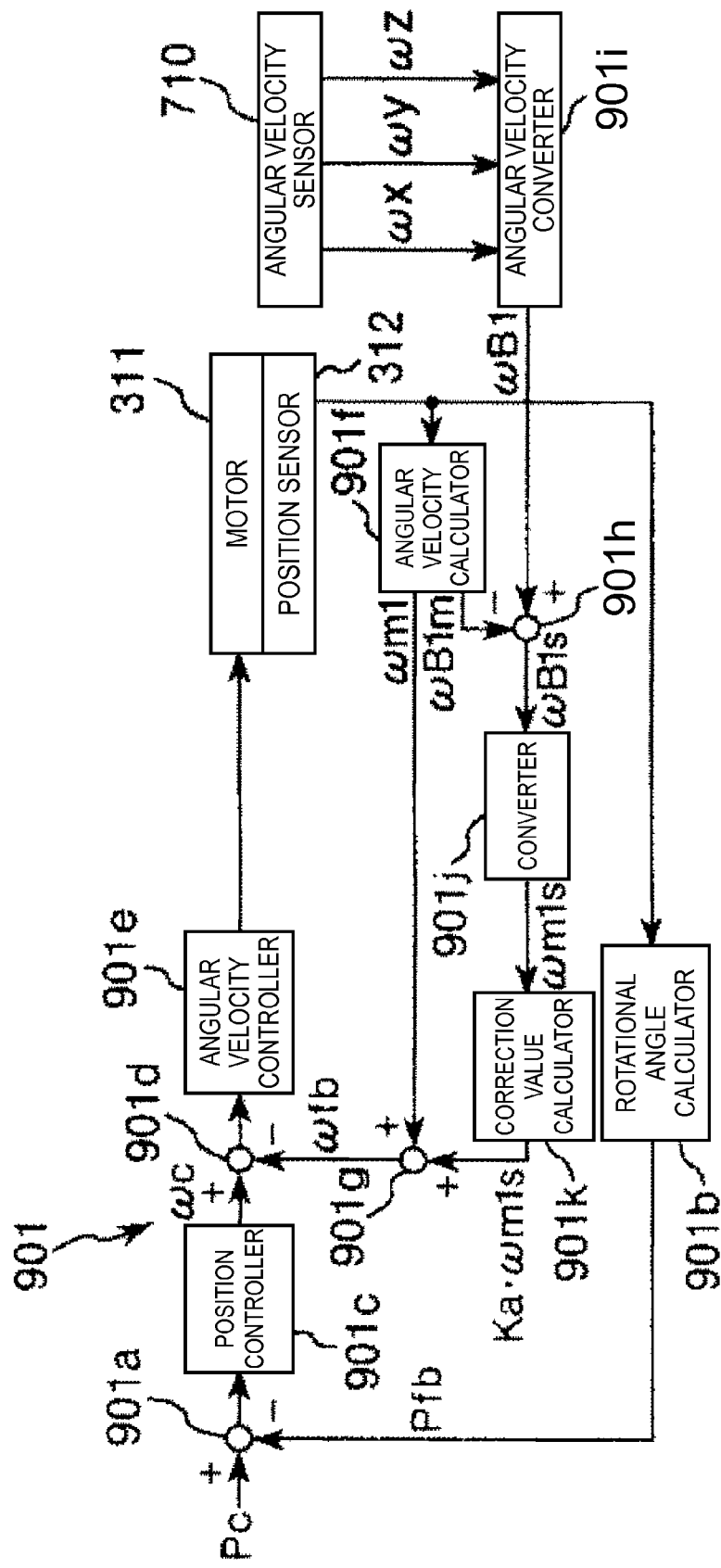
FIG. 6 is a block diagram illustrating the drive control of the robot system illustrated in FIG. 1.

As illustrated in FIG. 6, the first driving source controller 901 has a subtractor 901a, a rotational angle calculator 901b, a position controller 901c, a subtractor 901d, an angular velocity controller 901e, an angular velocity calculator 901f, an adder 901g, a subtractor 901h, an angular velocity converter 901i, a converter 901j, and a correction value calculator 901k.

In addition to a position command Pc of the motor 311, detection signals are input from the position sensor 312 and the angular velocity sensor 710 to the first driving source controller 901. The first driving source controller 901 drives the motor 311 through a feedback control using the respective detection signals so that a rotational angle (position feedback value Pfb) of the motor 311 calculated from the detection signal of the position sensor 312 becomes the position command Pc and an angular velocity feedback value ωfb to be described below becomes an angular velocity command ωc to be described below.

That is, the position command Pc is input to the subtractor 901a, and the position feedback value Pfb to be described below is input from the rotational angle calculator 901b. In the rotational angle calculator 901b, the number of pulses input from the position sensor 312 is counted, and the rotational angle of the motor 311 according to the counted value is output to the subtractor 901a as the position feedback value Pfb. The subtractor 901a outputs a deviation (value obtained by subtracting the position feedback value Pfb from the target value of the rotational angle of the motor 311) between the position command Pc and the position feedback value Pfb to the position controller 901c.

The position controller 901c performs predetermined computation processing using the deviation input from the subtractor 901a, a proportional gain that is a predetermined coefficient, or the like and computes a target value of the angular velocity of the motor 311 according to the deviation. The position controller 901c outputs a signal showing the target value (command value) of the angular velocity of the motor 311 to the subtractor 901d as the angular velocity command ωc. In the present embodiment, a proportional control (P control) is performed as the feedback control. However, the feedback control is not limited to this.

The angular velocity command ωc and the angular velocity feedback value ωfb to be described below are input to the subtractor 901d. The subtractor 901d outputs a deviation (value obtained by subtracting the angular velocity feedback value ωfb from the target value of the angular velocity of the motor 311) between the angular velocity command ωc and the angular velocity feedback value ωfb to the angular velocity controller 901e.

The angular velocity controller 901e performs predetermined computation processing including integration, using the deviation input from the subtractor 901d, a proportional gain (position proportional gain) that is a predetermined coefficient, an integration gain, or the like, thereby generating a driving signal (driving current) of the motor 311 according to the deviation, and supplies the driving signal to the motor 311 via a motor driver. In the present embodiment, a PI control is performed as the feedback control. However, the feedback control is not limited to this.

In this way, the feedback control is performed and the driving current of the motor 311 is controlled so that the position feedback value Pfb is as equal to the position command Pc as possible and the angular velocity feedback value ωfb is as equal to the angular velocity command ωc as possible.

Next, the angular velocity feedback value ωfb in the first driving source controller 901 will be described.

In the angular velocity calculator 901f, an angular velocity ωm1 of the motor 311 is calculated on the basis of the frequency of a pulse signal input from the position sensor 312, and the angular velocity ωm1 is output to the adder 901g.

Additionally, in the angular velocity calculator 901f, an angular velocity ωB1m of the trunk 220 around the rotational axis O1 is calculated on the basis of the frequency of the pulse signal input from the position sensor 312, and the angular velocity ωB1m is output to the subtractor 901h. In addition, the angular velocity ωB1m is a value obtained by dividing the angular velocity ωm1 by a reduction ratio in the joint mechanism 310.

Additionally, angular velocities ωx, ωy, and ωz are respectively detected from the angular velocity sensor 710, and the respective angular velocities ωx, ωy, and ωz are input to the angular velocity converter 901i. In the angular velocity converter 901i, an angular velocity ωB1 of the trunk 220 around the rotational axis O1 is calculated from the input angular velocities ωx, ωy, and ωz, and the angular velocity ωB1 is output to the subtractor 901h.

The angular velocity ωB1 and the angular velocity ωB1m are input to the subtractor 901h, and the subtractor 901h outputs a value ωB1s (=ωB1−ωB1m) obtained by subtracting the angular velocity ωB1m from the angular velocity ωB1 to the converter 901j. The value ωB1s is equivalent to a vibration component (vibration angular velocity) of the angular velocity of the trunk 220 around the rotational axis O1. Hereinafter, ωB1s is referred to as a vibration angular velocity. In the present embodiment, a feedback control of multiplying the vibration angular velocity $\omega B1s$ by a gain Ka to be described below and returning the multiplied vibration angular velocity to an input side of the motor 311 is performed. Specifically, the feedback control is performed on the motor 311 so that the vibration angular velocity $\omega B1s$ becomes as close to 0 as possible. Accordingly, the vibration in the robot 200 can be suppressed. In addition, the angular velocity of the motor 311 is controlled in this feedback control.

The converter 901*j* converts the vibration angular velocity $\omega B1s$ to an angular velocity $\omega m1s$ in the motor 311, and outputs the angular velocity $\omega m1s$ to the correction value calculator 901*k*. This conversion can be obtained by multiplying the vibration angular velocity $\omega B1s$ by the reduction ratio in the joint mechanism 310.

The correction value calculator 901*k* multiplies the angular velocity $\omega m1s$ by a gain (feedback gain) Ka that is a predetermined coefficient, obtains a correction value $Ka \cdot \omega m1s$, and outputs the correction value $Ka \cdot \omega m1s$ to the adder 901*g*.

The angular velocity $\omega m1$ and the correction value $Ka \cdot \omega m1s$ are input to the adder 901*g*. The adder 901*g* outputs an additional value of the angular velocity $\omega m1$ and the correction value $Ka \cdot \omega m1s$ to the subtractor 901*d* as the angular velocity feedback value $\omega fb$. In addition, the subsequent operation is as mentioned above.

Second Driving Source Controller

Figure 7:
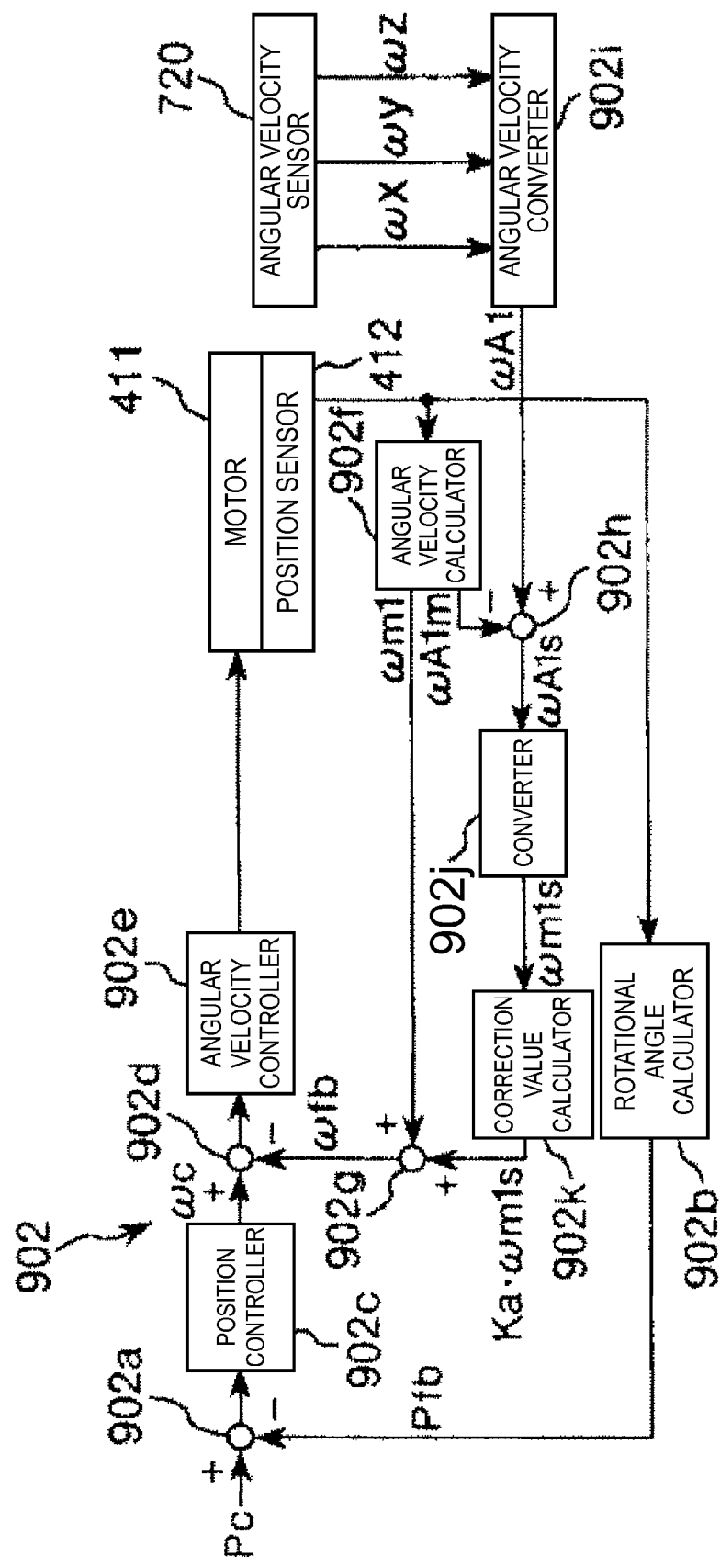
FIG. 7 is a block diagram illustrating the drive control of the robot system illustrated in FIG. 1.

As illustrated in FIG. 7, the second driving source controller 902 has a subtractor 902*a*, a rotational angle calculator 902*b*, a position controller 902*c*, a subtractor 902*d*, an angular velocity controller 902*e*, an angular velocity calculator 902*f*, an adder 902*g*, a subtractor 902*h*, an angular velocity converter 902*i*, a converter 902*j*, and a correction value calculator 902*k*.

In addition to a position command Pc of the motor 411, detection signals are input from the position sensor 412 and the angular velocity sensor 720 to the second driving source controller 902. The second driving source controller 902 drives the motor 411 through a feedback control using the respective detection signals so that a rotational angle (position feedback value Pfb) of the motor 411 calculated from the detection signal of the position sensor 412 becomes the position command Pc and an angular velocity feedback value $\omega fb$ to be described below becomes an angular velocity command $\omega c$ to be described below.

That is, the position command Pc is input to the subtractor 902*a*, and the position feedback value Pfb to be described below is input from the rotational angle calculator 902*b*. In the rotational angle calculator 902*b*, the number of pulses input from the position sensor 412 is counted, and the rotational angle of the motor 411 according to the counted value is output to the subtractor 902*a* as the position feedback value Pfb. The subtractor 902*a* outputs a deviation (value obtained by subtracting the position feedback value Pfb from the target value of the rotational angle of the motor 411) between the position command Pc and the position feedback value Pfb to the position controller 902*c*.

The position controller 902*c* performs predetermined computation processing using the deviation input from the subtractor 902*a*, a proportional gain that is a predetermined coefficient, or the like and computes a target value of the angular velocity of the motor 411 according to the deviation. The position controller 902*c* outputs a signal showing the target value (command value) of the angular velocity of the motor 411 to the subtractor 902*d* as the angular velocity command $\omega c$. In the present embodiment, a proportional control (P control) is performed as the feedback control. However, the feedback control is not limited to this.

The angular velocity command $\omega c$ and the angular velocity feedback value $\omega fb$ to be described below are input to the subtractor 902*d*. The subtractor 902*d* outputs a deviation (value obtained by subtracting the angular velocity feedback value $\omega fb$ from the target value of the angular velocity of the motor 411) between the angular velocity command $\omega c$ and the angular velocity feedback value $\omega fb$ to the angular velocity controller 902*e*.

The angular velocity controller 902*e* performs predetermined computation processing including integration, using the deviation input from the subtractor 902*d*, a proportional gain (position proportional gain) that is a predetermined coefficient, an integration gain, or the like, thereby generating a driving signal (driving current) of the motor 411 according to the deviation, and supplies the driving signal to the motor 411 via a motor driver. In the present embodiment, a PI control is performed as the feedback control. However, the feedback control is not limited to this.

In this way, the feedback control is performed and the driving current of the motor 411 is controlled so that the position feedback value Pfb is as equal to the position command Pc as possible and the angular velocity feedback value $\omega fb$ is as equal to the angular velocity command $\omega c$ as possible.

Next, the angular velocity feedback value $\omega fb$ in the second driving source controller 902 will be described.

In the angular velocity calculator 902*f*, an angular velocity $\omega m1$ of the motor 411 is calculated on the basis of the frequency of a pulse signal input from the position sensor 412, and the angular velocity $\omega m1$ is output to the adder 902*g*.

Additionally, in the angular velocity calculator 902*f*, an angular velocity $\omega A1m$ of the first shoulder portion 241 around the rotational axis O2 is calculated on the basis of the frequency of the pulse signal input from the position sensor 412, and the angular velocity $\omega A1m$ is output to the subtractor 902*h*. In addition, the angular velocity $\omega A1m$ is a value obtained by dividing the angular velocity $\omega m1$ by a reduction ratio in the joint mechanism 410.

Additionally, angular velocities $\omega x$, $\omega y$, and $\omega z$ are respectively detected from the angular velocity sensor 720, and the respective angular velocities $\omega x$, $\omega y$, and $\omega z$ are input to the angular velocity converter 902*i*. In the angular velocity converter 902*i*, an angular velocity $\omega A1$ of the first shoulder portion 241 around the rotational axis O2 is calculated from the input angular velocities $\omega x$, $\omega y$, and $\omega z$, and the angular velocity $\omega A1$ is output to the subtractor 902*h*. In the angular velocity converter 902*i*, coordinate axis transformation referred to as the Jacob's transformation is performed if necessary.

The angular velocity $\omega A1$ and the angular velocity $\omega A1m$ are input to the subtractor 902*h*, and the subtractor 902*h* outputs a value $\omega A1s$ ($=\omega A1-\omega A1m$) obtained by subtracting the angular velocity $\omega A1m$ from the angular velocity $\omega A1$ to the converter 902*j*. The value $\omega A1s$ is equivalent to a vibration component (vibration angular velocity) of the angular velocity of the first shoulder portion 241 around the rotational axis O2. Hereinafter, $\omega A1s$ is referred to as a vibration angular velocity. In the present embodiment, a feedback control of multiplying the vibration angular velocity $\omega A1s$ by a gain Ka to be described below and returning the multiplied vibration angular velocity to an input side of the motor 411 is performed. Specifically, a feedback control is performed on the motor 411 so that the vibration angular velocity $\omega A1s$ becomes as close to 0 as possible. Accordingly, the vibration in the robot 200 can be suppressed. In addition, the angular velocity of the motor 411 is controlled in this feedback control.

The converter 902j converts the vibration angular velocity $\omega A1s$ to an angular velocity $\omega m1s$ in the motor 411, and outputs the angular velocity $\omega m1s$ to the correction value calculator 902k. This conversion can be obtained by multiplying the vibration angular velocity $\omega A1s$ by the reduction ratio in the joint mechanism 410.

The correction value calculator 902k multiplies the angular velocity $\omega m1s$ by a gain (feedback gain) Ka that is a predetermined coefficient, obtains a correction value Ka·$\omega m1s$, and outputs the correction value Ka·$\omega m1s$ to the adder 902g.

The angular velocity $\omega m1$ and the correction value Ka·$\omega m1s$ are input to the adder 902g. The adder 902g outputs an additional value of the angular velocity $\omega m1$ and the correction value Ka·$\omega m1s$ to the subtractor 902d as the angular velocity feedback value $\omega fb$. In addition, the subsequent operation is as mentioned above.

Third Driving Source Controller

Figure 8:
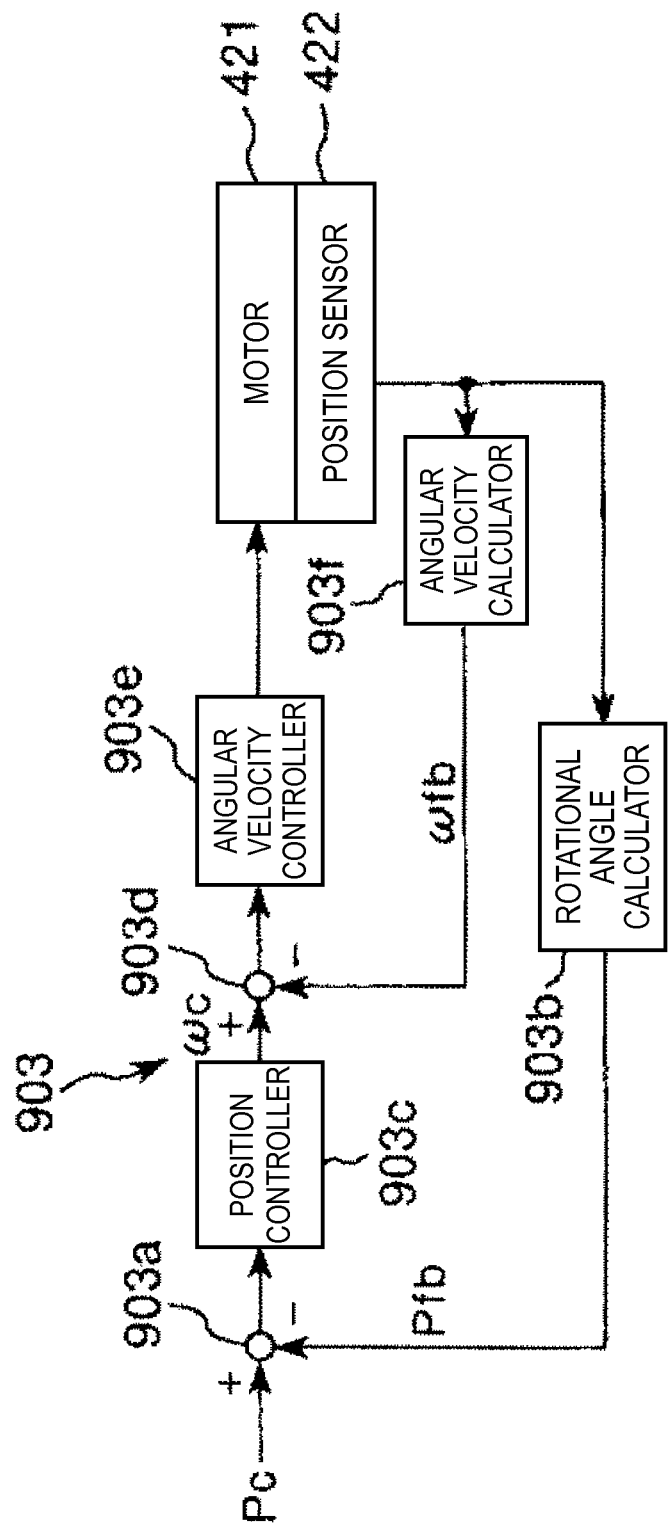
FIG. 8 is a block diagram illustrating the drive control of the robot system illustrated in FIG. 1.

As shown in FIG. 8, the third driving source controller 903 has a subtractor 903a, a rotational angle calculator 903b, a position controller 903c, a subtractor 903d, an angular velocity controller 903e, and an angular velocity calculator 903f. In addition to a position command Pc of the motor 421, a detection signal is input from the position sensor 422 to the third driving source controller 903. The third driving source controller 903 drives the motor 421 through a feedback control using the respective detection signals so that a rotational angle (position feedback value Pfb) of the motor 421 calculated from the detection signal of the position sensor 422 becomes the position command Pc and an angular velocity feedback value $\omega fb$ to be described below becomes an angular velocity command $\omega c$ to be described below.

That is, the position command Pc is input to the subtractor 903a, and the position feedback value Pfb to be described below is input from the rotational angle calculator 903b. In the rotational angle calculator 903b, the number of pulses input from the position sensor 422 is counted, and the rotational angle of the motor 421 according to the counted value is output to the subtractor 903a as the position feedback value Pfb. The subtractor 903a outputs a deviation (value obtained by subtracting the position feedback value Pfb from the target value of the rotational angle of the motor 421) between the position command Pc and the position feedback value Pfb to the position controller 903c.

The position controller 903c performs predetermined computation processing using the deviation input from the subtractor 903a, a proportional gain that is a predetermined coefficient, or the like and computes a target value of the angular velocity of the motor 421 according to the deviation. The position controller 903c outputs a signal showing the target value (command value) of the angular velocity of the motor 421 to the subtractor 903d as the angular velocity command $\omega c$.

Additionally, in the angular velocity calculator 903f, the angular velocity of the motor 421 is calculated on the basis of the frequency of a pulse signal input from the position sensor 422, and the angular velocity is output to the subtractor 903d as the angular velocity feedback value $\omega fb$.

The angular velocity command $\omega c$ and the angular velocity feedback value $\omega fb$ are input to the subtractor 903d. The subtractor 903d outputs a deviation (value obtained by subtracting the angular velocity feedback value $\omega fb$ from the target value of the angular velocity of the motor 421) between the angular velocity command $\omega c$ and the angular velocity feedback value $\omega fb$ to the angular velocity controller 903e.

The angular velocity controller 903e performs predetermined computation processing including integration, using the deviation input from the subtractor 903d, a proportional gain (position proportional gain) that is a predetermined coefficient, an integration gain, or the like, thereby generating a driving signal of the motor 421 according to the deviation, and supplies the driving signal to the motor 421 via a motor driver.

Accordingly, the feedback control is performed and the driving of the motor 421 is controlled so that the position feedback value Pfb is as equal to the position command Pc as possible and the angular velocity feedback value $\omega fb$ is as equal to the angular velocity command $\omega c$ as possible.

Fourth Driving Source Controller

Figure 9:
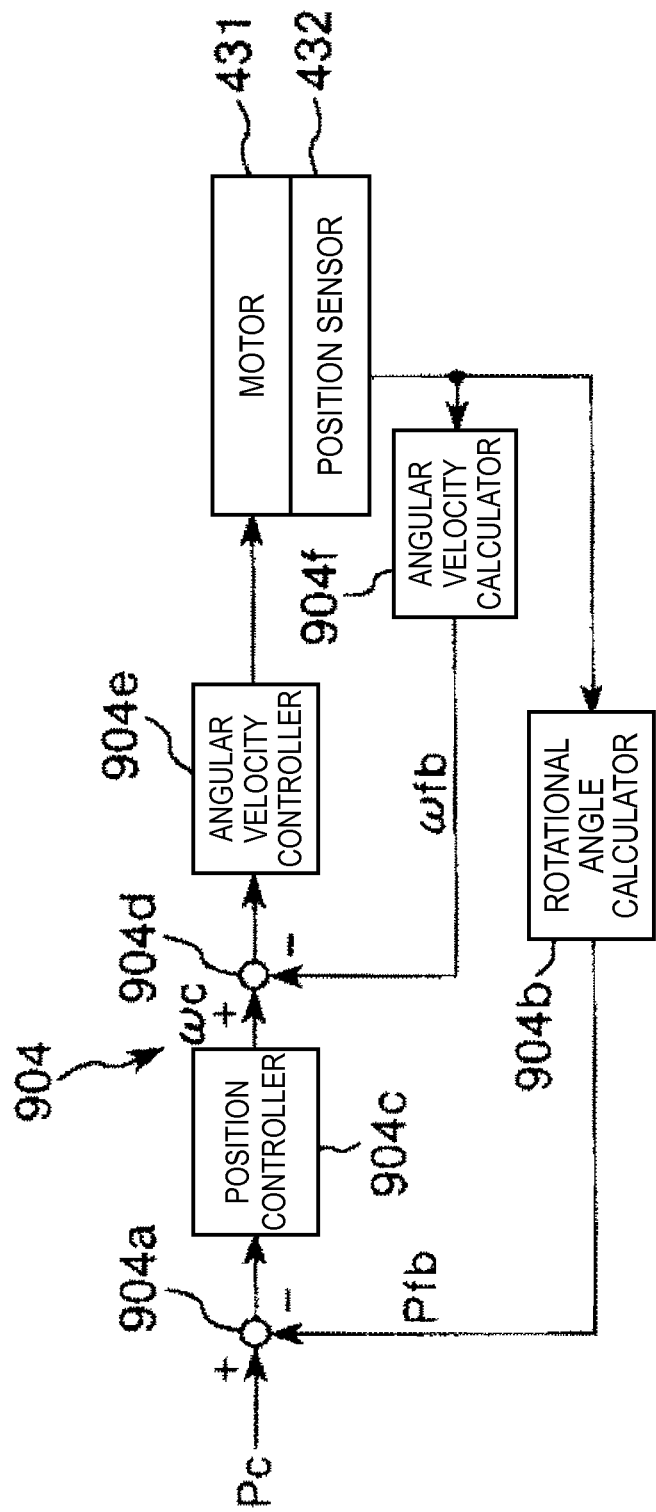
FIG. 9 is a block diagram illustrating the drive control of the robot system illustrated in FIG. 1.

As shown in FIG. 9, the fourth driving source controller 904 has a subtractor 904a, a rotational angle calculator 904b, a position controller 904c, a subtractor 904d, an angular velocity controller 904e, and an angular velocity calculator 904f. In addition to a position command Pc of the motor 431, a detection signal is input from the position sensor 432 to the fourth driving source controller 904. The fourth driving source controller 904 drives the motor 431 through a feedback control using the respective detection signals so that a rotational angle (position feedback value Pfb) of the motor 431 calculated from the detection signal of the position sensor 432 becomes the position command Pc and an angular velocity feedback value $\omega fb$ becomes an angular velocity command $\omega c$. Since such a fourth driving source controller 904 is the same as the third driving source controller 903, the detailed description thereof will be omitted.

Fifth Driving Source Controller

Figure 10:
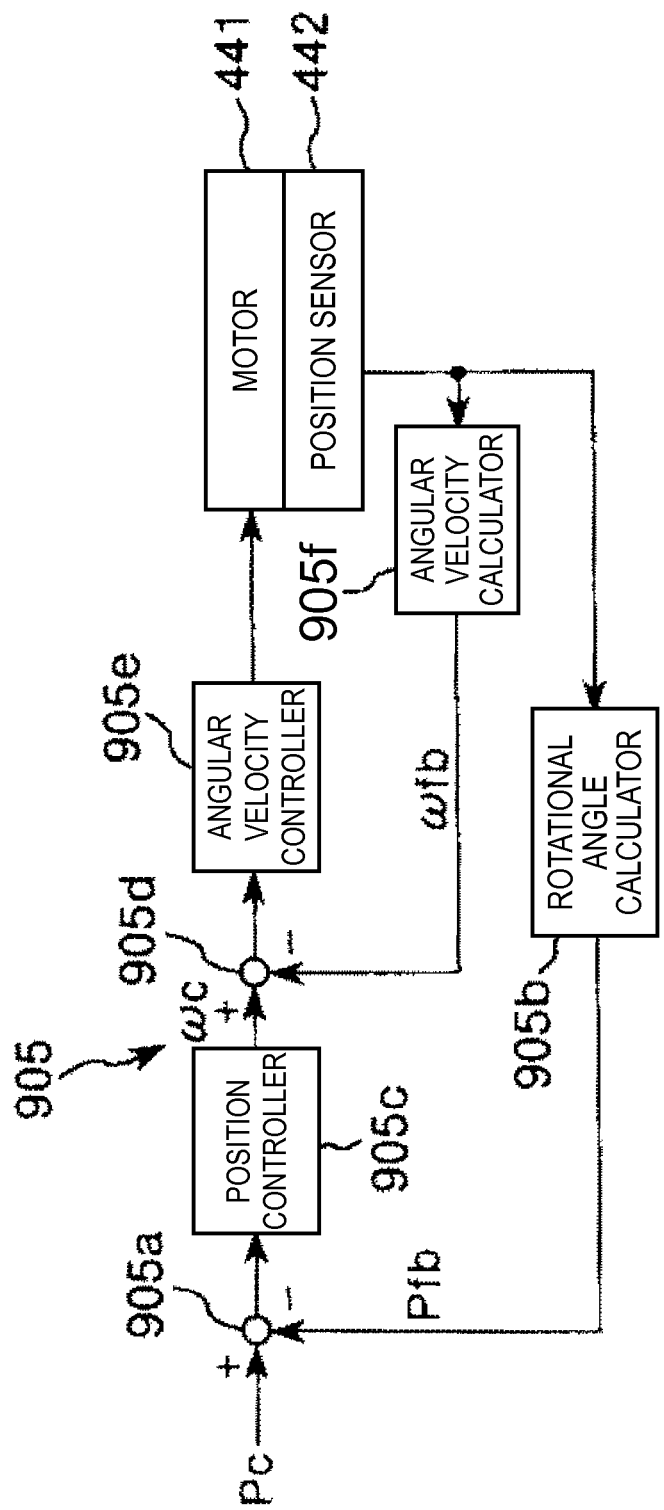
FIG. 10 is a block diagram illustrating the drive control of the robot system illustrated in FIG. 1.

As shown in FIG. 10, the fifth driving source controller 905 has a subtractor 905a, a rotational angle calculator 905b, a position controller 905c, a subtractor 905d, an angular velocity controller 905e, and an angular velocity calculator 905f. In addition to a position command Pc of the motor 441, a detection signal is input from the position sensor 442 to the fifth driving source controller 905. The fifth driving source controller 905 drives the motor 441 through a feedback control using the respective detection signals so that a rotational angle (position feedback value Pfb) of the motor 441 calculated from the detection signal of the position sensor 442 becomes the position command Pc and an angular velocity feedback value $\omega fb$ becomes an angular velocity command $\omega c$. Since such a fifth driving source controller 905 is the same as the third driving source controller 903, the detailed description thereof will be omitted.

Sixth Driving Source Controller

Figure 11:
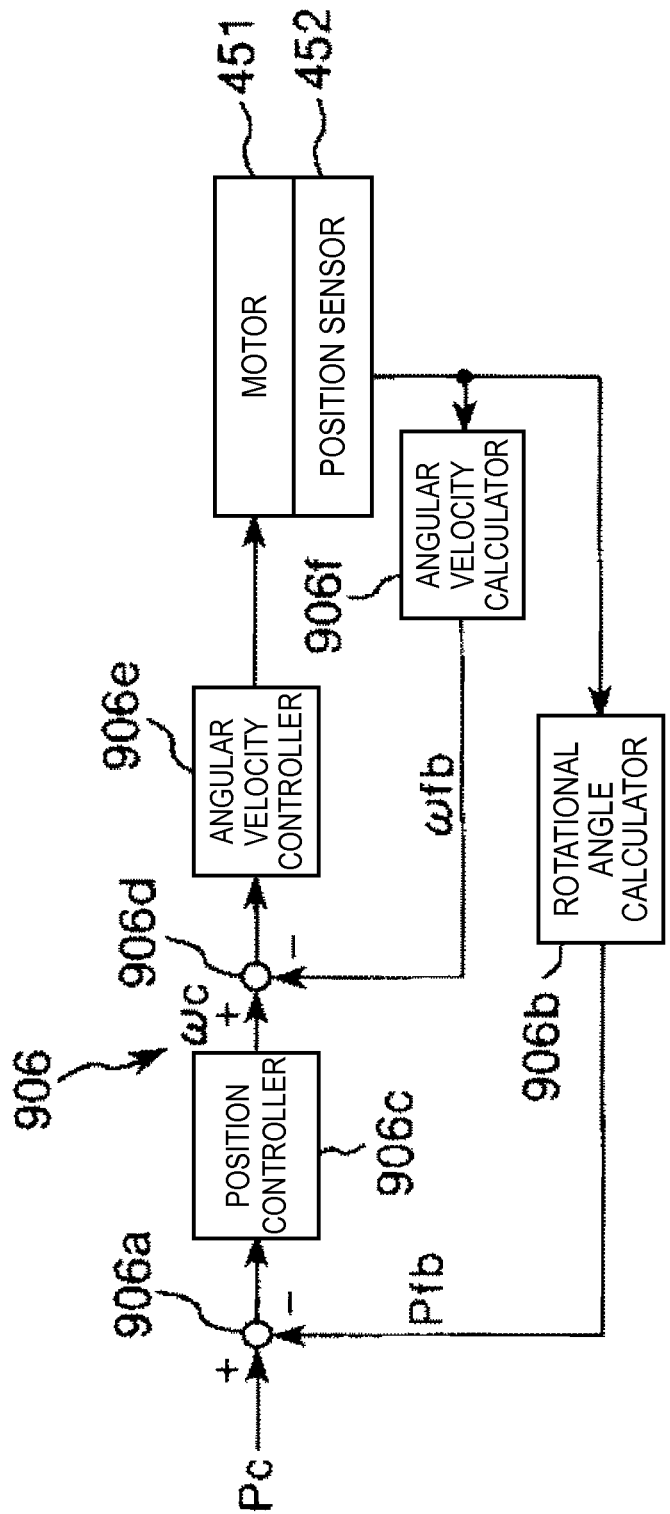
FIG. 11 is a block diagram illustrating the drive control of the robot system illustrated in FIG. 1.

As shown in FIG. 11, the sixth driving source controller 906 has a subtractor 906a, a rotational angle calculator 906b, a position controller 906c, a subtractor 906d, an angular velocity controller 906e, and an angular velocity calculator 906f. In addition to a position command Pc of the motor 451, a detection signal is input from the position sensor 452 to the sixth driving source controller 906. The sixth driving source controller 906 drives the motor 451 through a feedback control using the respective detection signals so that a rotational angle (position feedback value Pfb) of the motor 451 calculated from the detection signal of the position sensor 452 becomes the position command Pc and an angular velocity feedback value $\omega fb$ becomes an angular velocity command $\omega c$. Since such a sixth driving source controller 906 is the same as the third driving source controller 903, the detailed description thereof will be omitted.

Seventh Driving Source Controller

Figure 12:
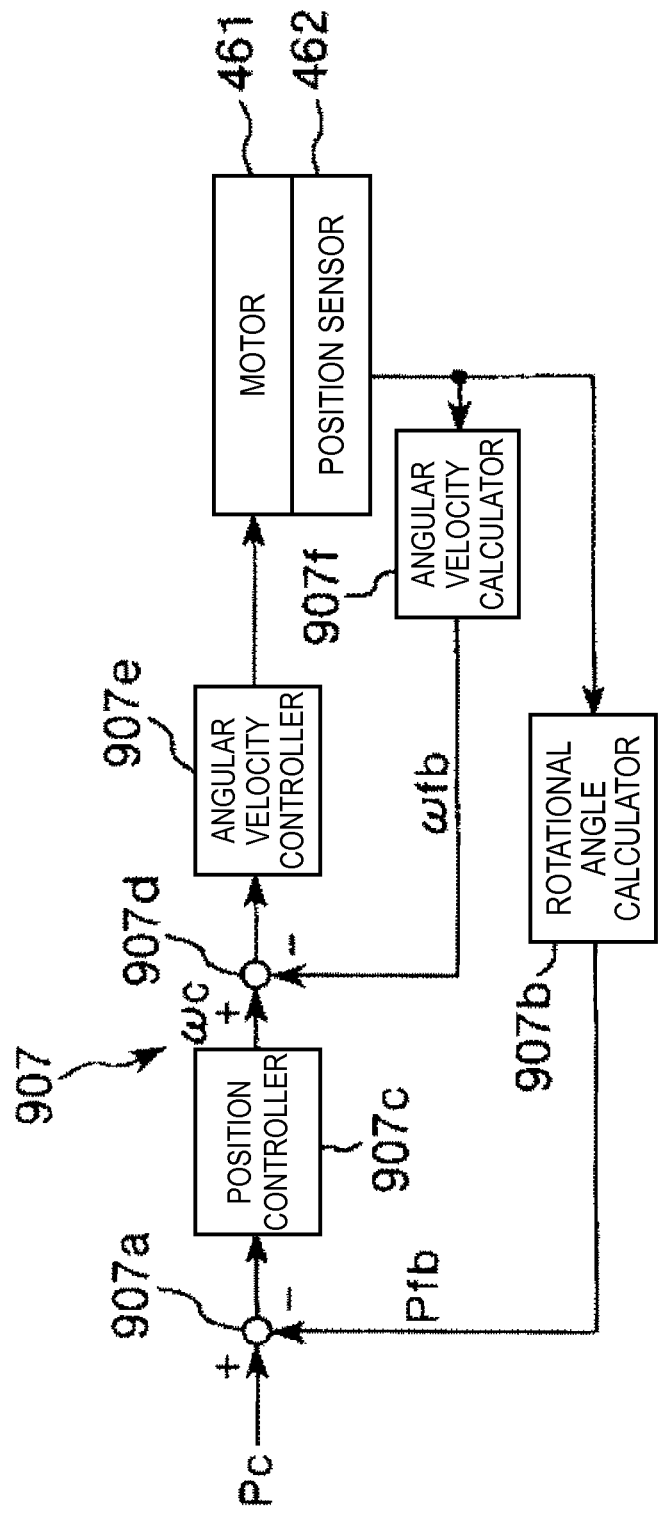
FIG. 12 is a block diagram illustrating the drive control of the robot system illustrated in FIG. 1.

As shown in FIG. 12, the seventh driving source controller 907 has a subtractor 907a, a rotational angle calculator 907b, a position controller 907c, a subtractor 907d, an angular velocity controller 907e, and an angular velocity calculator 907f. In addition to a position command Pc of the motor 461, a detection signal is input from the position sensor 462 to the seventh driving source controller 907. The seventh driving source controller 907 drives the motor 461 through a feedback control using the respective detection signals so that a rotational angle (position feedback value Pfb) of the motor 461 calculated from the detection signal of the position sensor 462 becomes the position command Pc and an angular velocity feedback value ωfb becomes an angular velocity command ωc. Since such a seventh driving source controller 907 is the same as the third driving source controller 903, the detailed description thereof will be omitted.

Eighth Driving Source Controller

Figure 13:
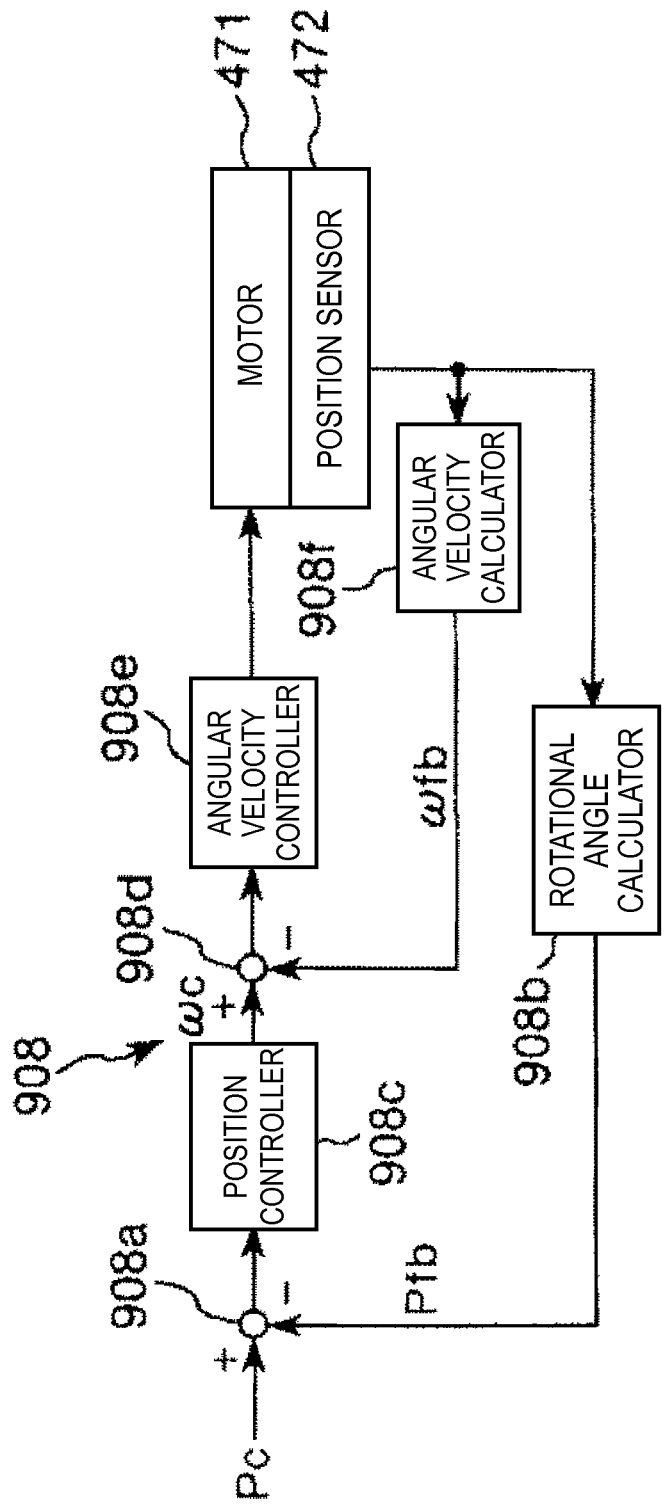
FIG. 13 is a block diagram illustrating the drive control of the robot system illustrated in FIG. 1.

As shown in FIG. 13, the eighth driving source controller 908 has a subtractor 908a, a rotational angle calculator 908b, a position controller 908c, a subtractor 908d, an angular velocity controller 908e, and an angular velocity calculator 908f. In addition to a position command Pc of the motor 471, a detection signal is input from the position sensor 472 to the eighth driving source controller 908. The eighth driving source controller 908 drives the motor 471 through a feedback control using the respective detection signals so that a rotational angle (position feedback value Pfb) of the motor 471 calculated from the detection signal of the position sensor 472 becomes the position command Pc and an angular velocity feedback value ωfb becomes an angular velocity command ωc. Since such an eighth driving source controller 908 is the same as the third driving source controller 903, the detailed description thereof will be omitted.

The basic configuration of the robot system 100 has been described above.

Next, particularly characteristic portions of the robot system 100 will be described.

In the robot system 100, the driving speeds of the trunk 220 and the respective multi-joint robot arms 230 and 240 vary according to the height (separation distance from the base 210) of the trunk 220. To comparatively describe when the trunk 220 is at the low position (first position) and when the trunk 220 is at the high position (second position), a time taken when the trunk 220 and the multi-joint robot arms 230 and 240 are made to perform the same movement (are moved on the same track) in a state where the trunk is at the high position becomes longer than that in a state where the trunk is at the low position. In addition, whether the trunk 220 is at the low position or at the high position is detected by the detector 760. Additionally, when the height of the trunk 220 is detected by the graduations as mentioned above, the height of the trunk 220 that a user has determined from the graduations can be input from the input device 270.

Since the trunk 220 at the high position is higher than that in the case of the low position and the lifting mechanism 800 extends, the rigidity of the robot 200 becomes low and vibration is apt to be generated in the robot 200. Thus, in the robot 200, a control is performed so that the time taken when the trunk 220 and the multi-joint robot arms 230 and 240 are made to perform the same movement at the high position becomes longer than that in the case of the low position, and accordingly, the vibration of the robot 200 in the state where the trunk is at the high position where vibration is apt to be generated, without sacrificing work speed at the low position where vibration is not easily generated is suppressed. Accordingly, the generation of the vibration of the robot 200 can be suppressed while suppressing a slowdown in the work speed of the robot 200.

Here, as mentioned above, the setting of the respective parts of the robot 200 can be changed from the input device 270. As items (setting items) of which the setting can be changed, for example, the accelerations (angular accelerations), decelerations (angular decelerations), velocities (angular velocities), and the like of the motor 311 used for the driving of the trunk 220 and the motors 411 to 471 and 511 to 571 used for the driving of the multi-joint robot arms 230 and 240 are included. Moreover, the respective setting items can be individually set at the low position and the high position. Therefore, the user is able to set the setting items in advance so that a time T2 becomes longer than a time T1.

If the setting items are under the same conditions at the low position and at the high position, in ordinary robots, the times T1 and T2 taken when the multi-joint robot arms 230 and 240 are made to perform the same movement become the same. However, in the robot 200, even if the setting items are under the same conditions at the low position and at the high position, the respective parts are controlled so that the time taken when the multi-joint robot arms are made to perform the same movement in the case of the high position becomes longer than that in the case of the low position. Accordingly, the generation of the vibration of the robot 200 can be more reliably suppressed while suppressing a slowdown in the work speed of the robot 200.

First, although the multi-joint robot arms 230 and 240 will be described, the control thereof is the same. Therefore, the multi-joint robot arm 230 will be representatively described below, and the description of the multi-joint robot arm 240 will be omitted.

The robot 200, for example as illustrated in FIG. 14, is configured such that, when the second shoulder portion 232 is rotated with respect to the first shoulder portion 231 from a stationary state Ps in which the multi-joint robot arm 230 is made stationary in a posture (predetermined posture) in which the multi-joint robot arm is stretched straight in a horizontal direction, and a tip of the multi-joint robot arm 230 is moved by a predetermined distance in the horizontal direction (a direction parallel to an installation surface) while maintaining the posture in which the arm is stretched straight and is brought into a target state Pe, the time (first time) T1 taken when the trunk 220 is at the low position and the time (second time) T2 taken when the trunk 220 is at the high position satisfy the relationship T1<T2. In addition, the times T1 and T2, as illustrated in FIG. 15, can be defined by t2−t1, respectively, when the time when a driving signal for bringing the multi-joint robot arm 230 into the target state Pe from the stationary state Ps is t1 and the time when the multi-joint robot arm 230 has first reached the target state Pe is t2.

Here, the stationary state Ps can be defined as, for example, a state where the motors 411 to 471 used for the driving of the multi-joint robot arm 230 are not driven. Additionally, the stationary state Ps can be defined as a state where the speed of a motion of the multi-joint robot arm 230 is 0 (the speed at a taught point is 0). Additionally, the stationary state Ps can also be defined as a state where the positional relationship between the multi-joint robot arm 230 and the installation surface does not change.

Additionally, the tip of the multi-joint robot arm 230 may be a tip of the hand portion 238, or may be a tip of the end effector 610 when the end effector 610 is attached to the hand portion 238.

In addition, it is preferable that, although not particularly limited, T2 is about 1.2T1 to 2T1 if the relationship T1<T2 is satisfied. Accordingly, the above effects can be effectively exhibited, and the movement of the multi-joint robot arm 230 at the high position can be prevented from being excessively delayed.

Additionally, in the aforementioned example, an example has been described in which the multi-joint robot arm 230 is moved from the stationary state Ps, in which the multi-joint robot arm is made stationary in the posture (predetermined posture) in which the multi-joint robot arm is stretched straight in the horizontal direction, by a predetermined distance in the horizontal direction while maintaining the posture in which the arm is stretched straight, and is brought into the target state Pe. However, the robot 200 is adapted to perform the control as described above when the multi-joint robot arm 230 is moved in directions (that is, the horizontal direction and a combined direction of the horizontal direction and the vertical direction) having a horizontal direction component (a direction orthogonal to the rotational axis O1).

Meanwhile, when the multi-joint robot arm 230 is moved in the vertical direction, the times T1 and T2 taken for bringing the multi-joint robot arm into the target state Pe from the stationary state Ps may not satisfy the relationship T1<T2 but may be T1=T2. That is, when the multi-joint robot arm 230 is moved in the vertical direction, the multi-joint robot arm may be brought into the target state Pe from the stationary state Ps in a given period of time irrespective of the height of the trunk 220. Since the inertia (force around the rotational axis O1) in a twist direction is not easily applied to the trunk 220 when the multi-joint robot arm 230 is moved in the vertical direction, vibration is not easily generated as compared to the movement in the horizontal direction. Accordingly, as described above, a decline in the processing efficiency of the robot 200 can be suppressed to a smaller value by adopting a configuration in which the multi-joint robot arm is brought into the target state Pe from the stationary state Ps in a given period of time irrespective of the height of the trunk 220 when the multi-joint robot arm 230 is moved in the vertical direction.

Additionally, in the aforementioned example, a case has been described where the multi-joint robot arm 230 is moved from the stationary state Ps, in which the multi-joint robot arm is stretched straight in the horizontal direction with the multi-joint robot arm straight, and is brought into the target state Pe. However, the stationary state Ps and the target state Pe of the multi-joint robot arm 230 are not particularly limited, and can be applied to all postures that can be realized by the multi-joint robot arm 230. For example, a posture in which an elbow is bent such that the upper arm portion is lowered in the vertical direction and the forearm portion is directed to the horizontal direction may be the stationary state Ps, and a posture in which the upper arm portion is twisted from the stationary state and the forearm portion is moved in the horizontal direction may be the target state Pe. Additionally, a posture in which the forearm portion is moved in the horizontal direction with respect to the upper arm portion by bending an elbow from the stationary state Ps where the arm is stretched straight may be the target state Pe. Additionally, the shape (bending manner) of the multi-joint robot arm 230 may change in the stationary state Ps and the target state Pe.

Next, methods for satisfying T1<T2 will be described using specific examples. One of specific methods of satisfying T1<T2 includes a method of making the acceleration and deceleration of the motor 421 in the case of the high position lower than those in the case of the low position. Accordingly, T1<T2 can be realized through simple control. In addition, this method is sufficient if at least one of the acceleration and the deceleration in the case of the high position is made lower than that in the case of the low position.

Another method includes a method of making a position proportional gain used with the angular velocity controller 903e of the third driving source controller 903 that controls the driving of the motor 421 in the case of the high position lower than that in the case of the low position. Accordingly, the reactivity of the motor 421 to a driving signal to be supplied from the angular velocity controller 903e to the motor 421 becomes blunt, and as a result, T1<T2 can be realized. T1<T2 can also be realized through simple control by such a method.

Next, the control of the trunk 220 will be described. The robot system 100 is configured so that the trunk 220 may perform the same control as the above-described multi-joint robot arm 230. That is, the robot 200, for example, may be configured such that, when the trunk 220 as illustrated in FIG. 16 is rotated with respect to the base 210 from a stationary state Ps' where the trunk 220 is made stationary in a posture (predetermined posture) in which the trunk faces the front, and is brought into a target state Pe' where the trunk faces laterally, a time T1' taken when the trunk 220 is at the low position and a time T2' taken when the trunk 220 is at the high position satisfy the relationship T1'<T2'. In addition, similar to the times T1 and T2, the times T1' and T2' can be defined by t2−t1', respectively, when the time when a driving signal for bringing the trunk into the target state Pe' from the stationary state Ps' is t1' and the time when the trunk 220 has first reached the target state Pe' is t2'.

Next, methods for satisfying T1'<T2' will be described using specific examples. One of specific methods of satisfying T1'<T2' includes a method of making the acceleration and deceleration of the motor 311 in the case of the high position lower than those in the case of the low position. Accordingly, T1'<T2' can be realized through simple control. In addition, this method is sufficient if at least one of the acceleration and the deceleration in the case of the high position is made lower than that in the case of the low position.

Another method includes a method of making a position proportional gain used with the angular velocity controller 901e of the first driving source controller 901 that controls the driving of the motor 311 in the case of the high position lower than that in the case of the low position. Accordingly, the reactivity of the motor 311 to a driving signal to be supplied from the angular velocity controller 901e to the motor 311 becomes blunt, and as a result, T1'<T2' can be realized. T1'<T2' can also be realized through simple control by such a method.

Although the robot, the robot control device, and the robot system according to the invention have been described on the basis of the illustrated embodiment, the invention is not limited to this, and the configurations of the respective parts can be substituted with arbitrary configurations having the same functions. Additionally, other arbitrary structures may be added to the invention.

Additionally, in the aforementioned embodiment, a configuration has been described in which a control is performed so that the time T1 (T1') at the low position and the time T2 (T2') at the high position satisfy the relationship T1 (T1')<T2 (T2'). However, for example, as mentioned above, when the height of the trunk can be detected in three steps of the low position, the middle position, and the high position, a configuration can be adopted in which the time T1 (T1') at the low position, the time T3 (T3') at the middle position, and the time T2 (T2') at the high position satisfy the relationship T1 (T1')<T3 (T3')<T2 (T2'). Similarly, times T1, T2, T3, . . . , Tn may be controlled in multiple steps.

Additionally, although the movable robot has been described in the aforementioned embodiment, the robot may be fixed to the floor, ceiling, wall, or the like of a work room, with bolts or the like. Additionally, in the aforementioned embodiment, the robot is arranged on a floor surface and the trunk moves in the vertical direction. However, the arrangement of the robot is not limited to this. For example, a configuration may be adopted in which the base is fixed to a ceiling or the trunk moves in the vertical direction, or a configuration may be adopted in which the base is fixed to a wall surface and the trunk moves in the horizontal direction.

Additionally, in the aforementioned embodiment, the angular velocity sensors are arranged for the respective elbows in the multi-joint robot arm. However, the arrangement of the angular velocity sensors is not limited to this. Additionally, although the detection results of the angular velocity sensors are fed back to the joint mechanism that rotates the first shoulder portion, the joint mechanism (twisting mechanism) to which the detection results are fed back is not limited to this. Additionally the detection results may be fed back to a plurality of joint mechanisms (twisting mechanisms).

Additionally, although the number of rotational axes of each multi-joint robot is seven in the aforementioned embodiment, the invention is not limited to this. The number of rotational axes of each multi-joint robot may be one to six or may be eight or more.

Second Embodiment

Figure 17:
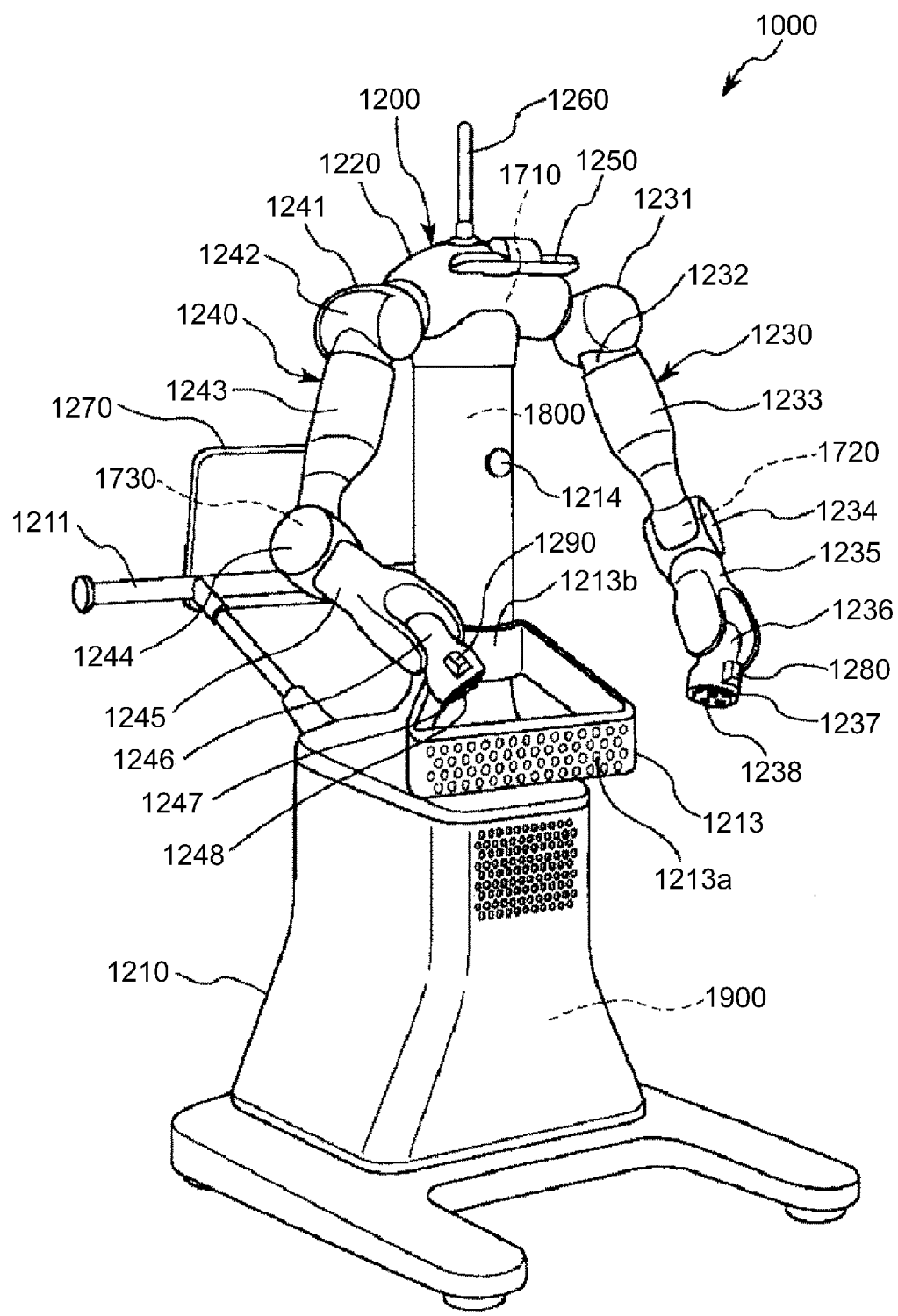
FIG. 17 is a perspective view illustrating a robot system related to a second embodiment.
Figure 18:
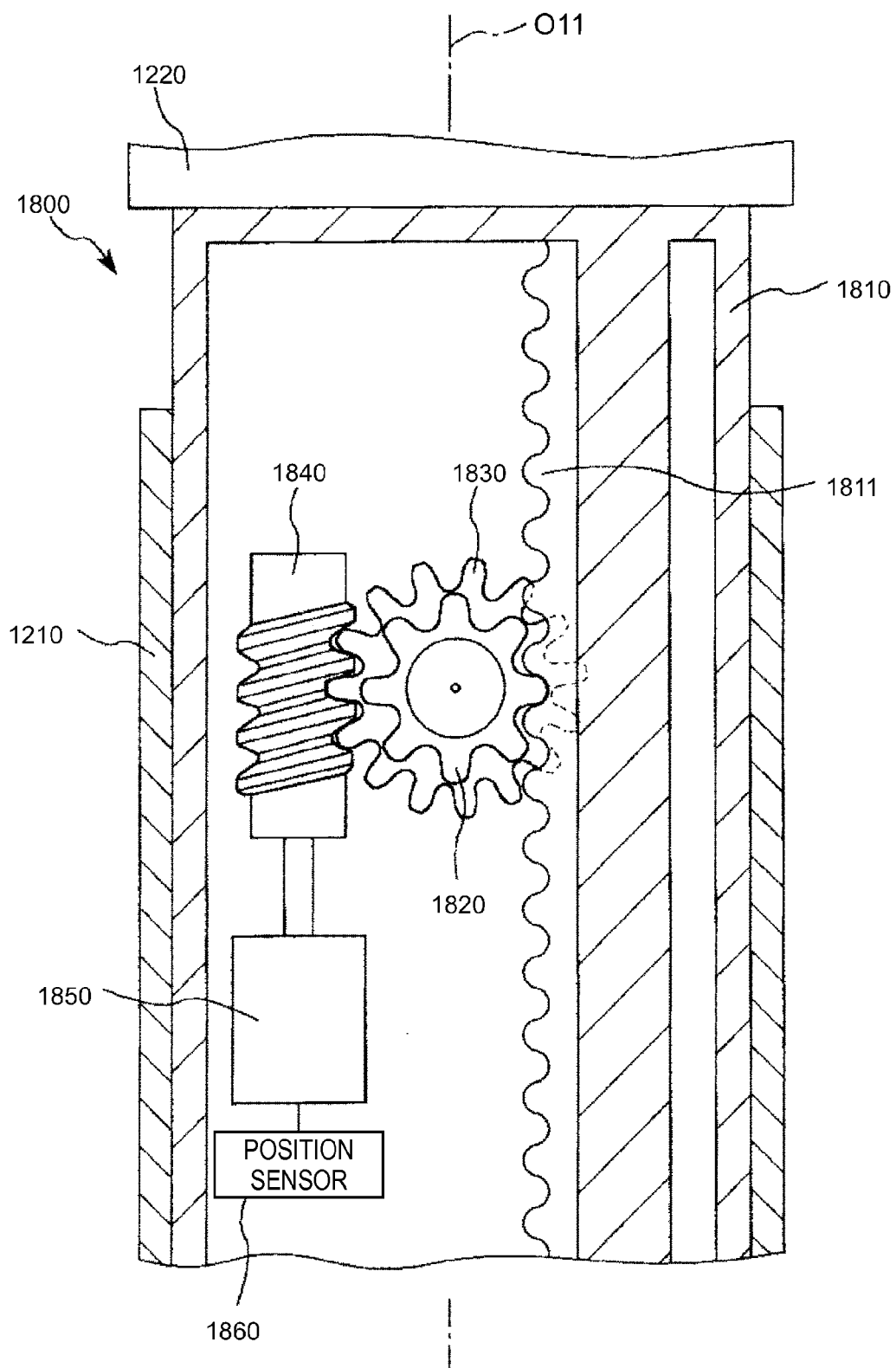
FIG. 18 is a cross-sectional view illustrating a lifting mechanism and a detector included in a robot illustrated in FIG. 17.
Figure 19:
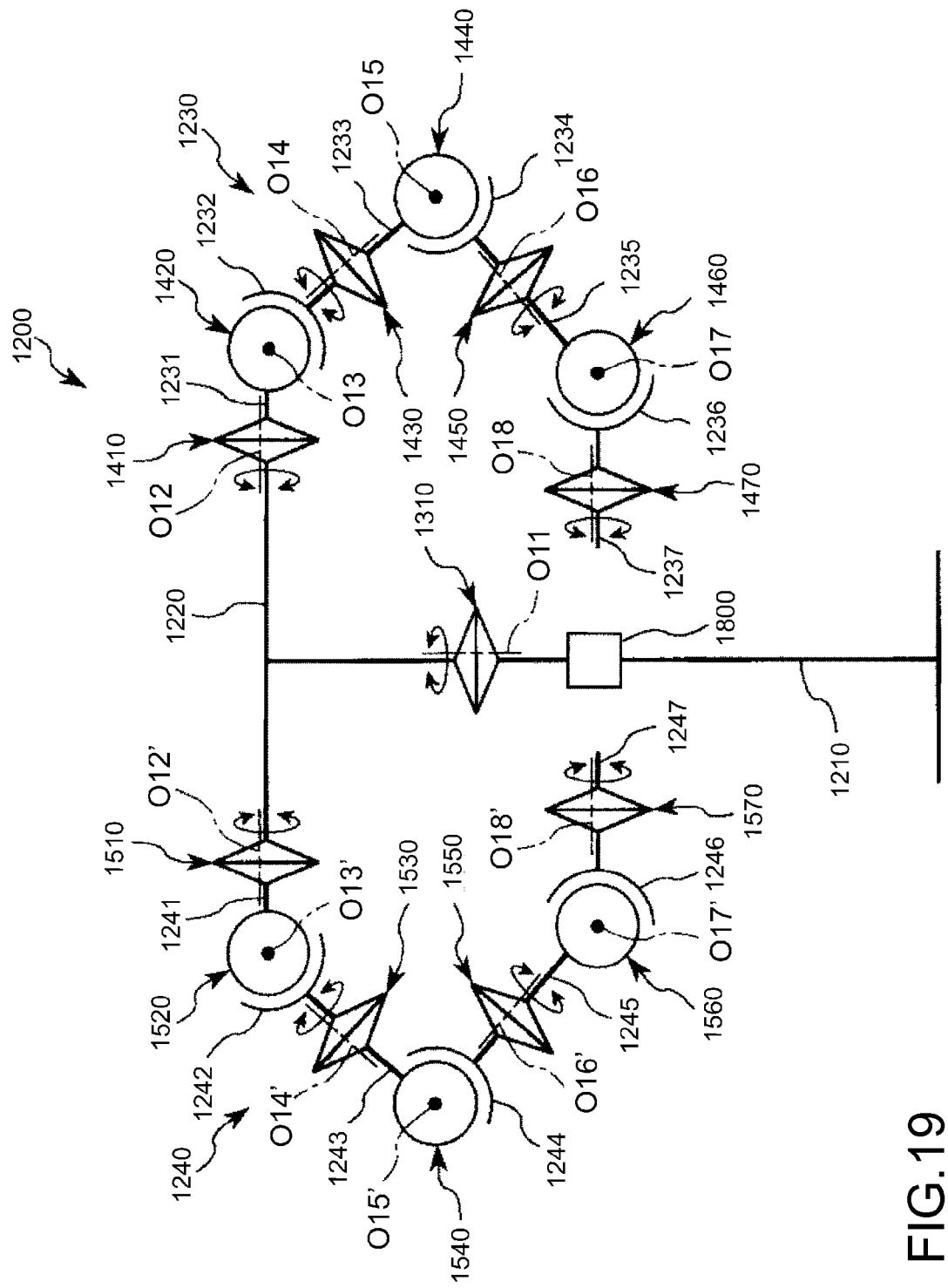
FIG. 19 is a view representing a joint mechanism, a twisting mechanism, and rotation axes of the robot illustrated in FIG. 17.
Figure 20:
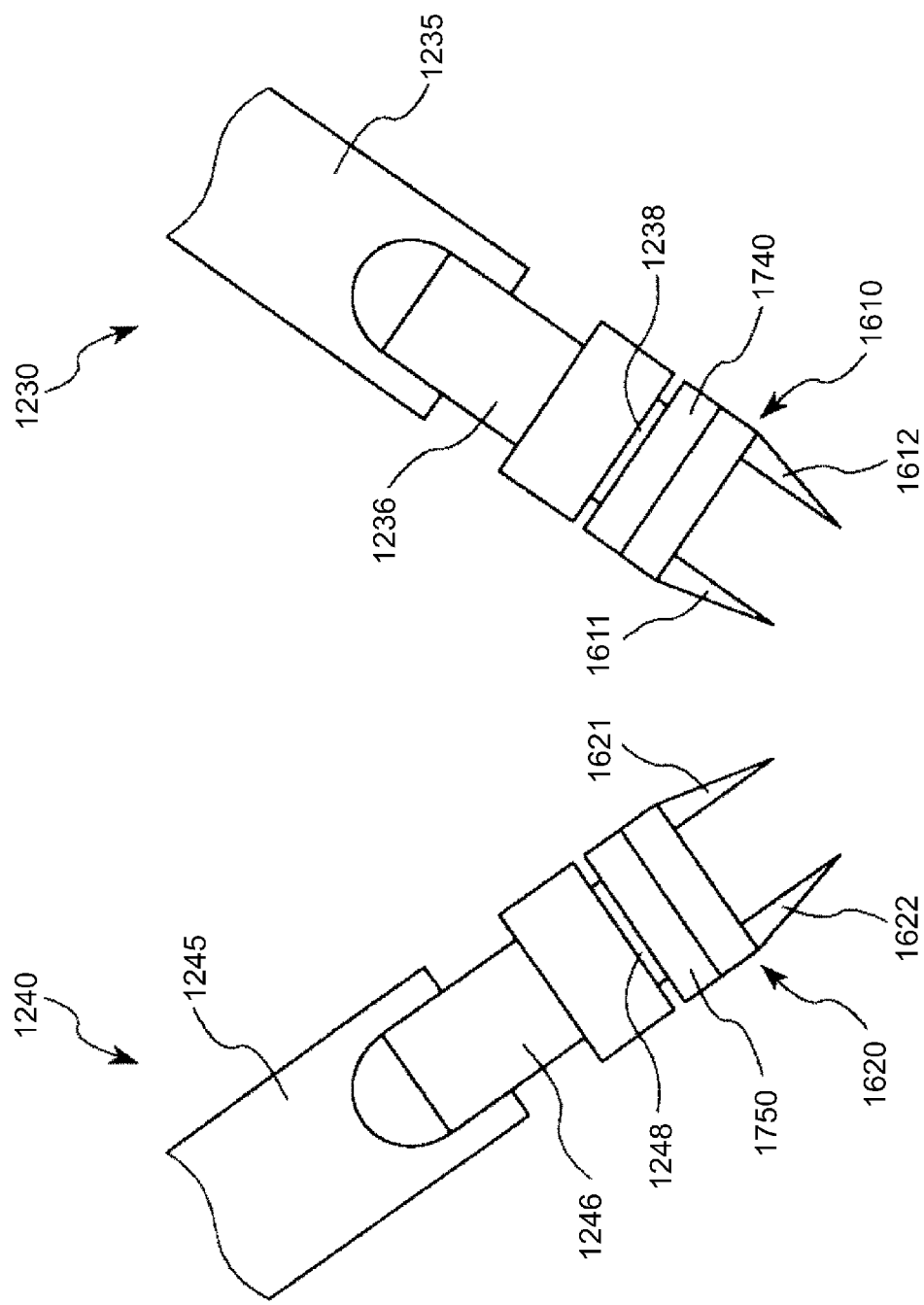
FIG. 20 is a view illustrating end effectors to be mounted on the robot illustrated in FIG. 17.
Figure 21:
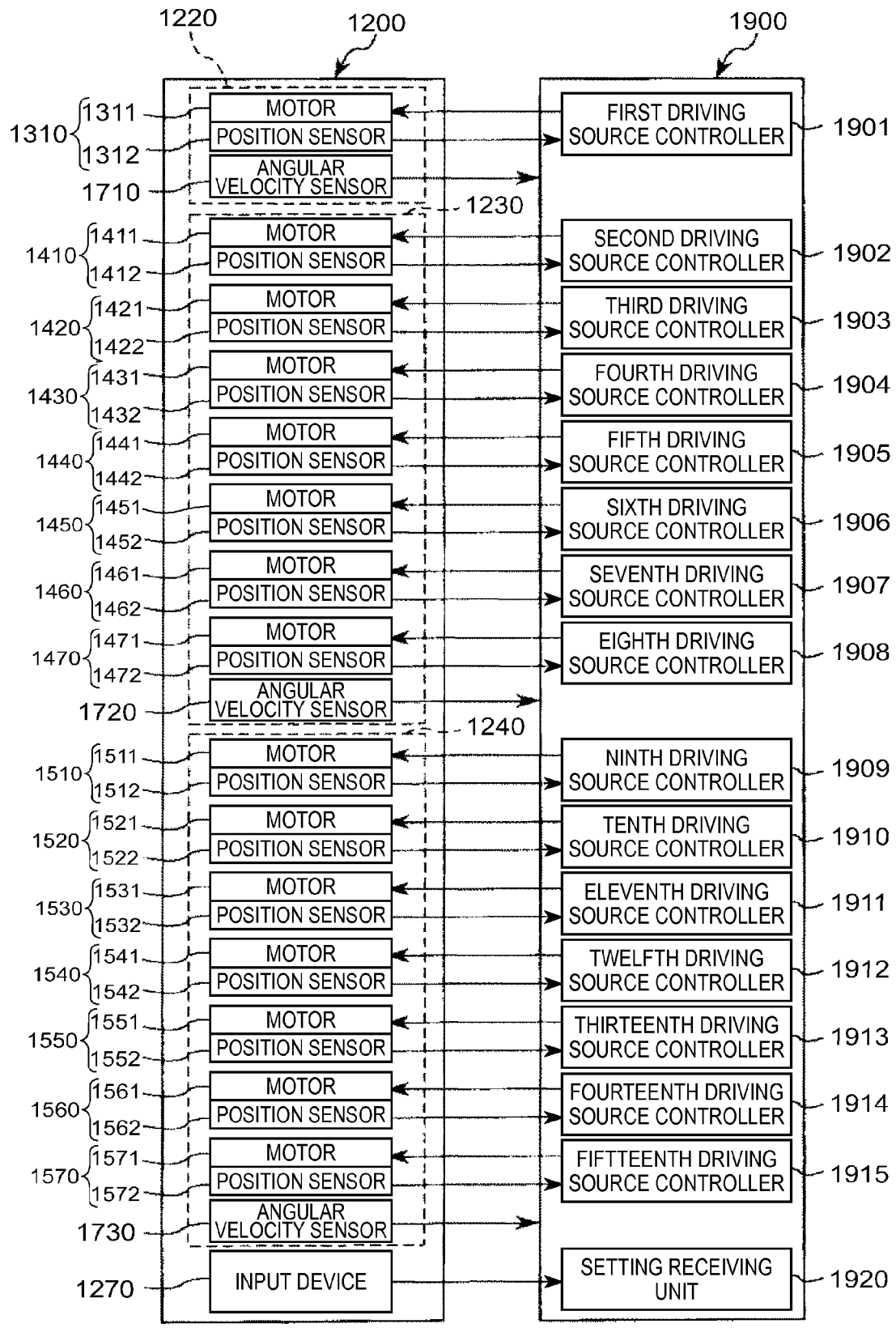
FIG. 21 is a block diagram illustrating a control system of the robot system illustrated in FIG. 17.
Figure 30:
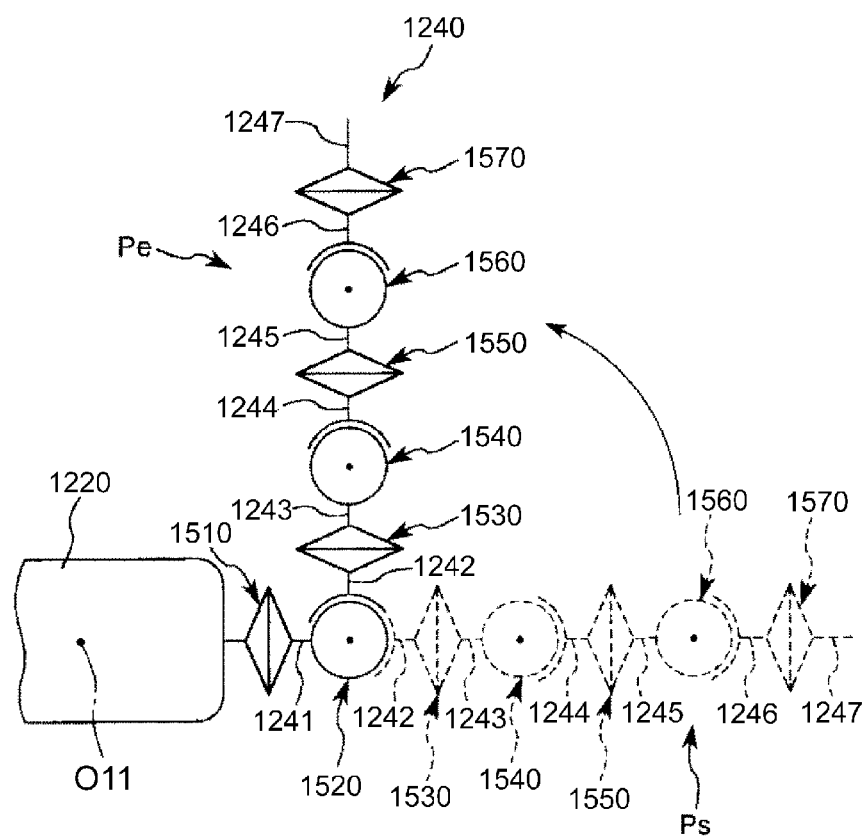
FIG. 30 is a plan view illustrating a stationary state and a target state of a multi-joint robot arm.
Figure 31:
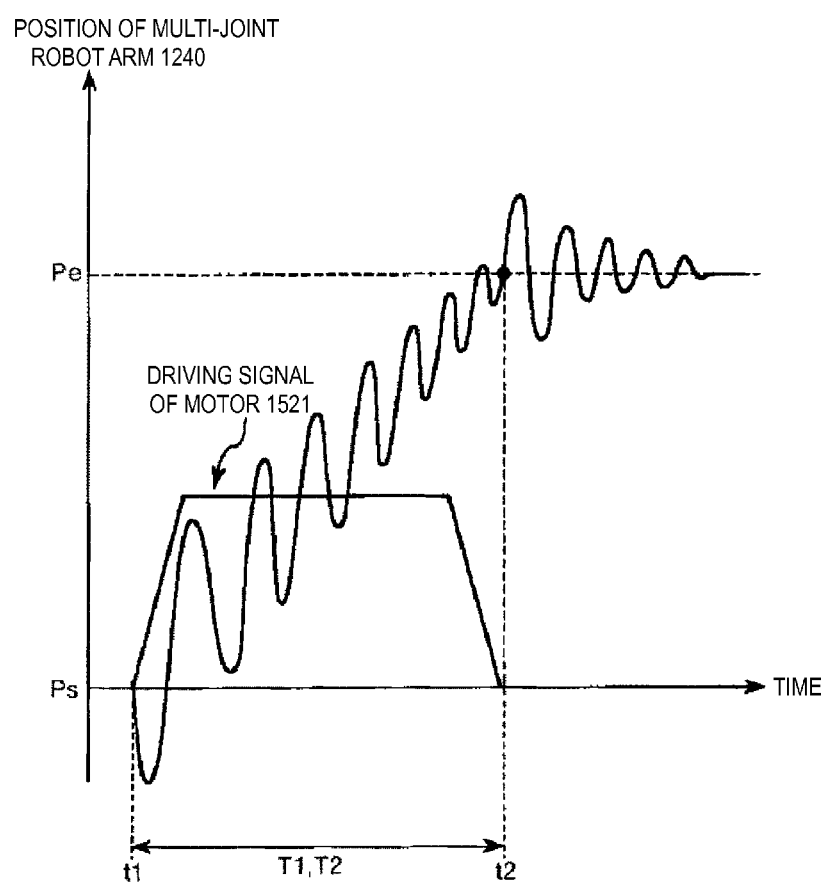
FIG. 31 is a view illustrating a driving signal and the driving of the multi-joint robot arm.
Figure 32A:
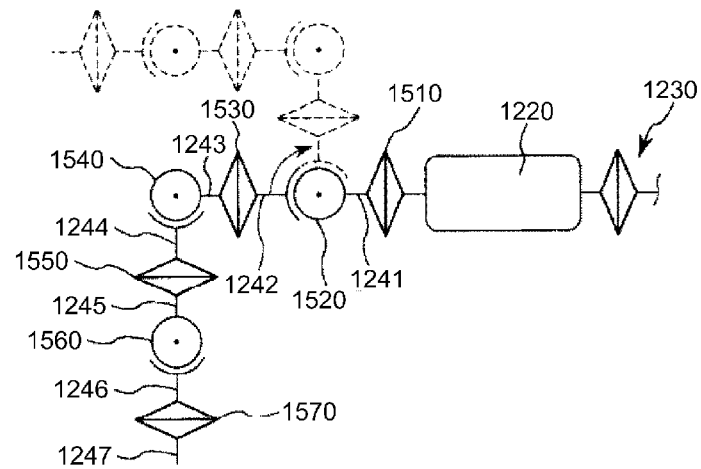
FIGS. 32A and 32B are views illustrating two postures in which inertia moments to be generated are different from each other.
Figure 32B:
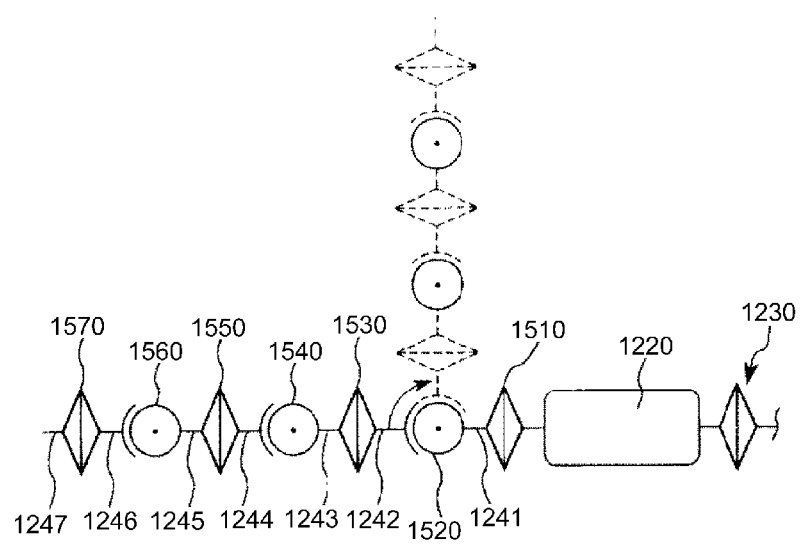
Figure 33A:
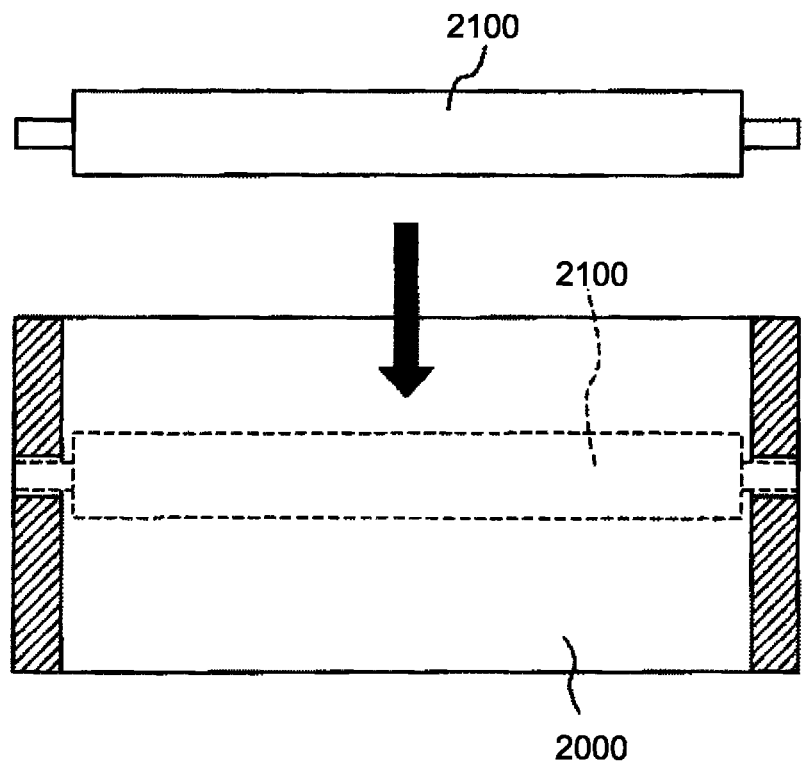
FIGS. 33A to 33B are views illustrating an example of the work that the multi-joint robot arm performs.
Figure 33B:
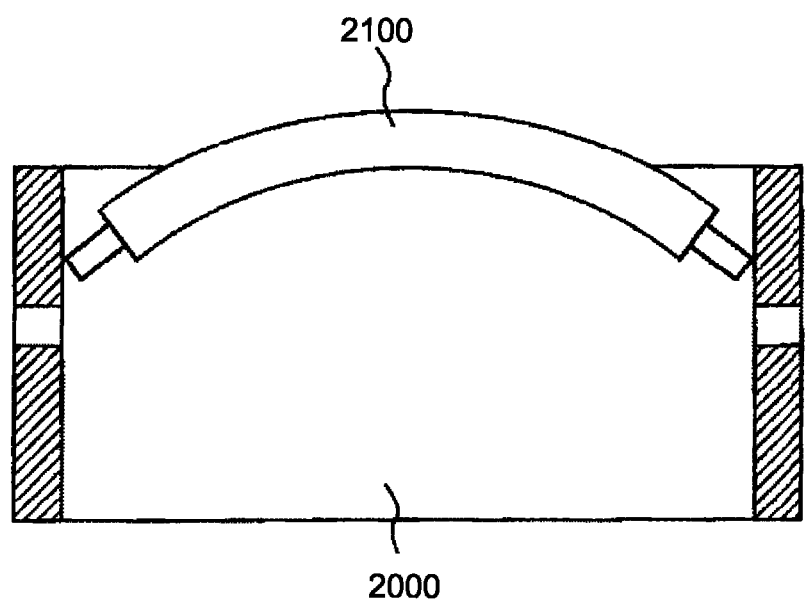

FIG. 17 is a perspective view illustrating a robot system related to a second embodiment as another preferred embodiment of the robot system according to the invention. FIG. 18 is a cross-sectional view illustrating a lifting mechanism and a detector included in a robot illustrated in FIG. 17. FIG. 19 is a view representing a joint mechanism, a twisting mechanism, and rotation axes of the robot illustrated in FIG. 17. FIG. 20 is a view illustrating end effectors to be mounted on the robot illustrated in FIG. 17. FIG. 21 is a block diagram illustrating a control system of the robot system illustrated in FIG. 17. FIGS. 22 to 29 are block diagrams illustrating the drive control of the robot illustrated in FIG. 17, respectively. FIG. 30 is a plan view illustrating a stationary state and a target state of a multi-joint robot arm. FIG. 31 is a view illustrating a driving signal and the driving of the multi-joint robot arm. FIGS. 32A and 32B are views illustrating two postures in which inertia moments to be generated are different from each other. FIGS. 33A to 33B are views illustrating an example of the work that the multi-joint robot arm performs.

A robot system 1100 illustrated in FIG. 17 is a double-arm robot, which can be used with, for example, a manufacturing process that manufactures precision instruments, such as a wrist watch. Such a robot system 1100 has a robot 1200, and a robot control device 1900 that controls the operation of the robot 1200. In addition, although the arrangement of the robot 1200 is not particularly limited, a case where the robot 1200 is arranged vertically (a rotational axis O11 to be described below is vertical) to a horizontal floor surface (installation surface) will be described below for convenience of description.

Robot

As illustrated in FIG. 17, the robot 1200 has a base 1210, a trunk 1220 linked to the base 1210, a pair of multi-joint robot arms 1230 and 1240 linked to the left and right of the trunk 1220, a stereoscopic camera 1250 and a signal lamp 1260 that are provided at the trunk 1220, and hand cameras 1280 and 1290 provided at the multi-joint robot arms 1230 and 1240.

According to such a robot 1200, work can be performed while confirming the position of a part, a tool, or the like on a work bench or confirming surrounding environments (whether or not there is any obstacle around the robot or whether or not safety is ensured), using the stereoscopic camera 1250 or the hand cameras 1280 and 1290. Additionally, the states (a drive state, a normal stop state, an abnormal stop state, and the like) of the robot 1200 can be easily confirmed by the signal lamp 1260.

Base

The base 1210 is provided with a plurality of wheels (not illustrated) that facilitate the movement of the robot 1200, locking mechanisms (not illustrated) that lock the respective wheels, and a handle 1211 to be gripped when the robot 1200 is moved. The robot 1200 can be freely moved by releasing the locking mechanisms and by gripping and pushing or pulling the handle 1211, and the robot 1200 can be fixed at a predetermined position by locking the wheels using the locking mechanisms. The convenience of the robot 1200 is improved by facilitating the movement of the robot 1200 in this way. In addition, the wheels, the locking mechanisms, and the handle 1211 may be omitted, respectively.

Additionally, the base 1210 is provided with a bumper 1213 for abutting against the work bench (not illustrated). By making the bumper 1213 abut against a side surface of the work bench, the robot 1200 can be opposed to the work bench with a predetermined gap. Therefore, an unintended contact or the like between the robot 1200 and the work bench can be prevented. In addition, the bumper 1213 has an abutment portion 1213a that abuts against the work bench, and a fixed portion 1213b fixed to the base 1210. In FIG. 17, the abutment portion 1213a is mounted on the base 1210 so as to be located below the fixed portion 1213b. Such a bumper 1213 can be attached to and detached from the base 1210, and the orientation of the bumper 1213 can be vertically flipped. That is, on the contrary to FIG. 17, the bumper 1213 can also be mounted on the base 1210 so that the abutment portion 1213a is located above the fixed portion 1213b. By changing the height of the abutment portion 1213a in this way, it is possible to cope with work benches with different heights.

Additionally, the base 1210 is provided with an emergency stop button 1214, and the robot 1200 can be emergency-stopped by pushing the emergency stop button 1214 in the case of emergency.

Additionally, the base 1210 is provided with an input device 1270. The input device 1270 is a device that inputs data of a keyboard, a connection interface with an external instrument, or the like. In addition, a device for teaching that inputs the operation of the robot 1200 is included in the input device 1270. Additionally, the input device 1270 has a monitor and can display the state of the robot 1200 or various data on the monitor.

Trunk

As illustrated in FIG. 17, the trunk 1220 is linked to the base 1210 via a lifting mechanism 1800 so as to be liftable in a vertical direction (in the direction of the rotational axis O11). The configuration of the lifting mechanism 1800 is not particularly limited if the lifting mechanism can lift and lower the trunk 1220 with respect to the base 1210. As illustrated in FIG. 18, the lifting mechanism 1800 includes a tubular lifting portion 1810 within which a rack 1811 is provided, a pinion 1820 that meshes with the rack 1811, a worm wheel 1830 that rotates the pinion 1820, a worm 1840 that rotates the worm wheel 1830, a motor 1850 as a driving source that rotates the worm 1840, and a position sensor 1860 that detects the rotational angle of the motor 1850. Among these components, the lifting portion 1810 is linked to the trunk 1220, and the pinion 1820, the worm wheel 1830, the worm 1840, and the motor 1850 are fixed to the base 1210, respectively. If the motor 1850 is driven, the power thereof is transmitted to the pinion 1820 via the worm 1840 and the worm wheel 1830, and the rack 1811 is moved with the rotation of the pinion 1820. Accordingly, the trunk 1220 is lifted or lowered with respect to the base 1210 together with the lifting portion 1810. Additionally, by using the worm wheel 1830 and the worm 1840, the position (height) of the lifting portion 1810 can be maintained even if the motor 1850 is stopped. In addition, as the motor 1850, for example, a servo motor, such as an AC servo motor or a DC servo motor, can be used. As the position sensor 1860, for example, an encoder, a rotary encoder, a resolver, a potentiometer, or the like can be used. Additionally, a reduction gear that reduces the rotating speed of the motor 1850 may be provided between the motor 1850 and the worm 1840.

Moreover, the trunk 1220 is linked to the base 1210 via a joint mechanism 1310 so as to be rotatable around the rotational axis O11. The rotational axis O11 extends in the vertical direction. The configuration of the joint mechanism 1310 is not particularly limited if the trunk 1220 can be rotated around the rotational axis O11 with respect to the base 1210. However, as illustrated in FIG. 21, the joint mechanism 1310 has a motor 1311 as a driving source, a reduction gear (not illustrated) that reduces the rotating speed of the motor 1311, and a position sensor 1312 that detects the rotational angle of the motor 1311. As the motor 1311, for example, a servo motor, such as an AC servo motor or a DC servo motor, can be used. As the reduction gear, for example, a planetary gear type reduction gear, a harmonic drive ("the harmonic drive" is a registered trademark), or the like can be used. As the position sensor 1312, for example, an encoder, a rotary encoder, a resolver, a potentiometer, or the like can be used.

Multi-Joint Robot Arm

As illustrated in FIG. 19, the multi-joint robot arm (first robot arm) 1230 has a first shoulder portion (first arm portion) 1231 linked to the trunk 1220 via a joint mechanism 1410, a second shoulder portion (second arm portion) 1232 linked to the first shoulder portion 1231 via a joint mechanism 1420, an upper arm portion (third arm portion) 1233 linked to a tip of the second shoulder portion 1232 via a twisting mechanism (joint mechanism) 1430, a first forearm portion (fourth arm portion) 1234 linked to a tip of the upper arm portion 1233 via a joint mechanism 1440, a second forearm portion (fifth arm portion) 1235 linked to a tip of the first forearm portion 1234 via a twisting mechanism (joint mechanism) 1450, a wrist portion (sixth arm portion) 1236 linked to a tip of the second forearm portion 1235 via a joint mechanism 1460, and a linking portion (seventh arm portion) 1237 linked to a tip of the wrist portion 1236 via a twisting mechanism (joint mechanism) 1470. Additionally, the linking portion 1237 is provided with a hand portion 1238, and as illustrated in FIG. 20, an end effector 1610 according to the work that the robot 1200 is made to execute is mounted on the hand portion 1238 via a force sensor 1740.

Additionally, as illustrated in FIG. 19, the joint mechanism 1410 rotates the first shoulder portion 1231 around a rotational axis O12 orthogonal to the rotational axis O11 with respect to the trunk 1220, the joint mechanism 1420 rotates the second shoulder portion 1232 around a rotational axis O13 orthogonal to the rotational axis O12 with respect to the first shoulder portion 1231, the twisting mechanism 1430 rotates the upper arm portion 1233 around a rotational axis O14 orthogonal to the rotational axis O13 with respect to the second shoulder portion 1232, the joint mechanism 1440 rotates the first forearm portion 1234 around a rotational axis O15 orthogonal to the rotational axis O14 with respect to the upper arm portion 1233, the twisting mechanism 1450 rotates the second forearm portion 1235 around a rotational axis O16 orthogonal to the rotational axis O15 with respect to the first forearm portion 1234, the joint mechanism 1460 rotates the wrist portion 1236 around a rotational axis O17 orthogonal to the rotational axis O16 with respect to the second forearm portion 1235, and the twisting mechanism 1470 rotates the linking portion 1237 around a rotational axis O18 orthogonal to the rotational axis O17 with respect to the wrist portion 1236. According to such a multi-joint robot arm 1230, bending and stretching of joints (a shoulder, an elbow, a wrist) and twisting of an upper arm and a forearm can be realized, similar to a human arm, with a relatively simple configuration.

Although the configurations of the joint mechanism 1410, the joint mechanism 1420, the twisting mechanism 1430, the joint mechanism 1440, the twisting mechanism 1450, the joint mechanism 1460, and the twisting mechanism 1470 are not particularly limited, respectively, these configurations are the same as the configuration of the aforementioned joint mechanism 1310. That is, as illustrated in FIG. 21, the joint mechanism 1410 has a motor 1411 as a driving source, a reduction gear (not illustrated) that reduces the rotating speed of the motor 1411, and a position sensor 1412 that detects the rotational angle of the motor 1411. Additionally, the joint mechanism 1420 has a motor 1421 as a driving source, a reduction gear (not illustrated) that reduces the rotating speed of the motor 1421, and a position sensor 1422 that detects the rotational angle of the motor 1421. Additionally, the twisting mechanism 1430 has a motor 1431 as a driving source, a reduction gear (not illustrated) that reduces the rotating speed of the motor 1431, and a position sensor 1432 that detects the rotational angle of the motor 1431. Additionally, the joint mechanism 1440 has a motor 1441 as a driving source, a reduction gear (not illustrated) that reduces the rotating speed of the motor 1441, and a position sensor 1442 that detects the rotational angle of the motor 1441. Additionally, the twisting mechanism 1450 has a motor 1451 as a driving source, a reduction gear (not illustrated) that reduces the rotating speed of the motor 1451, and a position sensor 1452 that detects the rotational angle of the motor 1451. Additionally, the joint mechanism 1460 has a motor 1461 as a driving source, a reduction gear (not illustrated) that reduces the rotating speed of the motor 1461, and a position sensor 1462 that detects the rotational angle of the motor 1461. Additionally, the twisting mechanism 1470 has a motor 1471 as a driving source, a reduction gear (not illustrated) that reduces the rotating speed of the motor 1471, and a position sensor 1472 that detects the rotational angle of the motor 1471.

The multi-joint robot arm (second robot arm) 1240 has the same configuration as the aforementioned multi-joint robot arm 1230.

That is, as illustrated in FIG. 19, the multi-joint robot arm 1240 has a first shoulder portion 1241 linked to the trunk 1220 via a joint mechanism 1510, a second shoulder portion 1242 linked to the first shoulder portion 1241 via a joint mechanism 1520, an upper arm portion 1243 linked to a tip of the second shoulder portion 1242 via a twisting mechanism (joint mechanism) 1530, a first forearm portion 1244 linked to a tip of the upper arm portion 1243 via a joint mechanism 1540, a second forearm portion 1245 linked to a tip of the first forearm portion 1244 via a twisting mechanism (joint mechanism) 1550, a wrist portion 1246 linked to a tip of the second forearm portion 1245 via a joint mechanism 1560, and a linking portion 1247 linked to a tip of the wrist portion 1246 via a twisting mechanism (joint mechanism) 1570. Additionally, the linking portion 1247 is provided with a hand portion 1248, and an end effector 1620 according to the work that the robot 1200 is made to execute is mounted on the hand portion 1248 via a force sensor 1750.

Additionally, as illustrated in FIG. 19, the joint mechanism 1510 rotates the first shoulder portion 1241 around a rotational axis O12' orthogonal to the rotational axis O11 with respect to the trunk 1220, the joint mechanism 1520 rotates the second shoulder portion 1242 around a rotational axis O13' orthogonal to the rotational axis O12' with respect to the first shoulder portion 1241, the twisting mechanism 1530 rotates the upper arm portion 1243 around a rotational axis O14' orthogonal to the rotational axis O13' with respect to the second shoulder portion 1242, the joint mechanism 1540 rotates the first forearm portion 1244 around a rotational axis O15' orthogonal to the rotational axis O14' with respect to the upper arm portion 1243, the twisting mechanism 1550 rotates the second forearm portion 1245 around a rotational axis O16' orthogonal to the rotational axis O15' with respect to the first forearm portion 1244, the joint mechanism 1560 rotates the wrist portion 1246 around a rotational axis O17' orthogonal to the rotational axis O16' with respect to the second forearm portion 1245, and the twisting mechanism 1570 rotates the linking portion 1247 around a rotational axis O18' orthogonal to the rotational axis O17' with respect to the wrist portion 1246. According to such a multi-joint robot arm 1240, bending and stretching of joints and twisting of an upper arm and a forearm can be realized, similar to a human arm, with a relatively simple configuration.

Although the configurations of the joint mechanism 1510, the joint mechanism 1520, the twisting mechanism 1530, the joint mechanism 1540, the twisting mechanism 1550, the joint mechanism 1560, and the twisting mechanism 1570 are not particularly limited, respectively, these configurations are the same as the configuration of the aforementioned joint mechanism 1310. That is, as illustrated in FIG. 21, the joint mechanism 1510 has a motor 1511 as a driving source, a reduction gear (not illustrated) that reduces the rotating speed of the motor 1511, and a position sensor 1512 that detects the rotational angle of the motor 1511. Additionally, the joint mechanism 1520 has a motor 1521 as a driving source, a reduction gear (not illustrated) that reduces the rotating speed of the motor 1521, and a position sensor 1522 that detects the rotational angle of the motor 1521. Additionally, the twisting mechanism 1530 has a motor 1531 as a driving source, a reduction gear (not illustrated) that reduces the rotating speed of the motor 1531, and a position sensor 1532 that detects the rotational angle of the motor 1531. Additionally, the joint mechanism 1540 has a motor 1541 as a driving source, a reduction gear (not illustrated) that reduces the rotating speed of the motor 1541, and a position sensor 1542 that detects the rotational angle of the motor 1541. Additionally, the twisting mechanism 1550 has a motor 1551 as a driving source, a reduction gear (not illustrated) that reduces the rotating speed of the motor 1551, and a position sensor 1552 that detects the rotational angle of the motor 1551. Additionally, the joint mechanism 1560 has a motor 1561 as a driving source, a reduction gear (not illustrated) that reduces the rotating speed of the motor 1561, and a position sensor 1562 that detects the rotational angle of the motor 1561. Additionally, the twisting mechanism 1570 has a motor 1571 as a driving source, a reduction gear (not illustrated) that reduces the rotating speed of the motor 1571, and a position sensor 1572 that detects the rotational angle of the motor 1571.

End Effectors

Although the end effector 1610 or 1620 to be attached to the tip (hand portion 1238 or 1248) of the multi-joint robot arm 1230 or 1240 has different configurations depending on purposes, the end effector has, for example, a function of gripping an object. Such an end effector 1610 or 1620, for example as illustrated in FIG. 20, can be adapted to have a configuration in which the end effector has a first finger 1611 or 1621 and a second finger 1612 or 1622. In the end effector 1610 or 1620 having such a configuration, an object can be gripped by adjusting the separation distance between the first finger 1611 or 1621 and the second finger 1612 or 1622.

The force sensor 1740 or 1750 arranged between the hand portion 1238 or 1248 and the end effector 1610 or 1620 has the function of detecting an external force applied to the end effector 1610 or 1620. Then, by feeding back the force detected by the force sensor 1740 or 1750 to the robot control device 1900, the robot 1200 can more precisely perform work. Additionally, the contact of the end effector 1610 or 1620 with the obstacle, or the like can be detected by the force or moment detected by the force sensor 1740 or 1750. Therefore, an obstacle avoidance operation, an object damage avoidance operation, or the like can be easily performed. Such force sensors 1740 and 1750 are not particularly limited, and well-known force sensors can be used if a force component and a moment component of each axis of three axes that are orthogonal to each other can be detected.

In addition, the end effectors 1610 and 1620 are not limited to the configurations as described above and can be replaced depending on intended work. For example, the end effectors may grip, lift, hoist, or suction an object, or perform processing on an object. That is, the end effectors 1610 and 1620 may be the aforementioned hands, and besides, may be hooks, suction disks, or the like. Furthermore, one arm may be provided with a plurality of the end effectors.

Angular Velocity Sensor

As illustrated in FIG. 17, the robot 1200 is provided with three angular velocity sensors 1710, 1720, and 1730. The angular velocity sensor 1710 is arranged at the trunk 1220, the angular velocity sensor 1720 is arranged at the multi-joint robot arm 1230, and the angular velocity sensor 1730 is arranged at the multi-joint robot arm 1240. The angular velocity sensors 1710, 1720, and 1730 are respectively triaxial angular velocity sensors that can independently detect angular velocities $\omega x$, $\omega y$, and $\omega z$ around the respective axes of three axes (an x-axis, a y-axis, and z-axis) that are orthogonal to each other. In addition, in the present embodiment, although the angular velocity sensors 1720 and 1730 are respectively arranged for elbows of the multi-joint robot arms 1230 and 1240, the arrangement of these sensors are not particularly limited.

The angular velocity sensors 1710, 1720, and 1730 are not particularly limited if the angular velocities ωx, ωy, and ωz around the respective axes of the three axes (the x-axis, the y-axis, and the z-axis) that are orthogonal to each other can be detected, respectively. For example, well-known angular velocity sensors using a crystal substrate can be used. Additionally, material costs can be reduced by making the angular velocity sensors 1710, 1720, and 1730 have the same configuration as each other.

The angular velocities (analog signals) detected by the angular velocity sensors 1710, 1720, and 1730 are amplified by amplifiers, are then converted to digital signals by an A/D conversion circuit, and are thereafter transmitted to the robot control device 1900.

Robot Control Device

Here, the robot control device 1900 computes target positions of the multi-joint robot arms 1230 and 1240 on the basis of the contents of the processing that the robot 1200 performs, and generates tracks for moving the multi-joint robot arms 1230 and 1240 to the target positions. Then, the robot control device 1900 independently controls the respective motors 1311, 1411 to 1471, and 1511 to 1571 so that the trunk 1220 and the multi-joint robot arms 1230 and 1240 move along the generated tracks.

As illustrated in FIG. 21, specifically, the robot control device 1900 has a first driving source controller 1901 that controls the driving of the motor 1311 (trunk 1220), a second driving source controller 1902 that controls the driving of the motor 1411 (first shoulder portion 1231), a third driving source controller 1903 that controls the driving of the motor 1421 (second shoulder portion 1232), a fourth driving source controller 1904 that controls the driving of the motor 1431 (upper arm portion 1233), a fifth driving source controller 1905 that controls the driving of the motor 1441 (first forearm portion 1234), a sixth driving source controller 1906 that controls the driving of the motor 1451 (second forearm portion 1235), a seventh driving source controller 1907 that controls the driving of the motor 1461 (wrist portion 1236), an eighth driving source controller 1908 that controls the driving of the motor 1471 (linking portion 1237), a ninth driving source controller 1909 that controls the driving of the motor 1511 (first shoulder portion 1241), a tenth driving source controller 1910 that controls the driving of the motor 1521 (second shoulder portion 1242), an eleventh driving source controller 1911 that controls the driving of the motor 1531 (upper arm portion 1243), a twelfth driving source controller 1912 that controls the driving of the motor 1541 (first forearm portion 1244), a thirteenth driving source controller 1913 that controls the driving of the motor 1551 (second forearm portion 1245), a fourteenth driving source controller 1914 that controls the driving of the motor 1561 (wrist portion 1246), and a fifteenth driving source controller 1915 that controls the driving of the motor 1571 (linking portion 1247).

Additionally, the robot control device 1900 has a setting receiving unit 1920 that receives set values input by the input device 1270. The first to fifteenth driving source controllers 1901 to 1915, in principle, control the motors 1311, 1411 to 1471, and 1511 to 1571 on the basis of the set values received by the setting receiving unit 1920.

Next, the configuration of the first to fifteenth driving source controllers 1901 to 1915 will be described. Here, since the second to eighth driving source controllers 1902 to 1908 that control the driving of the multi-joint robot arm 1230, and the ninth to fifteenth driving source controllers 1909 to 1915 that control the driving of the multi-joint robot arm 1240 have the same configuration, the first driving source controller 1901 and the second to eighth driving source controllers 1902 to 1908 will be described below, and the description of the ninth to fifteenth driving source controllers 1909 to 1915 will be omitted.

First Driving Source Controller

Figure 22:
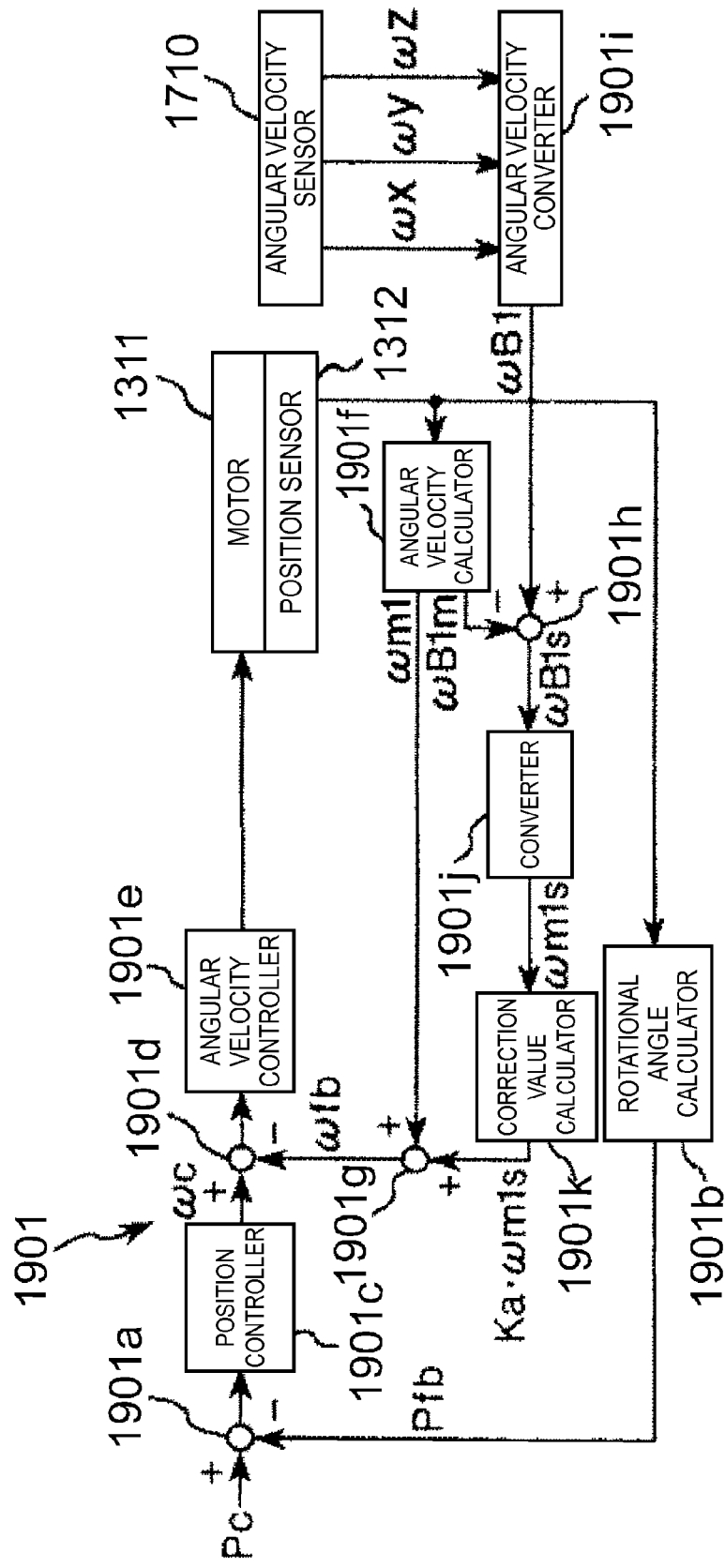
FIG. 22 is a block diagram illustrating the drive control of the robot system illustrated in FIG. 17.

As illustrated in FIG. 22, the first driving source controller 1901 has a subtractor 1901a, a rotational angle calculator 1901b, a position controller 1901c, a subtractor 1901d, an angular velocity controller 1901e, an angular velocity calculator 1901f, an adder 1901g, a subtractor 1901h, an angular velocity converter 1901i, a converter 1901j, and a correction value calculator 1901k.

In addition to a position command Pc of the motor 1311, detection signals are input from the position sensor 1312 and the angular velocity sensor 1710 to the first driving source controller 1901. The first driving source controller 1901 drives the motor 1311 through a feedback control using the respective detection signals so that a rotational angle (position feedback value Pfb) of the motor 1311 calculated from the detection signal of the position sensor 1312 becomes the position command Pc and an angular velocity feedback value ωfb to be described below becomes an angular velocity command ωc to be described below.

That is, the position command Pc is input to the subtractor 1901a, and the position feedback value Pfb to be described below is input from the rotational angle calculator 1901b. In the rotational angle calculator 1901b, the number of pulses input from the position sensor 1312 is counted, and the rotational angle of the motor 1311 according to the counted value is output to the subtractor 1901a as the position feedback value Pfb. The subtractor 1901a outputs a deviation (value obtained by subtracting the position feedback value Pfb from the target value of the rotational angle of the motor 1311) between the position command Pc and the position feedback value Pfb to the position controller 1901c.

The position controller 1901c performs predetermined computation processing using the deviation input from the subtractor 1901a, a proportional gain that is a predetermined coefficient, or the like and computes a target value of the angular velocity of the motor 1311 according to the deviation. The position controller 1901c outputs a signal showing the target value (command value) of the angular velocity of the motor 1311 to the subtractor 1901d as the angular velocity command ωc. In the present embodiment, a proportional control (P control) is performed as the feedback control. However, the feedback control is not limited to this.

The angular velocity command ωc and the angular velocity feedback value ωfb to be described below are input to the subtractor 1901d. The subtractor 1901d outputs a deviation (value obtained by subtracting the angular velocity feedback value ωfb from the target value of the angular velocity of the motor 1311) between the angular velocity command ωc and the angular velocity feedback value ωfb to the angular velocity controller 1901e.

The angular velocity controller 1901e performs predetermined computation processing including integration, using the deviation input from the subtractor 1901d, a proportional gain (position proportional gain) that is a predetermined coefficient, an integration gain, or the like, thereby generating a driving signal (driving current) of the motor 1311 according to the deviation, and supplies the driving signal to the motor 1311 via a motor driver. In the present embodiment, a PI control is performed as the feedback control. However, the feedback control is not limited to this.

In this way, the feedback control is performed and the driving current of the motor 1311 is controlled so that the position feedback value Pfb is as equal to the position command Pc as possible and the angular velocity feedback value ωfb is as equal to the angular velocity command ωc as possible.

Next, the angular velocity feedback value ωfb in the first driving source controller 1901 will be described.

In the angular velocity calculator 1901*f*, an angular velocity ωm1 of the motor 1311 is calculated on the basis of the frequency of a pulse signal input from the position sensor 1312, and the angular velocity ωm1 is output to the adder 1901*g*.

Additionally, in the angular velocity calculator 1901*f*, an angular velocity ωB1m of the trunk 1220 around the rotational axis O11 is calculated on the basis of the frequency of the pulse signal input from the position sensor 1312, and the angular velocity ωB1m is output to the subtractor 1901*h*. In addition, the angular velocity ωB1m is a value obtained by dividing the angular velocity ωm1 by a reduction ratio in the joint mechanism 1310.

Additionally, angular velocities ωx, ωy, and ωz are respectively detected from the angular velocity sensor 1710, and the respective angular velocities ωx, ωy, and ωz are input to the angular velocity converter 1901*i*. In the angular velocity converter 1901*i*, an angular velocity ωB1 of the trunk 1220 around the rotational axis O11 is calculated from the input angular velocities ωx, ωy, and ωz, and the angular velocity ωB1 is output to the subtractor 1901*h*.

The angular velocity ωB1 and the angular velocity ωB1m are input to the subtractor 1901*h*, and the subtractor 1901*h* outputs a value ωB1s (=ωB1−ωB1m) obtained by subtracting the angular velocity ωB1m from the angular velocity ωB1 to the converter 1901*j*. The value ωB1s is equivalent to a vibration component (vibration angular velocity) of the angular velocity of the trunk 1220 around the rotational axis O11. Hereinafter, ωB1s is referred to as a vibration angular velocity. In the present embodiment, a feedback control of multiplying the vibration angular velocity ωB1s by a gain Ka to be described below and returning the multiplied vibration angular velocity to an input side of the motor 1311 is performed. Specifically, the feedback control is performed on the motor 1311 so that the vibration angular velocity ωB1s becomes as close to 0 as possible. Accordingly, the vibration in the robot 1200 can be suppressed. In addition, the angular velocity of the motor 1311 is controlled in this feedback control.

The converter 1901*j* converts the vibration angular velocity ωB1s to an angular velocity ωm1s in the motor 1311, and outputs the angular velocity ωm1s to the correction value calculator 1901*k*. This conversion can be obtained by multiplying the vibration angular velocity ωB1s by the reduction ratio in the joint mechanism 1310.

The correction value calculator 1901*k* multiplies the angular velocity ωm1s by a gain (feedback gain) Ka that is a predetermined coefficient, obtains a correction value Ka·ωm1s, and outputs the correction value Ka·ωm1s to the adder 1901*g*.

The angular velocity ωm1 and the correction value Ka·ωm1s are input to the adder 1901*g*. The adder 1901*g* outputs an additional value of the angular velocity ωm1 and the correction value Ka·ωm1s to the subtractor 1901*d* as the angular velocity feedback value ωfb. In addition, the subsequent operation is as mentioned above.

Second Driving Source Controller

Figure 23:
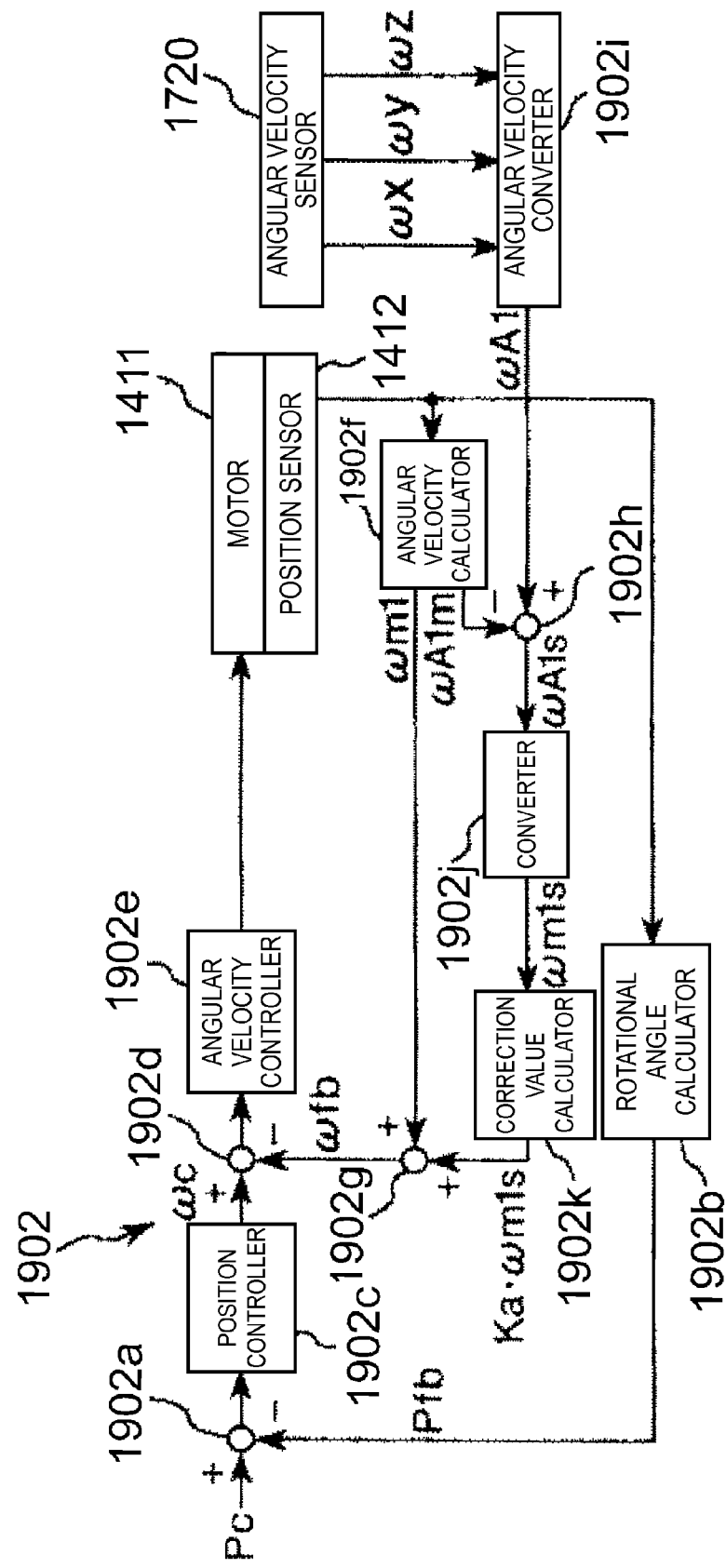
FIG. 23 is a block diagram illustrating the drive control of the robot system illustrated in FIG. 17.

As illustrated in FIG. 23, the second driving source controller 1902 has a subtractor 1902*a*, a rotational angle calculator 1902*b*, a position controller 1902*c*, a subtractor 1902*d*, an angular velocity controller 1902*e*, an angular velocity calculator 1902*f*, an adder 1902*g*, a subtractor 1902*h*, an angular velocity converter 1902*i*, a converter 1902*j*, and a correction value calculator 1902*k*.

In addition to a position command Pc of the motor 1411, detection signals are input from the position sensor 1412 and the angular velocity sensor 1720 to the second driving source controller 1902. The second driving source controller 1902 drives the motor 1411 through a feedback control using the respective detection signals so that a rotational angle (position feedback value Pfb) of the motor 1411 calculated from the detection signal of the position sensor 1412 becomes the position command Pc and an angular velocity feedback value ωfb to be described below becomes an angular velocity command ωc to be described below.

That is, the position command Pc is input to the subtractor 1902*a*, and the position feedback value Pfb to be described below is input from the rotational angle calculator 1902*b*. In the rotational angle calculator 1902*b*, the number of pulses input from the position sensor 1412 is counted, and the rotational angle of the motor 1411 according to the counted value is output to the subtractor 1902*a* as the position feedback value Pfb. The subtractor 1902*a* outputs a deviation (value obtained by subtracting the position feedback value Pfb from the target value of the rotational angle of the motor 1411) between the position command Pc and the position feedback value Pfb to the position controller 1902*c*.

The position controller 1902*c* performs predetermined computation processing using the deviation input from the subtractor 1902*a*, a proportional gain that is a predetermined coefficient, or the like and computes a target value of the angular velocity of the motor 1411 according to the deviation. The position controller 1902*c* outputs a signal showing the target value (command value) of the angular velocity of the motor 1411 to the subtractor 1902*d* as the angular velocity command ωc. In the present embodiment, a proportional control (P control) is performed as the feedback control. However, the feedback control is not limited to this.

The angular velocity command ωc and the angular velocity feedback value ωfb to be described below are input to the subtractor 1902*d*. The subtractor 1902*d* outputs a deviation (value obtained by subtracting the angular velocity feedback value ωfb from the target value of the angular velocity of the motor 1411) between the angular velocity command ωc and the angular velocity feedback value ωfb to the angular velocity controller 1902*e*.

The angular velocity controller 1902*e* performs predetermined computation processing including integration, using the deviation input from the subtractor 1902*d*, a proportional gain (position proportional gain) that is a predetermined coefficient, an integration gain, or the like, thereby generating a driving signal (driving current) of the motor 1411 according to the deviation, and supplies the driving signal to the motor 1411 via a motor driver. In the present embodiment, a PI control is performed as the feedback control. However, the feedback control is not limited to this.

In this way, the feedback control is performed and the driving current of the motor 1411 is controlled so that the position feedback value Pfb is as equal to the position command Pc as possible and the angular velocity feedback value ωfb is as equal to the angular velocity command ωc as possible.

Next, the angular velocity feedback value ωfb in the second driving source controller 1902 will be described.

In the angular velocity calculator 1902$f$, an angular velocity $\omega$m1 of the motor 1411 is calculated on the basis of the frequency of a pulse signal input from the position sensor 1412, and the angular velocity $\omega$m1 is output to the adder 1902$g$.

Additionally, in the angular velocity calculator 1902$f$, an angular velocity $\omega$A1m of the first shoulder portion 1241 around the rotational axis O12 is calculated on the basis of the frequency of the pulse signal input from the position sensor 1412, and the angular velocity $\omega$A1m is output to the subtractor 1902$h$. In addition, the angular velocity $\omega$A1m is a value obtained by dividing the angular velocity $\omega$m1 by a reduction ratio in the joint mechanism 1410.

Additionally, angular velocities $\omega$x, $\omega$y, and $\omega$z are respectively detected from the angular velocity sensor 1720, and the respective angular velocities $\omega$x, $\omega$y, and $\omega$z are input to the angular velocity converter 1902$i$. In the angular velocity converter 1902$i$, an angular velocity $\omega$A1 of the first shoulder portion 1241 around the rotational axis O12 is calculated from the input angular velocities $\omega$x, $\omega$y, and $\omega$z, and the angular velocity $\omega$A1 is output to the subtractor 1902$h$. In the angular velocity converter 1902$i$, coordinate axis transformation referred to as the Jacob's transformation is performed if necessary.

The angular velocity $\omega$A1 and the angular velocity $\omega$A1m are input to the subtractor 1902$h$, and the subtractor 1902$h$ outputs a value $\omega$A1s (=$\omega$A1-$\omega$A1m) obtained by subtracting the angular velocity $\omega$A1m from the angular velocity $\omega$A1 to the converter 1902$j$. The value $\omega$A1s is equivalent to a vibration component (vibration angular velocity) of the angular velocity of the first shoulder portion 1241 around the rotational axis O12. Hereinafter, $\omega$A1s is referred to as a vibration angular velocity. In the present embodiment, a feedback control of multiplying the vibration angular velocity $\omega$A1s by a gain Ka to be described below and returning the multiplied vibration angular velocity to an input side of the motor 1411 is performed. Specifically, a feedback control is performed on the motor 1411 so that the vibration angular velocity $\omega$A1s becomes as close to 0 as possible. Accordingly, the vibration in the robot 1200 can be suppressed. In addition, the angular velocity of the motor 1411 is controlled in this feedback control.

The converter 1902$j$ converts the vibration angular velocity $\omega$A1s to an angular velocity $\omega$m1s in the motor 1411, and outputs the angular velocity $\omega$m1s to the correction value calculator 1902$k$. This conversion can be obtained by multiplying the vibration angular velocity $\omega$A1s by the reduction ratio in the joint mechanism 1410.

The correction value calculator 1902$k$ multiplies the angular velocity $\omega$m1s by a gain (feedback gain) Ka that is a predetermined coefficient, obtains a correction value Ka·$\omega$m1s, and outputs the correction value Ka·$\omega$m1s to the adder 1902$g$.

The angular velocity $\omega$m1 and the correction value Ka·$\omega$m1s are input to the adder 1902$g$. The adder 1902$g$ outputs an additional value of the angular velocity $\omega$m1 and the correction value Ka·$\omega$m1s to the subtractor 1902$d$ as the angular velocity feedback value $\omega$fb. In addition, the subsequent operation is as mentioned above.

Third Driving Source Controller

Figure 24:
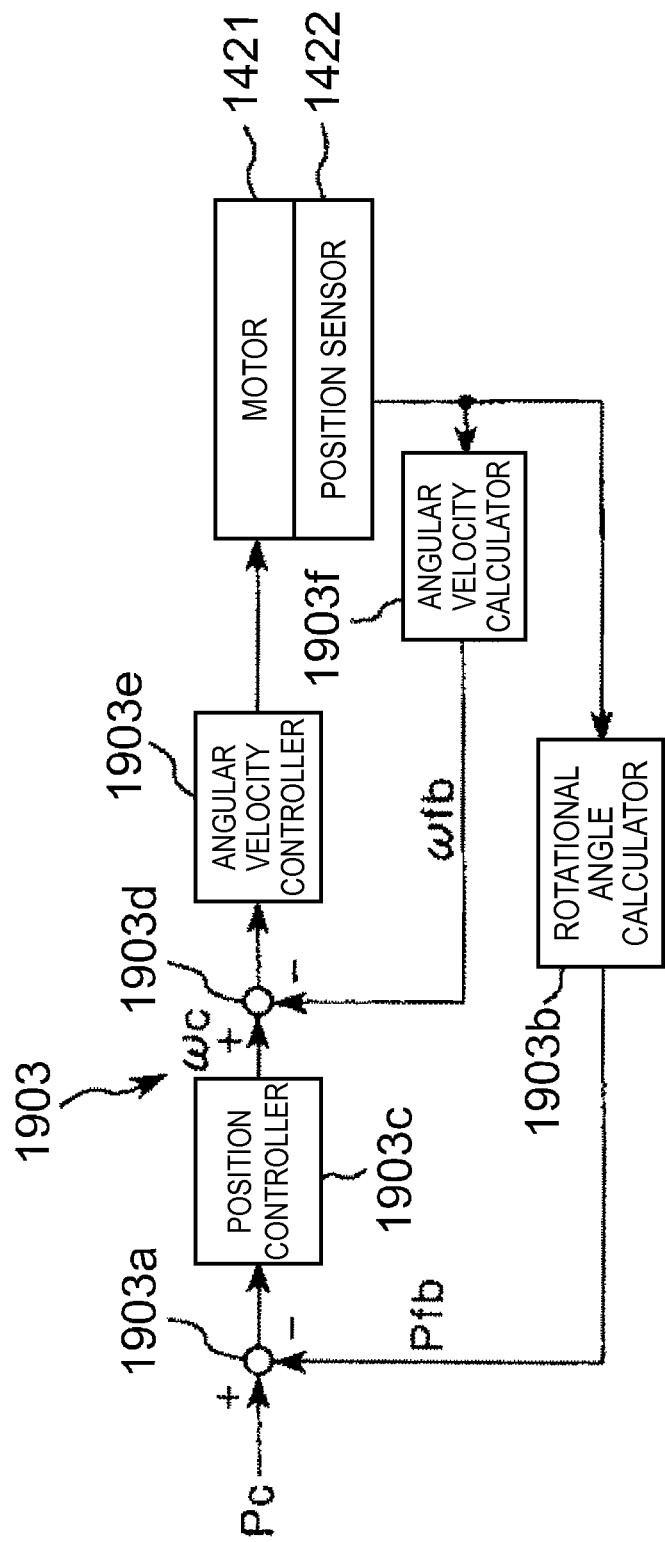
FIG. 24 is a block diagram illustrating the drive control of the robot system illustrated in FIG. 17.

As shown in FIG. 24, the third driving source controller 1903 has a subtractor 1903$a$, a rotational angle calculator 1903$b$, a position controller 1903$c$, a subtractor 1903$d$, an angular velocity controller 1903$e$, and an angular velocity calculator 1903$f$. In addition to a position command Pc of the motor 1421, a detection signal is input from the position sensor 1422 to the third driving source controller 1903. The third driving source controller 1903 drives the motor 1421 through a feedback control using the respective detection signals so that a rotational angle (position feedback value Pfb) of the motor 1421 calculated from the detection signal of the position sensor 1422 becomes the position command Pc and an angular velocity feedback value $\omega$fb to be described below becomes an angular velocity command $\omega$c to be described below.

That is, the position command Pc is input to the subtractor 1903$a$, and the position feedback value Pfb to be described below is input from the rotational angle calculator 1903$b$. In the rotational angle calculator 1903$b$, the number of pulses input from the position sensor 1422 is counted, and the rotational angle of the motor 1421 according to the counted value is output to the subtractor 1903$a$ as the position feedback value Pfb. The subtractor 1903$a$ outputs a deviation (value obtained by subtracting the position feedback value Pfb from the target value of the rotational angle of the motor 1421) between the position command Pc and the position feedback value Pfb to the position controller 1903$c$.

The position controller 1903$c$ performs predetermined computation processing using the deviation input from the subtractor 1903$a$, a proportional gain that is a predetermined coefficient, or the like and computes a target value of the angular velocity of the motor 1421 according to the deviation. The position controller 1903$c$ outputs a signal showing the target value (command value) of the angular velocity of the motor 1421 to the subtractor 1903$d$ as the angular velocity command $\omega$c.

Additionally, in the angular velocity calculator 1903$f$, the angular velocity of the motor 1421 is calculated on the basis of the frequency of a pulse signal input from the position sensor 1422, and the angular velocity is output to the subtractor 1903$d$ as the angular velocity feedback value $\omega$fb.

The angular velocity command $\omega$c and the angular velocity feedback value $\omega$fb are input to the subtractor 1903$d$. The subtractor 1903$d$ outputs a deviation (value obtained by subtracting the angular velocity feedback value $\omega$fb from the target value of the angular velocity of the motor 1421) between the angular velocity command $\omega$c and the angular velocity feedback value $\omega$fb to the angular velocity controller 1903$e$.

The angular velocity controller 1903$e$ performs predetermined computation processing including integration, using the deviation input from the subtractor 1903$d$, a proportional gain (position proportional gain) that is a predetermined coefficient, an integration gain, or the like, thereby generating a driving signal of the motor 1421 according to the deviation, and supplies the driving signal to the motor 1421 via a motor driver.

Accordingly, the feedback control is performed and the driving of the motor 1421 is controlled so that the position feedback value Pfb is as equal to the position command Pc as possible and the angular velocity feedback value $\omega$fb is as equal to the angular velocity command $\omega$c as possible.

Fourth Driving Source Controller

Figure 25:
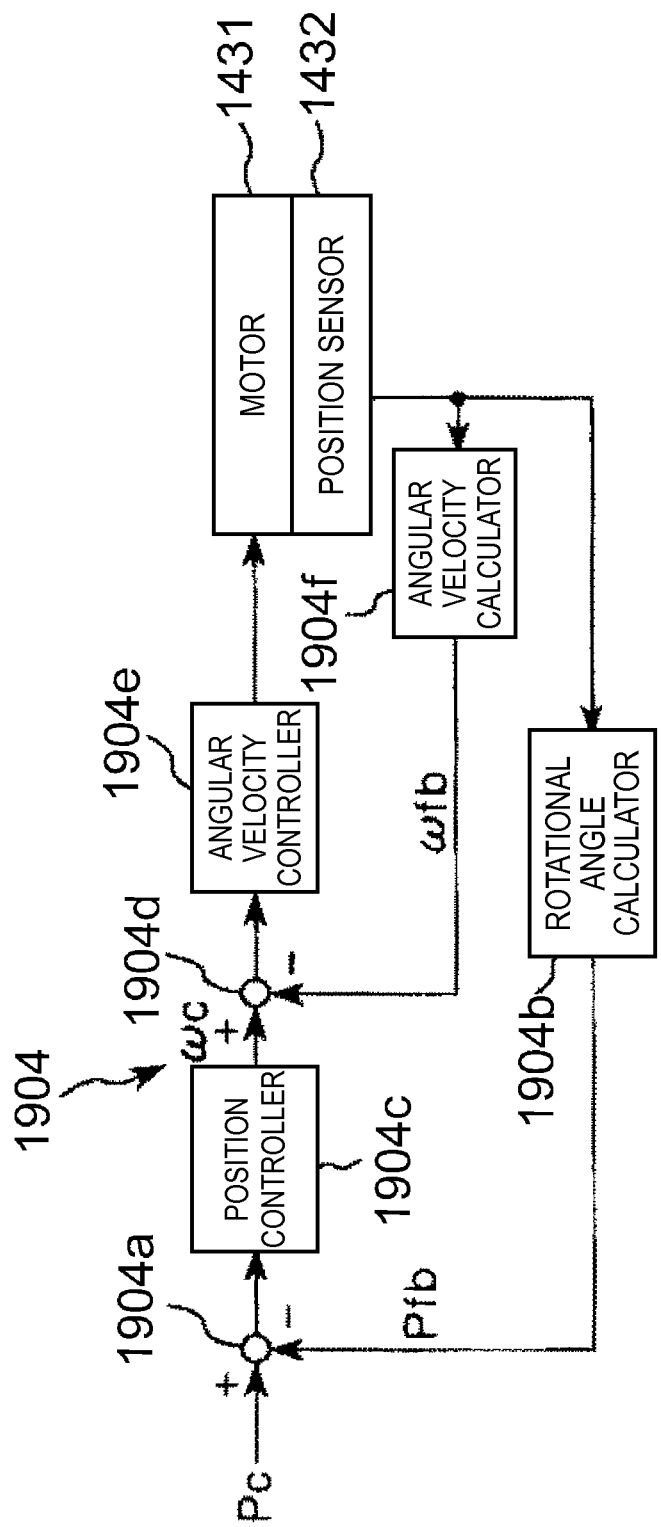
FIG. 25 is a block diagram illustrating the drive control of the robot system illustrated in FIG. 17.

As shown in FIG. 25, the fourth driving source controller 1904 has a subtractor 1904$a$, a rotational angle calculator 1904$b$, a position controller 1904$c$, a subtractor 1904$d$, an angular velocity controller 1904$e$, and an angular velocity calculator 1904$f$. In addition to a position command Pc of the motor 1431, a detection signal is input from the position sensor 1432 to the fourth driving source controller 1904. The fourth driving source controller 1904 drives the motor 1431 through a feedback control using the respective detection signals so that a rotational angle (position feedback value Pfb) of the motor 1431 calculated from the detection signal of the position sensor 1432 becomes the position command Pc and an angular velocity feedback value ωfb becomes an angular velocity command ωc. Since such a fourth driving source controller 1904 is the same as the third driving source controller 1903, the detailed description thereof will be omitted.

Fifth Driving Source Controller

Figure 26:
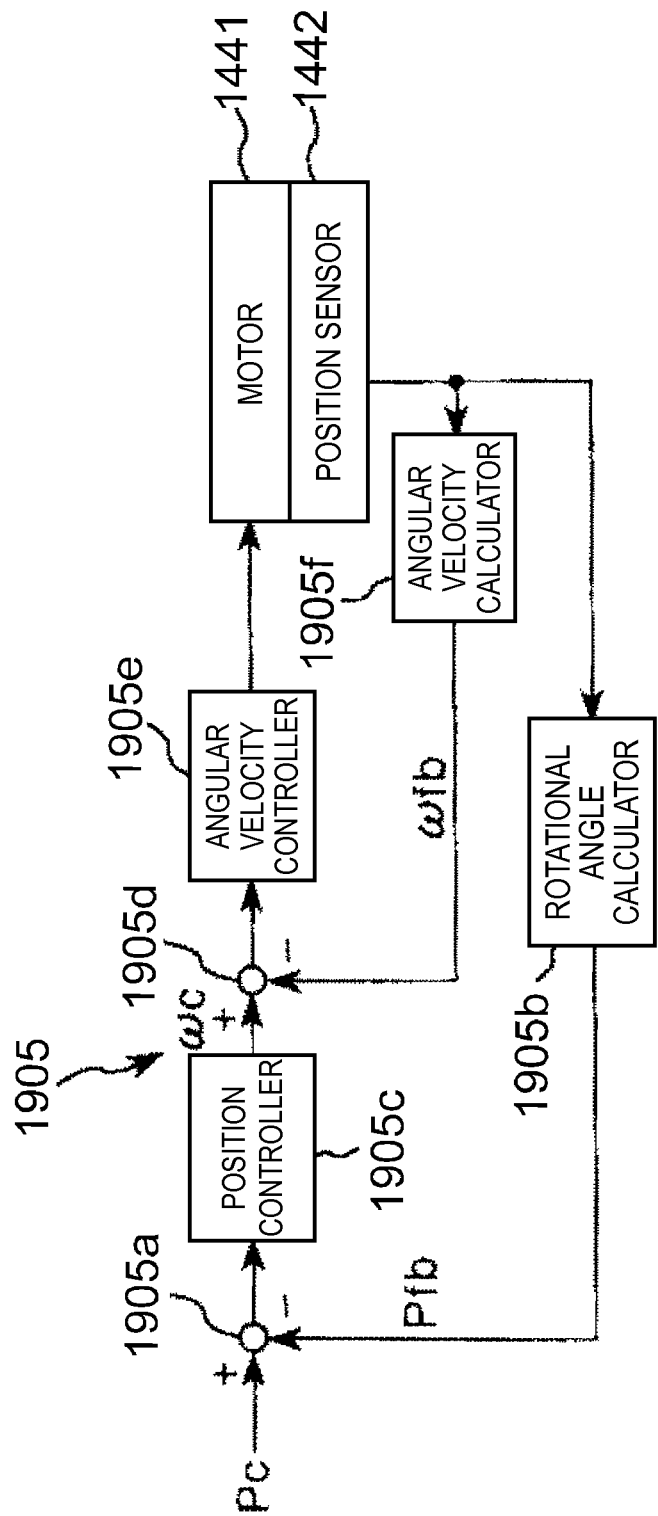
FIG. 26 is a block diagram illustrating the drive control of the robot system illustrated in FIG. 17.

As shown in FIG. 26, the fifth driving source controller 1905 has a subtractor 1905*a*, a rotational angle calculator 1905*b*, a position controller 1905*c*, a subtractor 1905*d*, an angular velocity controller 1905*e*, and an angular velocity calculator 1905*f*. In addition to a position command Pc of the motor 1441, a detection signal is input from the position sensor 1442 to the fifth driving source controller 1905. The fifth driving source controller 1905 drives the motor 1441 through a feedback control using the respective detection signals so that a rotational angle (position feedback value Pfb) of the motor 1441 calculated from the detection signal of the position sensor 1442 becomes the position command Pc and an angular velocity feedback value ωfb becomes an angular velocity command ωc. Since such a fifth driving source controller 1905 is the same as the third driving source controller 1903, the detailed description thereof will be omitted.

Sixth Driving Source Controller

Figure 27:
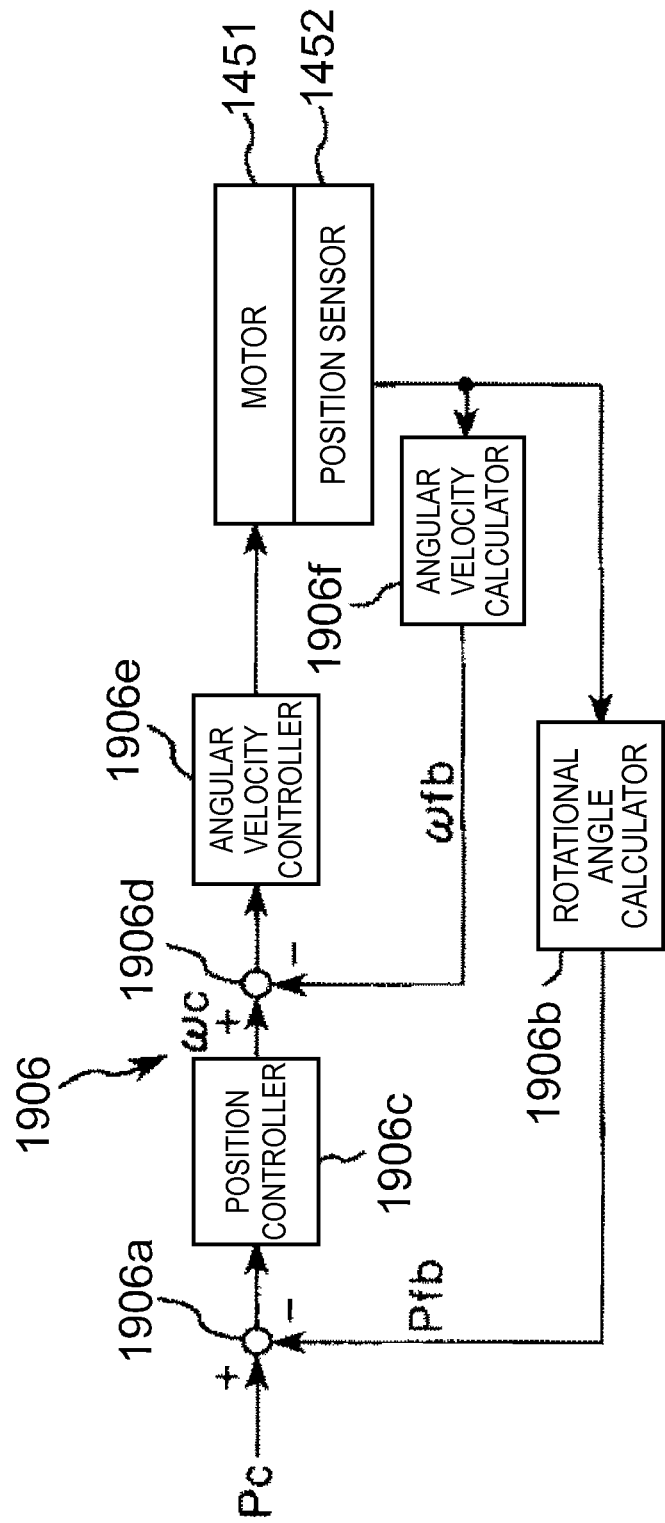
FIG. 27 is a block diagram illustrating the drive control of the robot system illustrated in FIG. 17.

As shown in FIG. 27, the sixth driving source controller 1906 has a subtractor 1906*a*, a rotational angle calculator 1906*b*, a position controller 1906*c*, a subtractor 1906*d*, an angular velocity controller 1906*e*, and an angular velocity calculator 1906*f*. In addition to a position command Pc of the motor 1451, a detection signal is input from the position sensor 1452 to the sixth driving source controller 1906. The sixth driving source controller 1906 drives the motor 1451 through a feedback control using the respective detection signals so that a rotational angle (position feedback value Pfb) of the motor 1451 calculated from the detection signal of the position sensor 1452 becomes the position command Pc and an angular velocity feedback value ωfb becomes an angular velocity command ωc. Since such a sixth driving source controller 1906 is the same as the third driving source controller 1903, the detailed description thereof will be omitted.

Seventh Driving Source Controller

Figure 28:
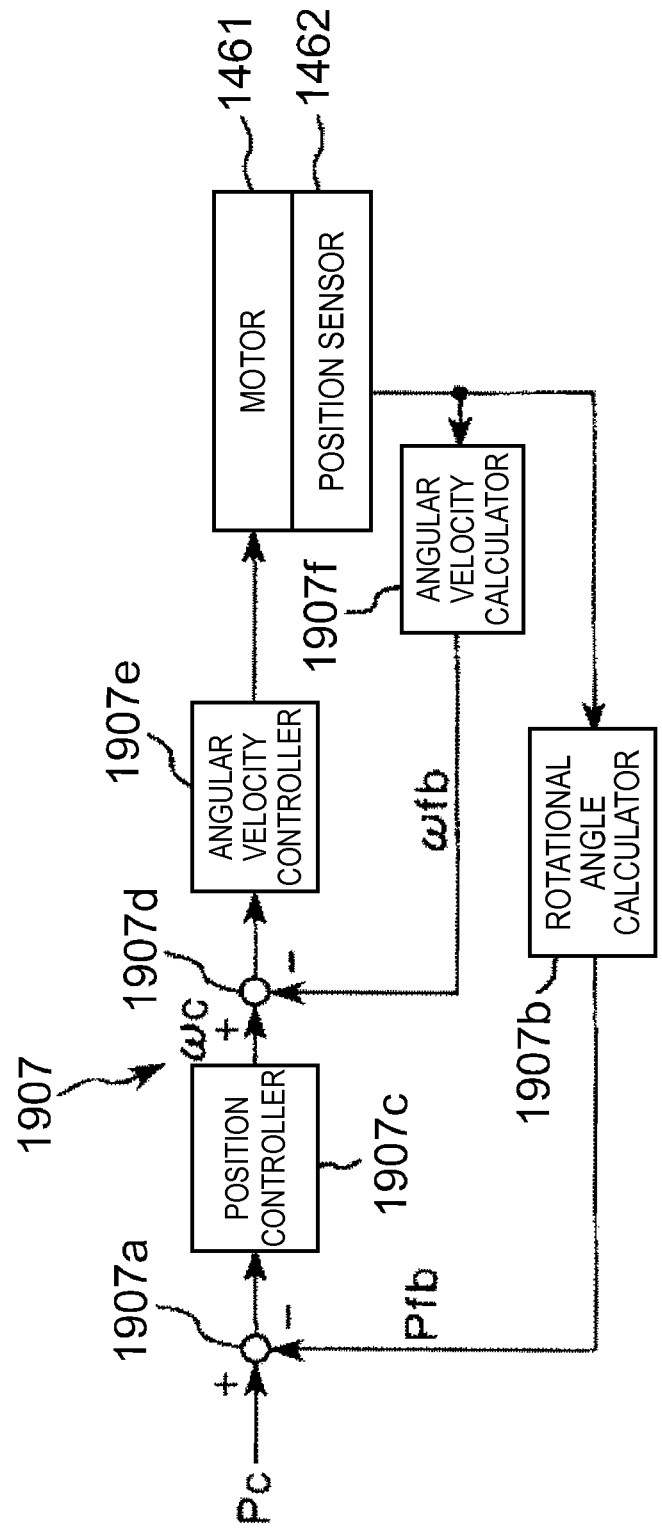
FIG. 28 is a block diagram illustrating the drive control of the robot system illustrated in FIG. 17.

As shown in FIG. 28, the seventh driving source controller 1907 has a subtractor 1907*a*, a rotational angle calculator 1907*b*, a position controller 1907*c*, a subtractor 1907*d*, an angular velocity controller 1907*e*, and an angular velocity calculator 1907*f*. In addition to a position command Pc of the motor 1461, a detection signal is input from the position sensor 1462 to the seventh driving source controller 1907. The seventh driving source controller 1907 drives the motor 1461 through a feedback control using the respective detection signals so that a rotational angle (position feedback value Pfb) of the motor 1461 calculated from the detection signal of the position sensor 1462 becomes the position command Pc and an angular velocity feedback value ωfb becomes an angular velocity command ωc. Since such a seventh driving source controller 1907 is the same as the third driving source controller 1903, the detailed description thereof will be omitted.

Eighth Driving Source Controller

Figure 29:
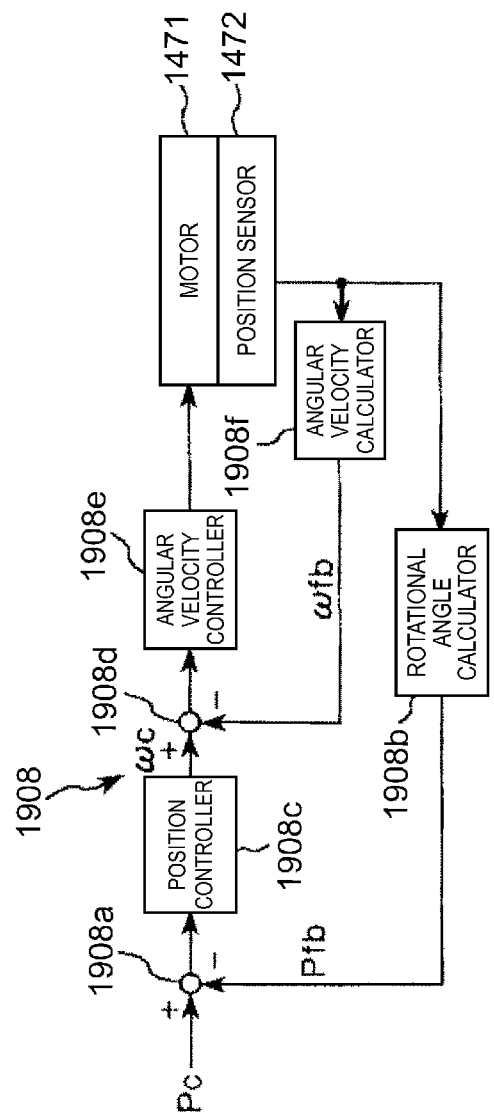
FIG. 29 is a block diagram illustrating the drive control of the robot system illustrated in FIG. 17.

As shown in FIG. 29, the eighth driving source controller 1908 has a subtractor 1908*a*, a rotational angle calculator 1908*b*, a position controller 1908*c*, a subtractor 1908*d*, an angular velocity controller 1908*e*, and an angular velocity calculator 1908*f*. In addition to a position command Pc of the motor 1471, a detection signal is input from the position sensor 1472 to the eighth driving source controller 1908. The eighth driving source controller 1908 drives the motor 1471 through a feedback control using the respective detection signals so that a rotational angle (position feedback value Pfb) of the motor 1471 calculated from the detection signal of the position sensor 1472 becomes the position command Pc and an angular velocity feedback value ωfb to be described below becomes an angular velocity command ωc to be described below. Since such an eighth driving source controller 1908 is the same as the third driving source controller 1903, the detailed description thereof will be omitted.

The basic configuration of the robot system 1100 has been described above.

Next, particularly characteristic portions of the robot system 1100 will be described.

In the robot system 1100, the driving speed of the multi-joint robot arm 1240 according to whether or not the multi-joint robot arm 1230 is performing predetermined work E that requires precision varies. In a working state where the multi-joint robot arm 1230 is performing work E, generation of vibration in the multi-joint robot arm 1230 is not desired in order to reliably perform the work E as compared to a non-working state where the work E is not performed.

Accordingly, the robot control device 1900 controls the driving of the robot 1200 so that a time (second time) T2 taken for moving the tip of the multi-joint robot arm 1240 by a predetermined distance L when the multi-joint robot arm 1230 is in the working state becomes longer than a time (first time) T1 taken for moving the tip of the multi-joint robot arm 1240 by the predetermined distance L when the multi-joint robot arm 1230 is in the non-working state. Accordingly, the generation of vibration in the working state can be suppressed without sacrificing work speed in the non-working state that is not influenced as much as the vibration in the working state. Accordingly, it is possible to provide the robot system 1100 that can perform high-precision work while suppressing a slowdown in the work speed of the robot 1200.

Here, as mentioned above, the setting of the respective parts of the robot 1200 can be changed from the input device 1270. As items (setting items) of which the setting can be changed, for example, the accelerations (angular accelerations), decelerations (angular decelerations), velocities (angular velocities), and the like of the respective motors 1411 to 1471 and 1511 to 1571 used for the driving of the multi-joint robot arms 1230 and 1240 are included. Moreover, the respective setting items can be individually set in the case of the working state and in the case of the non-working state. Therefore, the user is able to set the setting items in advance so that the time T2 becomes longer than the time T1.

If the setting items are under the same conditions in the working state and in the non-working state, in ordinary robots, the times T1 and T2 taken when the multi-joint robot arm 1240 is made to perform the same movement become the same. However, in the robot 1200, even if the setting items are under the same conditions in the working state and in the non-working state, the respective parts are controlled so that the time taken when the multi-joint robot arm 1240 is made to perform the same movement in the case of the working state becomes longer than that in the case of the non-working state, that is, so that T1<T2 is satisfied. Accordingly, the generation of the vibration of the multi-joint robot arm 1230 in the working state can be suppressed while suppressing a slowdown in the work speed of the robot 1200.

More specifically, the robot, for example as illustrated in FIG. 30, is configured such that, when the second shoulder portion 1242 is rotated with respect to the first shoulder portion 1241 from a stationary state Ps in which the multi-joint robot arm 1240 is made stationary in a posture (predetermined posture) in which the multi-joint robot arm is stretched straight in a horizontal direction, and a tip of the multi-joint robot arm 1240 is moved by a predetermined distance L in the horizontal direction while maintaining the posture in which the arm is stretched straight and is brought into a target state Pe, the time T1 taken when the multi-joint robot arm 1230 is in the non-working state and the time T2 taken when the multi-joint robot arm 1230 is in the working state satisfy the relationship T1<T2. In addition, the times T1 and T2, as illustrated in FIG. 31, can be defined by t2−t1, respectively, when the time when a driving signal for bringing the multi-joint robot arm 1240 into the target state Pe from the stationary state Ps is t1 and the time when the multi-joint robot arm 1240 has first reached the target state Pe is t2.

Here, the stationary state Ps can be defined as, for example, a state where the motors 1511 to 1571 used for the driving of the multi-joint robot arm 1240 are not driven. Additionally, the stationary state Ps can be defined as a state where the speed of a motion of the multi-joint robot arm 1240 is 0 (the speed at a taught point is 0). Additionally, the stationary state Ps can also be defined as a state where the positional relationship between the multi-joint robot arm 1240 and the installation surface does not change.

Additionally, the tip of the multi-joint robot arm 1240 may be a tip of the hand portion 1238, or may be a tip of the end effector 1610 when the end effector 1610 is attached to the hand portion 1238.

In addition, it is preferable that, although not particularly limited, T2 is about 1.2T1 to 2T1 if the relationship T1<T2 is satisfied. Accordingly, the above effects can be effectively exhibited, and the movement of the multi-joint robot arm 1240 when the multi-joint robot arm 1230 is in the working state can be prevented from being excessively delayed.

Additionally, in the aforementioned example, an example has been described in which the multi-joint robot arm 1240 is moved from the stationary state Ps, in which the multi-joint robot arm is made stationary in the posture (predetermined posture) in which the multi-joint robot arm is stretched straight in the horizontal direction, by a predetermined distance in the horizontal direction while maintaining the posture in which the arm is stretched straight, and is brought into the target state Pe. However, the control as described above is performed when the multi-joint robot arm 1240 is moved in directions (that is, the horizontal direction and a combined direction of the horizontal direction and the vertical direction) having a horizontal direction component (a direction orthogonal to the rotational axis O11).

Meanwhile, when the multi-joint robot arm 1240 is moved in the vertical direction, the times T1 and T2 taken for bringing the multi-joint robot arm into the target state Pe from the stationary state Ps may not satisfy the relationship T1<T2 but may be T1=T2. That is, when the multi-joint robot arm 1240 is moved in the vertical direction, the multi-joint robot arm may be brought into the target state Pe from the stationary state Ps in a given period of time irrespective of whether the multi-joint robot arm 1230 is in the working state or in the non-working state. Since the inertia (force around the rotational axis O11) in a twist direction is not easily applied to the trunk 1220 when the multi-joint robot arm 1240 is moved in the vertical direction, vibration is not easily generated as compared to the movement in the horizontal direction. Accordingly, as described above, a decline in the processing efficiency of the robot 1200 can be suppressed to a smaller value by satisfying T1=T2 when the multi-joint robot arm 1240 is moved in the vertical direction.

Additionally, in the aforementioned example, a case has been described where the multi-joint robot arm 1240 is moved from the stationary state Ps, in which the multi-joint robot arm is stretched straight in the horizontal direction, and is brought into the target state Pe. However, the stationary state Ps and the target state Pe of the multi-joint robot arm 1240 are not particularly limited, and can be applied to all postures that can be realized by the multi-joint robot arm 1230. For example, a posture in which an elbow is bent such that the upper arm portion is lowered in the vertical direction and the forearm portion is directed to the horizontal direction may be defined as the stationary state Ps, and a posture in which the upper arm portion is twisted from the stationary state and the forearm portion is moved in the horizontal direction may be defined as the target state Pe. Additionally, a posture in which the forearm portion is moved with respect to the upper arm portion by bending an elbow from the stationary state Ps where the arm is stretched straight may be the target state Pe. Additionally, the shape (bending manner) of the multi-joint robot arm 1240 may change in the stationary state Ps and the target state Pe.

Next, methods for satisfying T1<T2 will be described using specific examples. One of specific methods of satisfying T1<T2 includes a method of making the acceleration and deceleration of the motor 1521 in the case of the working state lower than those in the case of the non-working state. Accordingly, T1<T2 can be realized through simple control. In addition, this method is sufficient if at least one of the acceleration and the deceleration in the case of the working state is made lower than that in the case of the non-working state.

Another method includes a method of making a position proportional gain used with the angular velocity controller (a portion equivalent to the angular velocity controller 1903e of the third driving source controller 1903 having the same configuration) of the tenth driving source controller 1910 that controls the driving of the motor 1521 in the case of the working state lower than that in the case of the non-working state. Accordingly, the reactivity of the motor 1521 to a driving signal to be supplied from the angular velocity controller to the motor 1521 becomes blunt, and as a result, T1<T2 can be realized. T1<T2 can also be realized through simple control by such a method.

Changing the driving speed of the multi-joint robot arm 1240 when the multi-joint robot arm 1230 is in the working state and in the non-working state has been described above. However, in the robot system 1100, the driving speed of the multi-joint robot arm 1240 when the multi-joint robot arm 1230 is in the working state is controlled so as to change according to the posture (inertia moment to be generated) of the multi-joint robot arm 1240.

Hereinafter, specifically, a first posture in which an elbow portion is bent as illustrated in FIG. 32A, and a second posture in which the multi-joint robot arm 1240 extends in the horizontal direction as illustrated in FIG. 32B will be compared and described as one example.

In this case, an inertia moment M2 generated when the second shoulder portion 1242 is rotated with respect to the first shoulder portion 1241 under the same conditions (the acceleration, deceleration, or the like of the motor 1521) as those in the case of the first posture and the multi-joint robot arm 1240 in the second posture is rotated in the horizontal direction while maintaining the posture thereof becomes greater than an inertia moment M1 generated when the motor 1521 is driven to rotate the second shoulder portion 1242 with respect to the first shoulder portion 1241 and the multi-joint robot arm 1240 in the first posture is rotated in the horizontal direction, while maintaining with the posture thereof. Since vibration is more easily generated as an inertia moment is greater, in order to suppress the vibration of the multi-joint robot arm 1230, it is preferable to make the inertia moment generated when the multi-joint robot arm 1240 in the second posture is moved small.

Thus, the robot control device 1900 is configured so as to control the robot 1200 so that an acceleration when the multi-joint robot arm 1240 in the second posture becomes smaller than an acceleration when the multi-joint robot arm 1240 in the first posture. By making an acceleration smaller as an inertia moment to be generated is greater in this way, the vibration generated in the multi-joint robot arm 1230 in the working state can be more effectively suppressed. In addition, in the aforementioned description, acceleration is used as a parameter to be changed. However, instead of the acceleration, deceleration and maximum speed (the maximum engine speed of the motor) may be adopted. Additionally, these parameters may be appropriately combined together.

Additionally, in the robot system 1100, the driving speed of the multi-joint robot arm 1240 when the multi-joint robot arm 1230 is in the working state is controlled so as to change according to the mass of a member to be held by the multi-joint robot arm 1240. Specifically, when the multi-joint robot arm 1240 is driven at a predetermined track, acceleration, deceleration, and velocity, an inertia moment generated when a member with a second mass S2 heavier than a first mass S1 becomes greater than an inertia moment generated when a member with the first mass S1 is held. As mentioned above, since vibration is more easily generated as an inertia moment is greater, it is preferable to make the inertia moment generated when the multi-joint robot arm 1240 that is holding the member with the second mass S2 is moved small.

Thus, the robot control device 1900 is configured so as to control the robot 1200 so that an acceleration when moving the multi-joint robot arm 1240 that holds the member with the second mass S2 becomes smaller than an acceleration when moving the multi-joint robot arm 1240 that holds the member with the first mass S1. By making an acceleration smaller as a member to be held by the multi-joint robot arm 1240 is heavier in this way, the vibration generated in the multi-joint robot arm 1230 in the working state can be more effectively suppressed. In addition, in the aforementioned description, acceleration is used as a parameter to be changed. However, instead of the acceleration, deceleration and maximum speed (the maximum engine speed of the motor) may be adopted. Additionally, these parameters may be appropriately combined together.

The control using the robot control device 1900 has been described above in detail. Here, although the predetermined work E performed by the multi-joint robot arm 1230 is not particularly limited if the predetermined work is work that requires precision, and varies also depending on applications of the robot 1200. For example, the predetermined work may be the work listed below.

A. Positioning Work

For example, there is work in which, in a conveying process, a part (object to be conveyed) is conveyed to a part case and the part is fixed to a predetermined position. Additionally, there is work in which, in an assembling process, a part is conveyed and arranged at a predetermined position of another part (attachment object, such as a housing). Additionally, there is work in which, in an assembling process, a screw is held, the screw is moved to a screw hole position where the screw is tightened, and the screw is held in the state of being insertable into the screw hole. Precision is required for such positioning work.

B. Gripping and Holding Work

For example, there is work in which, in a conveying process or an assembling process, a part is moved to a predetermined part position and the part is gripped and held as it is or moved to another place. Precision is required for such work.

C. Inserting and Attaching Work

For example, there is work in which, in an assembling process, a gripped part is inserted into a hole of another part or work in which a tip portion of a gripped screw is inserted into a screw hole of another part. Additionally, for example, there is work in which gripped various cables (electrical wiring, piping, or the like) are arranged at an attachment object, such as a housing, and are hung on a claw provided in an attachment object, or work in which wiring, such as gripped flexible wring, is connected to a connector of an attachment object. Since such types of work require high positional precision, precision is required.

D. Probing Work

For example, there is work in which the position of a target site, such as a hole or a protrusion formed in a part, is probed, or work in which another part is inserted into the probed hole or another part is fitted into the probed protrusion. For convenience, description will be made taking an example in which a second part is inserted into a hole of a first part. In this example, the multi-joint robot arm 1230 grips the second part and makes the gripped second part slide on the surface of the first part, thereby probing the surface of the first part, detects the position of a hole on the basis of a signal from the force sensor 1740 that is output in that case (the force that the force sensor 1740 receives becomes weak at the position of the hole), and inserts the gripped second part into the hole of the first part on the basis of the detection result. Moreover, even when the gripped second part is inserted into the hole of the first part, the position, posture, insertion direction, and the like of the second part are finely adjusted on the basis of the output signal from the force sensor 1740.

E. Holding and Pressing Work

For example, there is work in which a part (workpiece) made of a material having a relatively low strength, such as glass, wood, or stone is temporarily held down so as not to move. In this case, a force equal to or more than a predetermined value is kept from being applied to a part on the basis of the output from the force sensor 1740. Precision is required for such work.

F. Polishing and Trimming Work

There is work in which a die-cast part, a cut part, a molded part, or the like is surface-polished or trimmed. In this case, the multi-joint robot arm 1230 grips a polishing instrument, such as a file, and performs surface-polishing or trimming so that a force equal to or more than a predetermined value is kept from being applied to a part on the basis of the output from the force sensor 1740. Such work requires precision because a force that presses a polishing instrument, such as a file, is delicate.

G. Assembling Work

For example, as illustrated in FIG. 33A, there is work in which a sheet feed roller 2100 is attached to a housing 2000 when used for manufacture of a printer. Since the width of the sheet feed roller is longer than the width of the portion of the housing 2000 in which the sheet feed roller 2100 is fitted, as illustrated in FIG. 33B, it is necessary to bend the sheet feed roller 2100 and attach the sheet feed roller to the housing 2000. In this case, there is work in which the sheet feed roller 2100 is gripped, and the sheet feed roller 2100 is bent and deformed by applying a delicate force. Such work requires precision because a force to be applied to the sheet feed roller 2100 is delicate.

H. Position Detection Work Using Camera

There is work in which the position or posture of a target part is detected on the basis of an image acquired from the hand camera 1280 arranged at the multi-joint robot arm 1230. Moreover, there is work in which the target part is gripped, conveyed, or combined on the basis of the detection result. For example, in the case of work in which a second part is inserted into a first part, the positions or postures of the first and second parts are detected using an image of the hand camera 1280. However, the allowable error of the position detection is about 1 pixel, and varies depending on the number of pixels of the hand camera 1280, the separation distance, or the like, but is less than 0.5 mm. Therefore, precision is required for such work.

I. State Detection Work and Abnormality Detection Work Using Camera

A target part or its periphery is monitored from an image acquired from the hand camera 1280 arranged at the multi-joint robot arm 1230, and the state of the multi-joint robot arm 1230 itself or a work area is grasped on the basis of the monitoring result. Detectable states include, for example, the posture or position of the multi-joint robot arm 1230 (whether or not the multi-joint robot arm is settled in an appointed work area), the position and the posture of the target part (for example, a machine, a housing, a part, or the like), or whether or not the multi-joint robot arm 1230 makes an abnormal movement.

The predetermined work that requires precision has been described above. In addition, the movement of the multi-joint robot arm 1240 when the multi-joint robot arm 1230 is performing the above-described predetermined work is not particularly limited. However, for example, the multi-joint robot arm 1240 goes to take a tool to be used during work, moves in order to hold down the above other part (an attachment object, such as a housing), or moves to a predetermined place and stands by in order to perform the next work. Additionally, when a screw held by the multi-joint robot arm 1230 is tightened, the multi-joint robot arm 1240 goes to take a tool, such as a screwdriver, and then, tightens the screw to be held by the multi-joint robot arm 1230 to an object using the screwdriver.

Although the robot, the robot control device, and the robot system according to the invention have been described on the basis of the illustrated embodiment, the invention is not limited to this, and the configurations of the respective parts can be substituted with arbitrary configurations having the same functions. Additionally, other arbitrary structures may be added to the invention.

Additionally, although the movable robot has been described in the aforementioned embodiment, the robot may be fixed to the floor, ceiling, wall, or the like of a work room, with bolts or the like. Additionally, in the aforementioned embodiment, the robot is arranged on a floor surface and the trunk moves in the vertical direction. However, the arrangement of the robot is not limited to this. For example, a configuration may be adopted in which the base is fixed to a ceiling or the trunk moves in the vertical direction, or a configuration may be adopted in which the base is fixed to a wall surface and the trunk moves in the horizontal direction.

Additionally, in the aforementioned embodiment, the angular velocity sensors are arranged for the respective elbows in the multi-joint robot arm. However, the arrangement of the angular velocity sensors is not limited to this. Additionally, although the detection results of the angular velocity sensors are fed back to the joint mechanism that rotates the first shoulder portion, the joint mechanism (twisting mechanism) to which the detection results are fed back is not limited to this. Additionally the detection results may be fed back to a plurality of joint mechanisms (twisting mechanisms).

Additionally, in the aforementioned embodiments, the multi-joint robot arm 1230 is configured so as to perform the predetermined work E. However, the invention is not limited to this, the multi-joint robot arm 1240 may be configured so as to perform the predetermined work E, and the multi-joint robot arms 1230 and 1240 may be configured so as to perform work E by turns.

Additionally, although the number of rotational axes of each multi-joint robot is seven in the aforementioned embodiment, the invention is not limited to this. The number of rotational axes of each multi-joint robot may be one to six or may be eight or more.

The entire disclosure of Japanese Patent Application Nos. 2013-223561, filed Oct. 28, 2013 and 2013-223559, filed Oct. 28, 2013 are expressly incorporated by reference herein.

What is claimed is:

1. A robot comprising:
a base;
a trunk provided at the base;
a first robot arm provided at the trunk; and
a moving mechanism capable of bringing the trunk to a first position and a second position further separated from the base than the first position,
wherein a second time taken when a tip of the first robot arm is moved by a predetermined distance when the trunk is at the second position is longer than a first time taken when the tip of the first robot arm is moved by the predetermined distance when the trunk is at the first position.

2. The robot according to claim 1, further comprising:
a setting receiving unit that receives a set value that determines a drive condition of the first robot arm,
wherein the set value received by the setting receiving unit is the same at the first position and the second position.

3. The robot according to claim 2, further comprising:
an input unit that outputs the set value.

4. A robot system comprising:
the robot according to claim 2; and
a robot control device that controls the operation of the robot.

5. A robot system comprising:
the robot according to claim 3; and
a robot control device that controls the operation of the robot.

6. The robot according to claim 1,
wherein a direction in which the tip is moved by the predetermined distance is a direction having directional component orthogonal to a movement direction of the trunk.

7. A robot system comprising:
the robot according to claim 6; and
a robot control device that controls the operation of the robot.

8. The robot according to claim 1, further comprising:
a motor that drives the first robot arm,
wherein a position proportional gain of the motor, by which a position deviation that is a difference between the position of the motor and a command position is multiplied, in the case of the second position is smaller than that in the case of the first position.

9. A robot system comprising:
the robot according to claim 8; and
a robot control device that controls the operation of the robot.

10. The robot according to claim 1, further comprising:
a motor that drives the first robot arm,
wherein at least one of the acceleration and the deceleration of the motor in the case of the second position is smaller than that in the case of the first position.

11. A robot system comprising:
the robot according to claim 10; and
a robot control device that controls the operation of the robot.

12. The robot according to claim 1, further comprising:
a detector that detects the separation distance of the trunk from the base.

13. A robot system comprising:
the robot according to claim 12; and
a robot control device that controls the operation of the robot.

14. The robot according to claim 1, further comprising:
a second robot arm provided at the trunk,
wherein a time taken when a tip of the second robot arm is moved by a predetermined distance when the trunk is at the second position is longer than a time taken when the tip of the second robot arm is moved by a predetermined distance when the trunk is at the first position.

15. A robot system comprising:
the robot according to claim 14; and
a robot control device that controls the operation of the robot.

16. The robot according to claim 1, further comprising:
a rotation mechanism that rotates the trunk with respect to the base,
wherein a time taken when the trunk is rotated by a predetermined angle with respect to the base when the trunk is at the second position is longer than a time taken when the trunk is rotated by the predetermined angle when the trunk is at the first position.

17. The robot according to claim 1,
wherein the first time and the second time are respectively times taken when the tip of the first robot arm is moved by a predetermined distance in a direction parallel to an installation surface of the robot.

18. The robot according to claim 1,
wherein the first time and the second time are respectively times taken when the tip of the first robot arm is moved by a predetermined distance from a stationary state.

19. A robot system comprising:
the robot according to claim 1; and
a robot control device that controls the operation of the robot.

20. A robot control device that controls a robot including:
a base;
a trunk provided at the base;
a first robot arm provided at the trunk; and
a moving mechanism capable of bringing the trunk to a first position and a second position further separated from the base than the first position
so that a time taken when a tip of the first robot arm is moved by a predetermined distance when the trunk is at the second position is longer than a time taken when the tip of the first robot arm is moved by the predetermined distance when the trunk is at the first position.

* * * * *